United States Patent
Mantrana-Exposito

(10) Patent No.: US 10,567,485 B2
(45) Date of Patent: Feb. 18, 2020

(54) TECHNIQUES FOR COORDINATING THE SHARING OF CONTENT AMONG APPLICATIONS

(71) Applicant: Vicente Alexei Mantrana-Exposito, Cape Coral, FL (US)

(72) Inventor: Vicente Alexei Mantrana-Exposito, Cape Coral, FL (US)

(*) Notice: Subject to any disclaimer, the term of this patent is extended or adjusted under 35 U.S.C. 154(b) by 177 days.

(21) Appl. No.: 15/881,754

(22) Filed: Jan. 27, 2018

(65) Prior Publication Data
US 2019/0238619 A1   Aug. 1, 2019

(51) Int. Cl.
| | |
|---|---|
| H04L 29/08 | (2006.01) |
| G06F 21/12 | (2013.01) |
| H04L 29/06 | (2006.01) |
| G06F 16/00 | (2019.01) |

(52) U.S. Cl.
CPC .............. *H04L 67/10* (2013.01); *G06F 16/00* (2019.01); *G06F 21/128* (2013.01); *H04L 63/00* (2013.01); *H04L 67/02* (2013.01); *H04L 67/06* (2013.01); *H04L 67/30* (2013.01)

(58) Field of Classification Search
None
See application file for complete search history.

(56) References Cited

U.S. PATENT DOCUMENTS

| | | | | |
|---|---|---|---|---|
| 2010/0094878 A1* | 4/2010 | Soroca | ................... | G06Q 30/02 707/748 |
| 2011/0258049 A1* | 10/2011 | Ramer | ................... | G06Q 30/02 705/14.66 |
| 2012/0150935 A1* | 6/2012 | Frick | ................... | G06F 16/2474 709/201 |
| 2012/0233235 A1* | 9/2012 | Allaire | ..................... | B01J 6/008 717/109 |
| 2015/0205877 A1* | 7/2015 | Rhoads | ................... | G06F 21/10 707/723 |

* cited by examiner

*Primary Examiner* — Kenny S Lin

(57) ABSTRACT

Techniques for coordinating the sharing of content among applications, provided that said applications and their users are registered to the same sharing coordinator service (SCS), are described. An embodiment of the present invention can enable an application to define, to the SCS it is registered to, the types of content it is able to receive and the application routes where to receive them. Said definition provides the application users with the ability to easily select content of those types from share sources and send it to specific routes on the application, undergoing an overall personalized sharing experience. Content types can be defined on the SCS and made available to other applications to consume, centralizing the parsing of content and the interchange of information into a secure robust strongly typed system.

19 Claims, 38 Drawing Sheets

TECHNIQUES FOR COORDINATING THE SHARING OF CONTENT AMONG APPLICATIONS

CROSS-REFERENCE TO RELATED APPLICATIONS

This application claims the benefit of U.S. Provisional Application No. 62/451,673, filed Jan. 28, 2017.

BACKGROUND OF THE INVENTION

Embodiments of the present invention relate to sharing information, and more particularly to techniques for coordinating the process of content sharing among applications.

Being able to receive content from a web page is a feature that some applications like Facebook, Pinterest, Evernote, and others successfully exploit. It is very common to find a web page with an embedded functionality to send an image to a board on Pinterest or share an article with friends on Facebook. However, not all web pages contain said sharing functionality, and the ones that do, might contain a limited list of target applications to share with. In order to overcome these limitations, bookmarking services, like AddThis, can be added to a web browser as browser extensions or bookmarklets. Said bookmarking services enable users to share any web page with any of the apps registered to them.

When users share content to an application through a bookmarking service, the application typically receives page level information like the page's URL, title and main image URL. Sometimes the user wants to share more specific information inside a web page, such as: an article, an image other than the main one, or a section of the page that describes an entity like a product. In most cases the bookmarking service lacks a tooling system to easily select and share specific page content with apps. Accordingly, better techniques for coordinating the sharing of web pages' content are desired. Similar limitations exist when the sharing operation involves a source application other than a web browser.

Developing a new application whose core functionality is going to depend on receiving content that its users may send from other applications is a cumbersome task. Consider, for example, receiving said content from web pages. The application may need to make website owners embed a content forwarding functionality to that new application; but, why would they do that for a new application that nobody knows of. This represents a chicken and egg problem that is limiting the arousal of a potential new category of applications that may successfully exploit the capabilities of content sharing. To avoid this chicken and egg problem, some applications have made themselves available through web browser extension which can parse any web page for content or generate content from any web page. However, people do not like web browsers cramped with too many extensions. Wouldn't it be more suitable to have one browser extension, as a sharing coordinator, that does the parsing and content generation for the other web apps?

Besides sharing content, another way applications interact with each other is by using each other services. These services can be grouped into different categories, such as: payment services, storage services, etc. When an application presents available services to perform an action with, it often groups them into those categories; for example, an application may show, to perform payments, options such as: "PayPal", "Google Wallet", and "Amazon Payments". Sometimes the list of third party services for a given category is numerous. Showing too many services or showing a tool where to search for the desired service—because too many are available—is a rough approach usually implemented. Wouldn't it be better if we were able to know which third party services within a category our user uses, so we can show only those ones?

When an application presents a group of third party service as choices to perform an action with, a user is restricted to use one of those services listed by the application to perform said action. For example, a PDF visualizer application might present options to save the PDF file being visualized to the cloud, using the following third party services: Drop Box and Amazon Drive. In some cases the user using the PDF visualizer is not a client of those cloud storage providers, but instead it might be a client of other cloud storage providers such as iCloud or Google Drive, or even a new cloud storage service that was released a couple days ago. In this scenario the user experience in the PDF visualizer application is limited. Accordingly, better techniques that overcome these limitations are desired.

With the popularity of the use of third party services in applications and the proliferation of "The Internet of Things", task automater services like IFTT and Zapier have become popular. Said services enable end users to integrate the applications they use to create custom tasks involving said applications. The mentioned tasks are typically triggered by one of those applications, and its execution involves performing actions on the others. An example of a task that can be automated comprises a mutual user of an email and cloud storage applications who wants to save the attachments in new emails to the cloud. In order to do so, it would have to be subscribed to a tasker service into which those applications are integrated and, from inside that service, configure the automated task, if the desired email app-cloud storage app integration is supported by the tasker service. Wouldn't it be more natural to configure that automatic task right from inside the email application, right at the moment the idea of such task came into the user's mind, without having to explicitly deal with the tasker service?

BRIEF SUMMARY OF THE INVENTION

Embodiments of the present invention enable an application (e.g., Google Drive) registered to a sharing coordinator service (SCS), to define the types of content (e.g., images) it is able to receive and the potential application sections or routes (e.g., "My Drive>Pictures") where said types of content could be received, when it acts as the target of a sharing operation. Upon completion of said definition, any application associated with the same SCS, acting as the source of a sharing operation, is automatically configured to offer a personalized sharing experience to the users of the target application that are registered to the same SCS. In said experience, the mentioned users can easily select, from the active view (e.g., a web page) of the source application (e.g., a web browser), any selectable content of the types that the target application indicated to the SCS it could receive (e.g., images) in the designated target section or route (e.g., "My Drive>Pictures"), and send that content to said target application section.

For example, a media player application (target application) that requires receiving audio and video content, from the internet into its users' play lists, can set a rule indicating that requirement on the SCS it is registered to. In said example, a web browser (source application), interacts with the same SCS through a browser extension it hosts. By hosting that browser extension, the browser gets associated with the SCS. That browser extension can enable a user of the media player application, who is registered to the same SCS, from any web page: to select that media player application from a list of relevant target applications (only SCS registered applications which the user is a client of may be shown on the list); to specify a section or route of the target application as the target of the sharing operation (e.g., specify "Playlists>Romantics" as the target); to select from the web page only the content relevant to the target section (only audio or video content will be highlighted and made available to share by the browser extension), and finally, to send the selected content to the target section of the media player application (e.g., send a selected audio content to "Playlists>Romantics").

In one embodiment, the definition by an application of the types of content which its sections will be able to receive involves selecting the desired types of content from a list of content types that are preset on the SCS. For example, the list of content types that are preset on the SCS may include entries such as: Image, Text, Video, Audio, Product, YouTube Video, etc. In one embodiment, the definition by an application of the types of content which its sections will be able to receive comprises setting, on the SCS, a content type other than the ones preset on the SCS. Said operation may involve the description of selection criteria to select content of that type from a set of elements made available to the SCS by the source application (e.g., the set of HTML tags that represent the web page loaded in the browser).

The previously mentioned capabilities make a SCS become a strongly typed system, through which registered users and applications interchange communications in the form of content type instances; providing users with a coherent sharing experience. Embodiments of the present invention may also enable said strongly typed SCS to:

(a) Provide functionality that enable registered users and applications to author content types. For example, a registered user may create a content type named "YouTube Video" or even application YouTube, if registered, could create that content type.

(b) Provide functionality for designing content types using popular type design patterns such as abstraction, encapsulation, inheritance and polymorphism.

(c) Provide a functionality that enables a content type to support multiple technologies. For example, a content type named "Image" may support an HTML implementation that enable applications to extract instances of said content from a web page, and may also support a PDF implementation that enable applications to extract instances of said content from a PDF document.

(d) Provide functionality that enable registered applications to consume any content type authored by users, applications or the SCS itself. For example, a media player application may be able to use a content type named "YouTube Video" that was authored and is maintained by some user or application, giving said application the advantage to focus on business logic rather than content parsing logic.

(e) Provide functionality that enable content type authors to delegate content type ownership rights to other registered applications or users.

(f) Provide functionality that enables content type owners to regulate consumption of their content types. For example, by implementing a content type licensing system. Since a content type may need to be updated frequently (due to possible changes in the selection criteria on some web pages or the addition of the capability to select the content type from a PDF, for instance), content type consumers may require an authorization to use a content type from the content type authors or maintainers.

In an embodiment of the present invention, a SCS may provide a variety of techniques for controlling access to sharable content. For example, the SCS may offer the following functionality:

(1) A mechanism for share targets to restrict incoming content from certain share source views. For example, a media player application may indicate to the SCS that it does not accept audio or video content from www.example.com into its potential play lists.

(2) A mechanism for share source views to limit the exposure of available sharable content to certain share targets. For example, web site www.example.com may indicate to the SCS that none of its images should be sent to Pinterest.

(3) A mechanism that enables a SCS registered user to authorize another SCS registered user to send content to an application route in the context of the first user's account in that application. For example, George authorizes Mary to send content to his play list "Romantics" in application "Media Player One".

(4) A mechanism for SCS registered users to limit the content types that sections of their applications can receive, in the scope of their user accounts. For example, a user of a media player application that accepts video content into a route or section named "Playlists>Romantics" may indicate to the SCS not to receive video content of a type named "YouTube Video".

(5) A mechanism for a SCS registered application to authorize a second SCS registered application to access the protected resources of the first application that the user shared with the second application. For example, an email application may indicate to the SCS that any of its registered applications that offer cloud storage services may access the email attachments that mutual users send to them, in order for the storage services to save those attachments into their clouds.

Embodiments of the present invention can enable a SCS registered application to use a third party service to perform certain action with, even though a direct integration between said application and that third party service has not been implemented. For example, a SCS registered PDF viewer application that is able to save the visualized file to the cloud through its integration with Drop Box and Amazon Drive—but is not integrated with Google Drive—would also be able to use Google Drive to safely save that file to the cloud; even more, it would be able to use, for the same purpose, some other cloud storage applications (e.g., a newly released one), automatically, without implementing any integration to it.

In one embodiment, in addition to the types of content an application section may receive, a SCS registered application may also indicate to the SCS a type of content said application section may return.

Embodiments of the present invention can enable the definition of Applets, which are routing rules that describe the flow of content sent to and returned by applications, based on content filtering and applications piping techniques. Like application sections, Applets may be targets of content sharing operations. For example, an Applet may receive content of type audio, send it to the route "Playlists>Saturday's Party" of a media player application and use the number of tracks in said playlist "n", which is returned by said application route, to build a message like "Next Saturday's Party playlist now has {n} tracks!" and post it on Tweeter (the "{n}" in the message gets substituted by the returned value).

Embodiments of the present invention can enable an application to define events associated to resources of that application which have a visual representation on the application; and show the users a visual tool, next to those visual representations, that can be used to handle said events via an Applet or a registered application. For example, an email application can define to the SCS two events regarding email attachments: "On new email" and "On deleted email". Such events can be shown to the user as options of a popup menu that is shown when the user clicks a small button, resembling a bolt icon, which is displayed next to an attachment on the application view. Upon selecting an event from the menu, a list of available Applets and Applications is shown to the user so that it configures how to handle the selected event. For instance, the user can click the bolt and hover over "On new email" from the menu, causing new options to appear on the menu. From those new options the user might select the application Google Drive and its folder "Attachments". The described actions indicate the SCS that each time an email with attachment is received by the email application, said attachment must be sent to "Google Drive>Attachments".

Embodiments of the present invention can enable the definition of View Tasks, which embody a mechanism to indicate to the SCS to observe the active views of SCS associated applications for the satisfaction of certain condition; and when that condition is satisfied, to parse said views to extract certain type of content and send that content, if found, to a given Applet or SCS registered application. For example, a user may define a View Task that when any SCS associated browser in any of its devices loads a web page having a URL that starts with "http://www.example.com/" (e.g., "http://www.example.com/page1.html") all images contained in said page get automatically sent to a specific image repository application (e.g., Pinterest) registered to the SCS.

Embodiments of the present invention can enable the SCS to verify the authenticity of some information regarding the identity of applications at registration time. For example, a procedure is provided for the SCS to verify that an application is the owner of the internet domain name that said application is providing to the SCS at registration time.

Embodiments of the present invention can enable the SCS to verify the relative uniqueness of its user accounts. Said relative uniqueness guarantees that a user can have only one account on the SCS that is verified to represent that user as a legal individual of a given country.

The foregoing, together with other features and embodiments will become more apparent upon referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention relate to techniques for coordinating the process of content sharing among applications, provided that said applications and their users are registered to the same sharing coordinator service (SCS). An embodiment of the present invention can enable an application to define, to the SCS it is registered to, the types of content it is able to receive and the routes where to receive them within the application. The said definition enables the SCS to provide the application users with the ability to easily select content of those types from share sources and send it to target routes on that application, undergoing an overall personalized sharing experience. Content types can be defined on the SCS and made available to other applications to consume, centralizing the parsing of content and the interchange of information into a secure robust strongly typed system.

Figure 1:
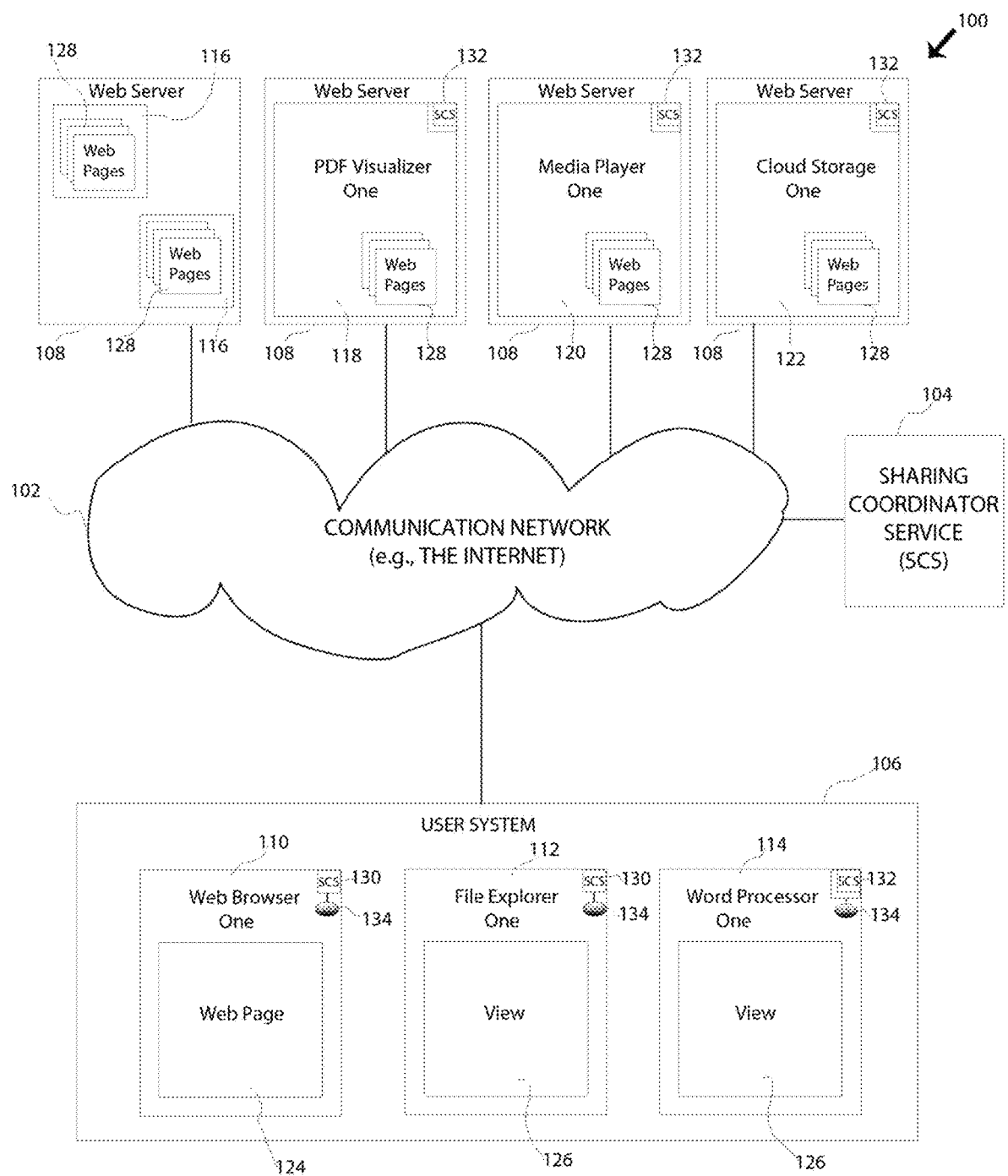
FIG. 1 is a simplified block diagram of a system incorporating an embodiment of the present invention.

FIG. 1 is a simplified block diagram of a system 100 incorporating an embodiment of the present invention. FIG. 1 is merely an example, which should not unduly limit the scope of the claims. One of ordinary skill in the art would recognize many variations, alternatives, and modifications.

As depicted in FIG. 1, system 100 comprises several computer systems communicatively coupled to each other via communication network 102. In one embodiment, communication network 102 is the Internet. In alternative embodiments, communication network 102 may be any type of network that enables communications between the various computer systems including but not restricted to an Intranet, a local area network (LAN), a wide area network (WAN), an Ethernet network, and the like, or combinations thereof. Different communication protocols, including wired and wireless protocols, may be used for data communications over network 102 including but not limited to TCP/IP, HTTP, HTTPS, SNA, IPX, AppleTalk, IEEE 802.XX suite of protocols, the Bluetooth protocol, and/or other protocols or combination of protocols.

The computer systems depicted in FIG. 1 include four web servers 108, a user system 106, and a Sharing Coordinator Service 104. While only four web servers and one user system are shown in FIG. 1, system 100 may include several users systems and a different collection of web servers. Likewise, system 100 may include multiple Sharing Coordinator Services. Web servers 108 are configured to host one or more websites 116, or web apps such as 118, 120 and 122. Each website or web app may be hosted across multiple web servers. Each website or web app comprises one or more web pages. Users may access web pages provided by web servers 108 using user system 106. For example, a user may use an application such as browser 110 executing on user system 106 to access one or more web pages stored by web servers 108. Examples of commonly used browsers include Windows Internet Explorer, Microsoft Edge, Mozilla Firefox, Apple Safari, Google Chrome, Opera, and others. A user may request a new web page by providing a uniform resource locator (URL) corresponding to the web page to the browser or by clicking on a link in a web page. The new web page 124 corresponding to the URL or the clicked link is then fetched and output or rendered to the user by the browser.

In one embodiment of the present invention, applications such as 110, 112, 114, 118, 120 and 122 can interact with a SCS 104 in two different ways: by registration 132 or by association 130 (or both).

The first mentioned way an application may interact with a SCS is by being registered to the SCS. An application is referred as registered to the SCS if the application has created an account on the SCS. In one embodiment, the process of creating an account for an application on the SCS comprises the SCS collecting and validating some information provided by the application, and subsequently establishing a secure way of communication between the application and the SCS. For example, the SCS may collect the application's name, logo and internet domain name. After collecting said information, the SCS could initiate a validation procedure to ensure the application requesting the account is indeed the one that has that name and logo and owns that domain name. Upon a successful validation of the information provided by the application, the SCS configures a secure communication channel between the application and itself, and the application is considered to be registered to the SCS.

Setting up a secure communication channel between the SCS and the application being registered to that SCS comprises: to create various end points in that application for the SCS to submit information (e.g., shared content) into the application, the application to consume an API provided by the SCS for applications to communicate with the SCS, and both parties to set up and keep up to date an authorization mechanism for each way communication between them; for example, using OAuth 2.0 authorization tokens issued by a trusted security token service, which could be the SCS itself, and agreeing on a secret and hashing method to encrypt/decrypt JSON Web Tokens (JWT). In one embodiment, that authorization mechanism between the SCS and an application may also comprise functionality that can enable the SCS to authorize other registered applications to access a given subset of the resources of that application; provided that said application authorized the SCS to authorize those other registered applications to access the mentioned resources.

The second mentioned way an application may interact with a SCS is by being associated with the SCS. An application is referred as associated with the SCS if the application exposes a functionality that enables users of the SCS to interact with that SCS, in the context of the application, and also enables the SCS to interact with the application (in particular, with the active view of the application). Such functionality is also referred as SCS Association API. For example, in an embodiment, a web browser application 110 may be associated with a SCS 104 by hosting a web browser extension 130 representing the SCS. That browser extension, which embodies the SCS Association API, may expose a button 134 that symbolizes the SCS. When a SCS registered user clicks that button, the browser may open a new browser window loaded with the SCS's user interface. The SCS's user interface can provide a set of tools that enable the mentioned user to extract content from the web page loaded in the web browser, generate new content, modify the extracted or generated content and send it to a target application registered to the SCS. In another embodiment, the application to be associated with the SCS is responsible for implementing the integration to the SCS association API; meaning that it needs to implement its own SCS User Interface, among other functionality. For example, a file explorer application 112 may expose a button 134 that when clicked opens up a new application window showing a SCS User Interface implemented by the file explorer.

In one embodiment, an application that is registered to a SCS can act as the target of a sharing operation, and an application that is associated with a SCS can act as a source of a sharing operation. In the present document, an application that is registered to a SCS and acts as the target of a sharing operation coordinated by that SCS will be referred as a SCS share target. In the present document, an application that is associated with a SCS and acts as the source of a sharing operation coordinated by that SCS will be referred as a SCS share source.

In one embodiment, once an application is registered to the SCS, besides configuring a secure channel of communication between the application and itself, the SCS keeps a profile record for that application. In that profile (also referred as Application Profile), the SCS stores the settings ruling the interaction between both parties. For example, an Application Profile may contain a list of potential sections of the application that can be target of a sharing operation and the types of content they can receive. It may also contain the types of services the application offers, the organization that authored the application, etc. Said profile record may be stored by the SCS on a database in a database management system, a file in a file system and the like or combinations thereof.

In one embodiment, the process of associating an application with a SCS requires that those applications obtain an association identifier from the SCS. In one embodiment said identifier is required to be included by the associated application in all communications between itself and the SCS. The SCS also keeps a profile record for each application associated to it. That profile (also referred as the association profile) may include, but is not limited to, the association identifier of associated applications, the types of services that said applications offer, the organization that authored those applications, etc. The profile record may be stored by the SCS on a database in a database management system, a file in a file system and the like or combinations thereof.

In addition to the association identifier, a communication between a SCS associated application and the SCS it is associated with may include an identifier of the active view of the associated application. That identifier is also referred as the active view identifier. For example, in one embodiment, an application associated with the SCS may be a web browser 110, the active view would be the web page loaded in that browser 124 and the active view identifier would be the URL of said web page. For another example, in an embodiment, an application associated with the SCS may be a PDF Visualizer 118, the active view would be the PDF file being visualized and the active view identifier would be the Portable Document Format (PDF) file identifier, when present.

Users register to a SCS by creating an account. The SCS also keeps a profile record for each registered user, which may be stored by the SCS on a database in a database management system, a file in a file system and the like or combinations thereof.

In one embodiment, SCS share sources enable that SCS's users log into their accounts and remain logged in for a given period of time if opted by them.

A user that is registered to a SCS can link its SCS account to each of its accounts on applications that are registered to the same SCS. Regarding that process, the user may be referred as linking or linked user, the applications as linked applications and the link of the two as user-application linkage. In one embodiment, the user-application linkage process comprises the user to authorize the SCS to perform some actions on those applications on its behalf. In one embodiment, the establishment of a user-application linkage comprises the SCS and the application to agree on a common identifier for that user, to be used in the context of communications between the SCS and the linked application. Said user identifier is referred as linkage user id. In one embodiment, a linkage user id is unique for each linkage between SCS registered user accounts and CSC registered application user accounts.

Besides the agreement on a common user identifier, a user-application linkage comprises each linked application to maintain and make available to the SCS an up to date record of the user's sharing settings regarding that application. In one embodiment that record (also referred as Linkage Profile) resides on the SCS. Alternatively, in another embodiment, the Linkage Profile resides on the linked application. Said profile record may be stored on a database in a database management system, a file in a file system and the like or combinations thereof. In one embodiment, a Linkage Profile may store a set of OAuth 2.0 tokens to be used by the SCS to perform certain actions on the linked application on behalf of the linking user. Further details related to the structure of a Linkage Profile will be provided in subsequent sections of this document.

Figure 2:
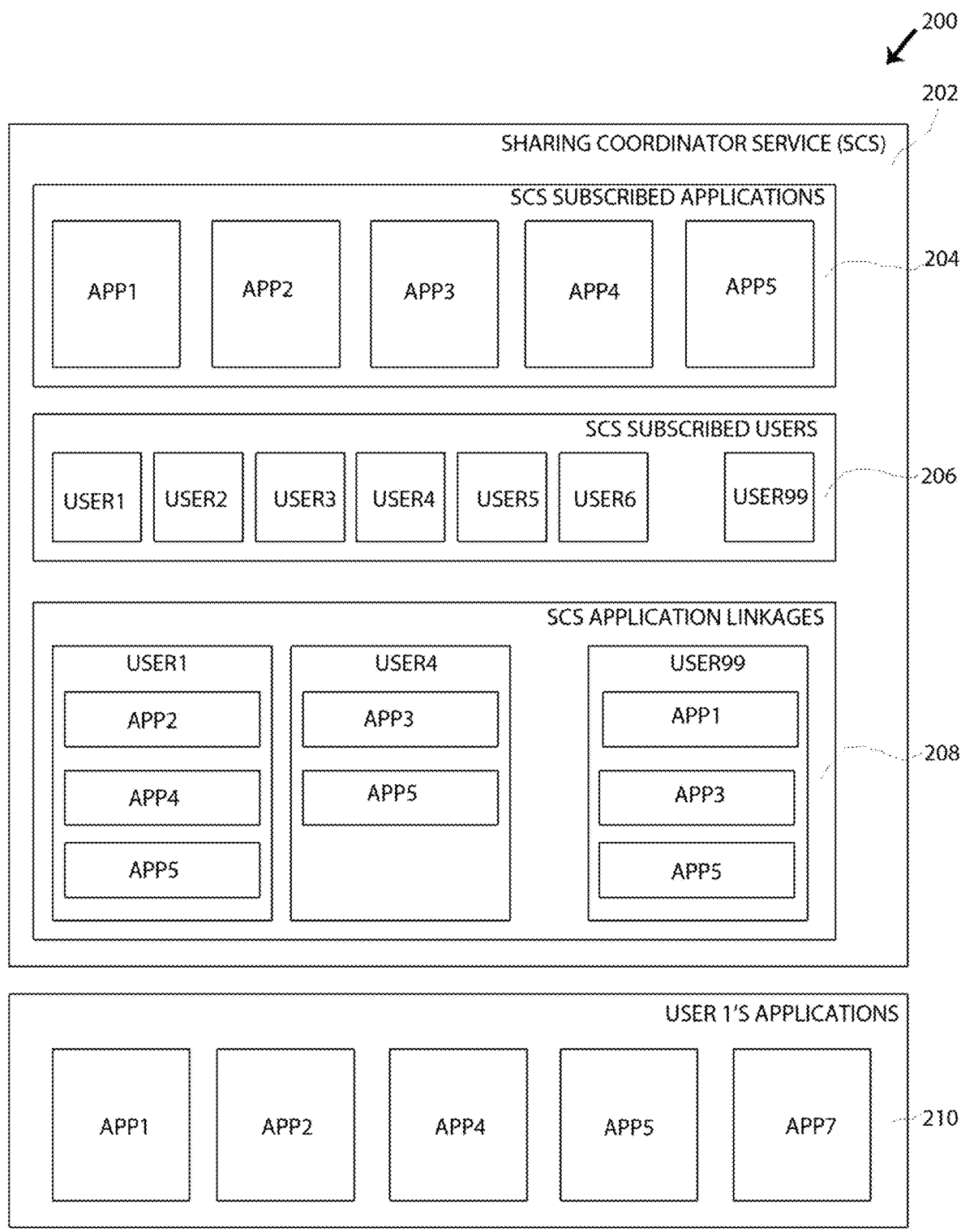
FIG. 2 is a simplified block diagram depicting an example of some elements of a SCS, according to an embodiment of the present invention.

FIG. 2 is a simplified block diagram 200 depicting an example of some elements of a SCS 202, such as its registered applications 204, its registered users 206 and its user-application linkages 208, according to an embodiment of the present invention. In addition, a list of all applications used by a SCS registered user (user1) is represented 210, regardless of the relationship between said applications and the SCS. By using that SCS, User1 will be able to share content with App2, App4 and App5, since these applications are registered to the SCS (as shown in 204), user1 is a client of these applications (as shown in 210) and user1 has linked its SCS user account to each of its user accounts on those applications (as shown in 208). However, User1 will not be able to share content with App7, although it is a client of App7 (as shown in 210) because App7 is not registered to the SCS. User1 will not be able to share content with App1 either because, although it is a client of App1 (as shown in 210) and App1 is registered to the SCS (as shown in 204), there is no linkage comprising User1 and App1 (as shown in 208).

In one embodiment, the process of creating an account on the SCS for an application that is being registered to the SCS comprises that said application provides the SCS its internet domain name (e.g. "example.com") and that the SCS verifies that said application has exclusive right to use the provided domain name (also referred as "to own the domain").

Figure 3:
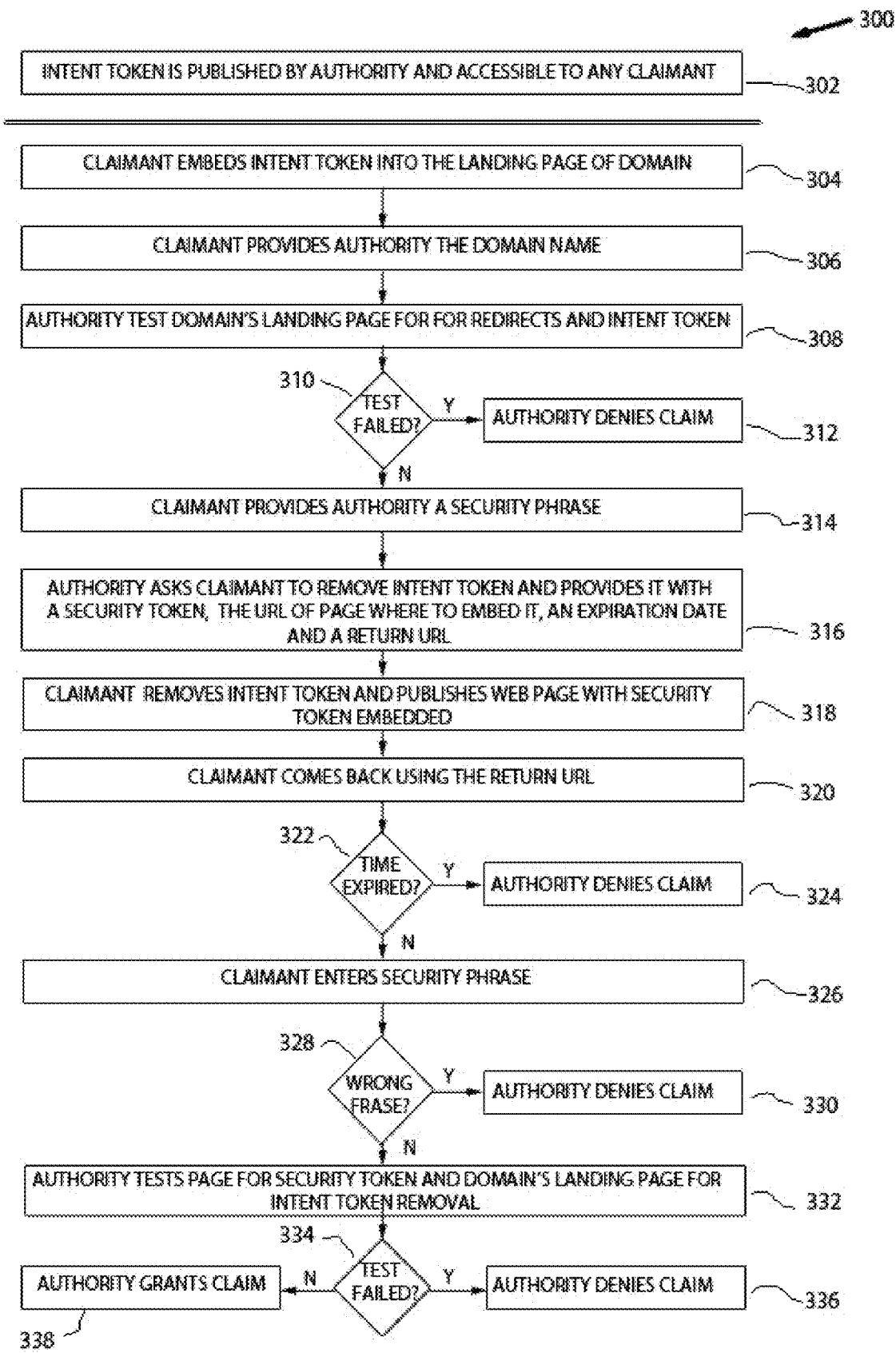
FIG. 3 is a simplified flowchart depicting a high level method for verifying the ownership of a domain name, according to an embodiment of the present invention.

FIG. 3 is a simplified flowchart 300 depicting a high level method for verifying the ownership of a domain name, according to an embodiment of the present invention. The method depicted in FIG. 3 may be performed by software (e.g., program, code, instructions executed by a processor), in hardware, or combinations thereof. The software may be stored on a computer-readable storage medium.

The method for verifying the ownership of a domain name comprises three entities: a Claimant, an Authority and an Audience. The Authority is the application that is going to perform the verification process. The Claimant is the entity that claims to own the domain name. The Claimant could be, but is not restricted to, a user of an application or an application. The Audience is a set of one or more entities to be notified of the outcome of the verification process by the Authority. An Audience's entity could be, but is not restricted to, a user of an application or an application. In the verification process, the Claimant requests the Authority to verify that it owns certain domain name and make the outcome of the verification process available to an Audience. Upon completion of the verification process, the Authority is to issue the Audience a validation statement either granting or denying the claim.

At a high level, the method for verifying the ownership of a domain name can be divided into steps that are performed at configuration time and steps that are performed post configuration time. As depicted in FIG. 3, at configuration time the Authority publishes a token that is available to any potential Claimant willing to use the Authority's domain name verification service (step 302). That token is referred as intent token. An example of intent token is an HTML Meta tag with some distinctive attribute; for instance: <meta name='scs-intent'>. The purpose of the intent token is to prevent Claimants from requesting the Authority to verify the ownership of a domain name they do not own. All subsequent steps are performed at post configuration time.

A Claimant that wants to request the Authority to prove an Audience that it owns a domain name can start the verification process by embedding the intent token, provided by the Authority, into the landing page of said domain (step 304). For example, embedding the HTML Meta tag <meta name='scs-intent'> into the HTML Head tag of the page's HTML code. Immediately after, the Claimant should request the Authority to initiate the process of domain name verification by providing it the claimed domain name (step 306).

Upon receiving the domain name, the Authority navigates to the landing page of the domain and checks that it does not get redirected to a page in another domain. It also parses that landing page's source code to find the intent token (step 308). The next step depends on the outcome of previous actions (step 310). If the navigation was redirected to a page under a different domain or the intent token is not found, the Authority denies the claim; otherwise it moves onto next step.

If no redirects to other domains are detected and the intent token is found on the landing page of the domain, the Authority asks the Claimant to provide a security phrase; and the Claimant provides it (step 314). The security phrase is intended to be remembered by the Claimant as it will be asked for it in a further step.

Upon receiving the security phrase, the Authority provides the Claimant with a security token, the URL of a page under the claimed domain where to embed that token, a return URL and an expiration date. The Authority also indicates the Claimant to remove the intent token from the domain's landing page (step 316). The security token contains a private code that the Claimant is to keep secret; for instance: <meta name='scs-security' value='x74_yrTH22$-108'>. The URL of the page where to embed the security token is also to be kept secret. In said URL, which is under the claimed domain, the Claimant needs to create a web page with the security token embedded and publish it. Immediately after publishing that page and removing the intent token from the domain's landing page (step 318), the Claimant should resume the domain name verification process on the Authority by navigating to the return URL (step 320). The domain name verification process must be resumed before the provided expiration date (step 322); otherwise, the Authority denies the claim (step 324).

Upon resuming the domain name verification process, the Authority asks the Claimant to provide the security phrase in order to verify its identity (step 326). If the Claimant fails to provide the security phrase (step 328), in a number of attempts, the Authority denies the claim (step 330).

Once the Claimant's identity is verified, the Authority attempts to navigates to the web page it asked the Claimant to create, and if it finds it, it parses its source code to find the security token (step 332). In addition, the Authority navigates to the domain's landing page to verify that the intent token has been removed. If the page was created and has the provided security token inside, and the domain's landing page does not contain the intent token (step 334), the Authority grants the claim (step 338); otherwise, the Authority denies the claim (step 336).

In other embodiments, to verify ownership of a domain name the method described above may be modified. For example, the use of a security phrase (on steps 314 and 326) for the purpose of Claimant identity verification may be omitted as the return URL (on steps 316 and 320) also acts as an identity validator.

In one embodiment, in order for the SCS to verify the ownership of a domain name, the method described above is implemented. In said implementation, the Claimant is the application creating an account on the SCS to get registered to that SCS, the Authority is the SCS and the Audience is also the SCS.

Figure 4:
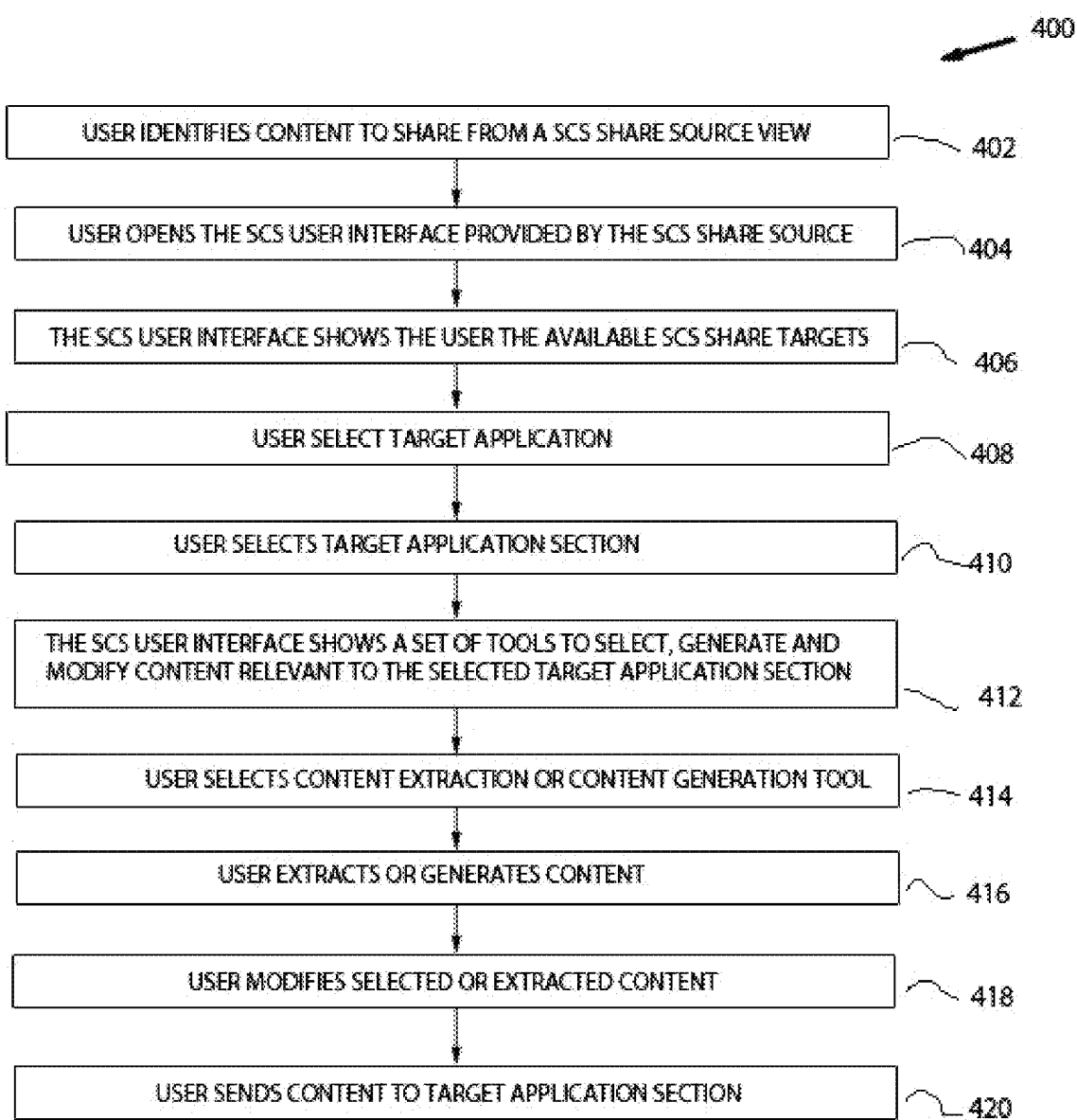
FIG. 4 is a simplified flowchart depicting, at a high level, the sequence of steps comprising a typical sharing experience, according to an embodiment of the present invention.
Figure 5A:
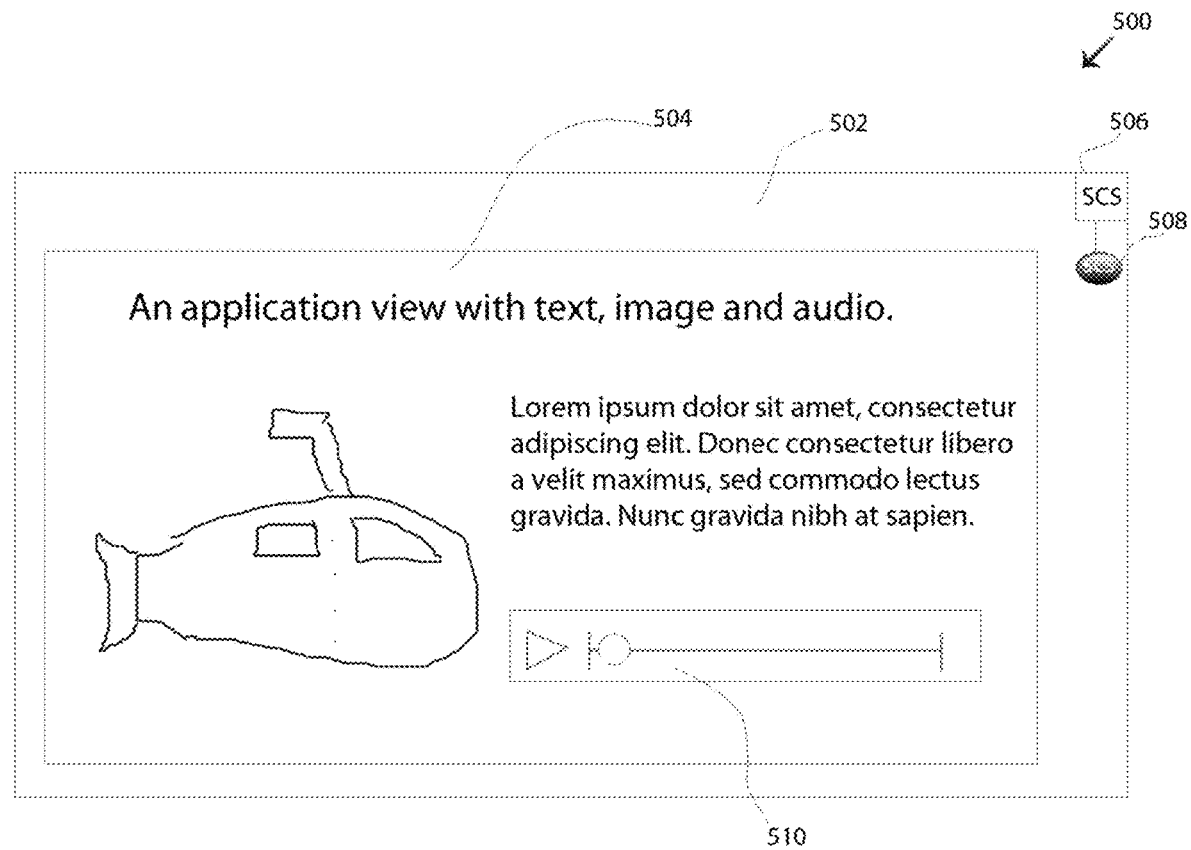
FIG. 5A depicts an example of a SCS share source view containing text, image and audio content, according to an embodiment of the present invention.
Figure 5B:
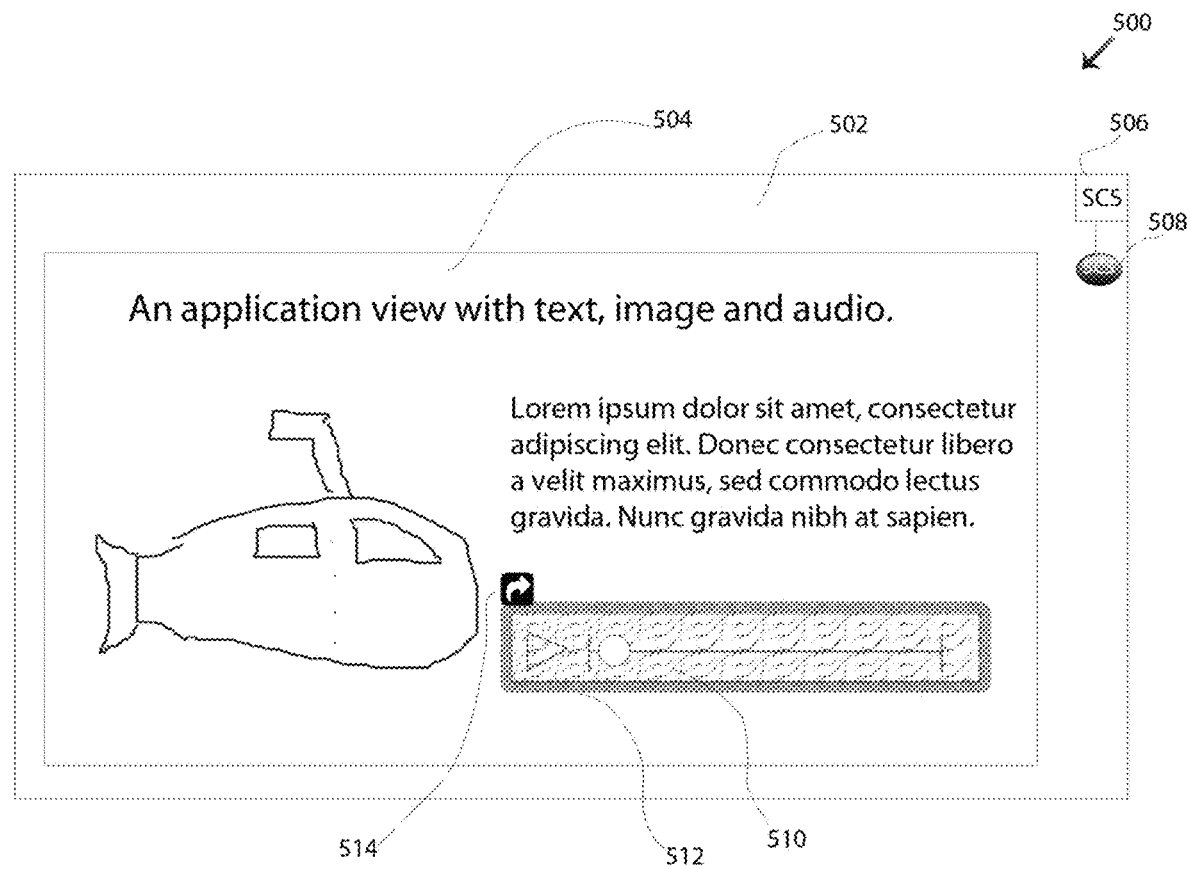
FIG. 5B depict an example of a SCS share source view from where audio content is being selected, according to an embodiment of the present invention.

In one embodiment of the present invention, a typical sharing experience comprises a SCS, a SCS share source, a SCS share target and a user that is registered to the SCS and is also a linked user of the SCS share target. FIG. 4 is a simplified flowchart 400 depicting, at a high level, the sequence of steps comprising said typical sharing experience, according to an embodiment of the present invention. FIGS. 5A and 5B depict an example of a typical SCS share source from where an audio content is being selected, according to an embodiment of the present invention. FIGS. 6A, 6B, 6C, 6D, 6E, 6F, 6G and 6H depict examples of typical views of a SCS user interface when a user is performing the sharing operation, according to an embodiment of the present invention.

In a typical sharing experience, upon identifying some content to share from a SCS share source view (step 402), a SCS registered user clicks a button 508 on the SCS share source 502 (FIG. 5A) to open the SCS user interface 602 (FIG. 6A) in an independent window (step 404). If the user is not logged into the SCS, it is prompted to log into its SCS account. Once the window is opened and the user is logged in, the SCS user interface loads a view that shows the user a list of SCS share targets (step 406). Such view is referred as the SCS Share Targets view 604. The SCS share targets 608 shown are the user's linked applications. Subsequently, the user selects a target application to share content with (step 408); for example, the Media Player One application (120 in FIG. 1). Upon that selection, the SCS user interface loads a view, referred as the SCS Sharing Interface 606 (FIG. 66).

Figure 6A:
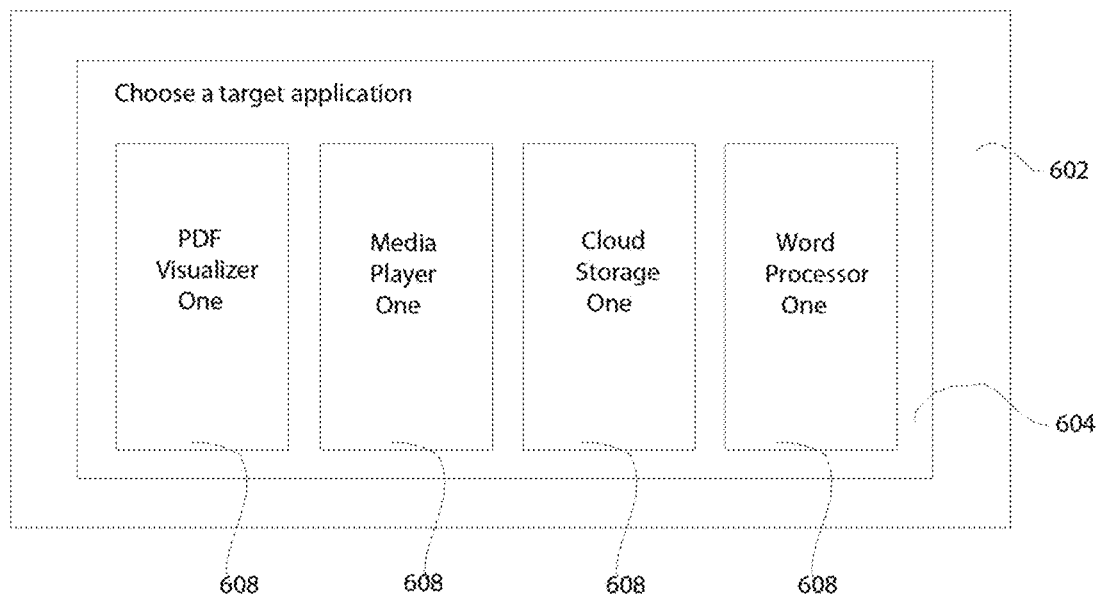
FIG. 6A depicts an example of a SCS Share Targets View, according to an embodiment of the present invention.
Figure 6B:
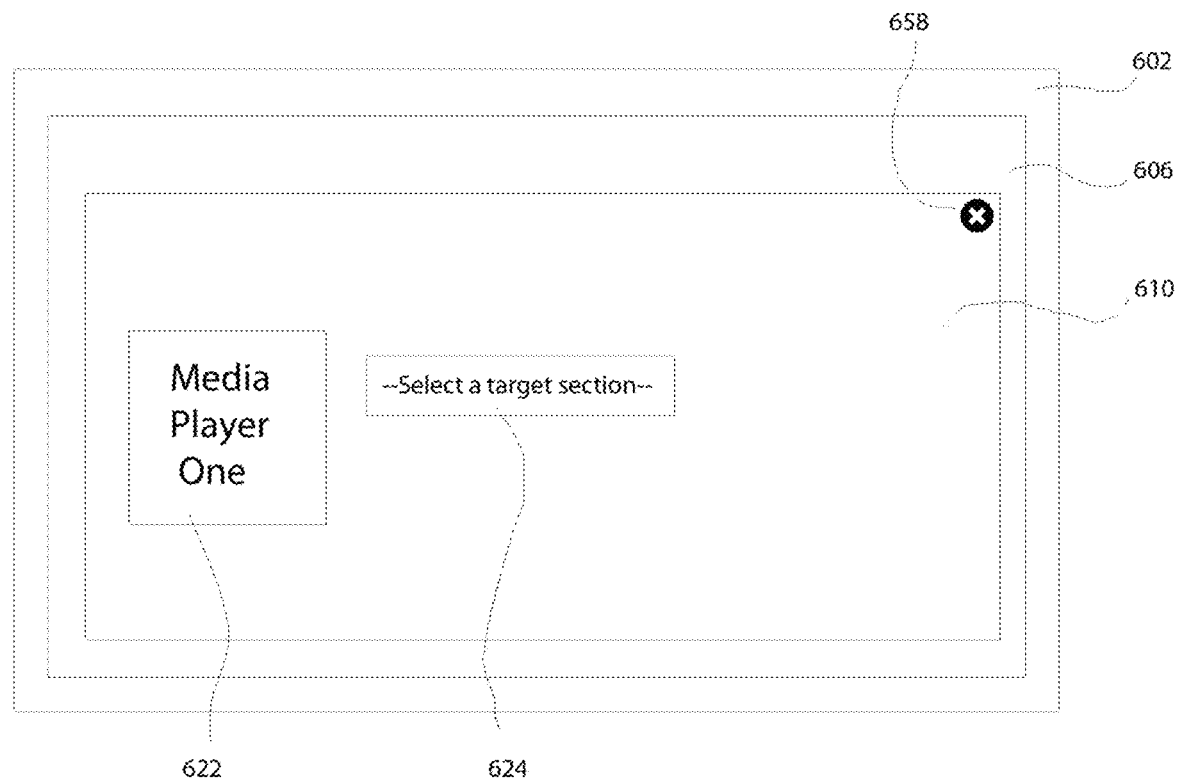
FIG. 6B depicts an example of a SCS Sharing Interface where a target application has been selected, according to an embodiment of the present invention.
Figure 6C:
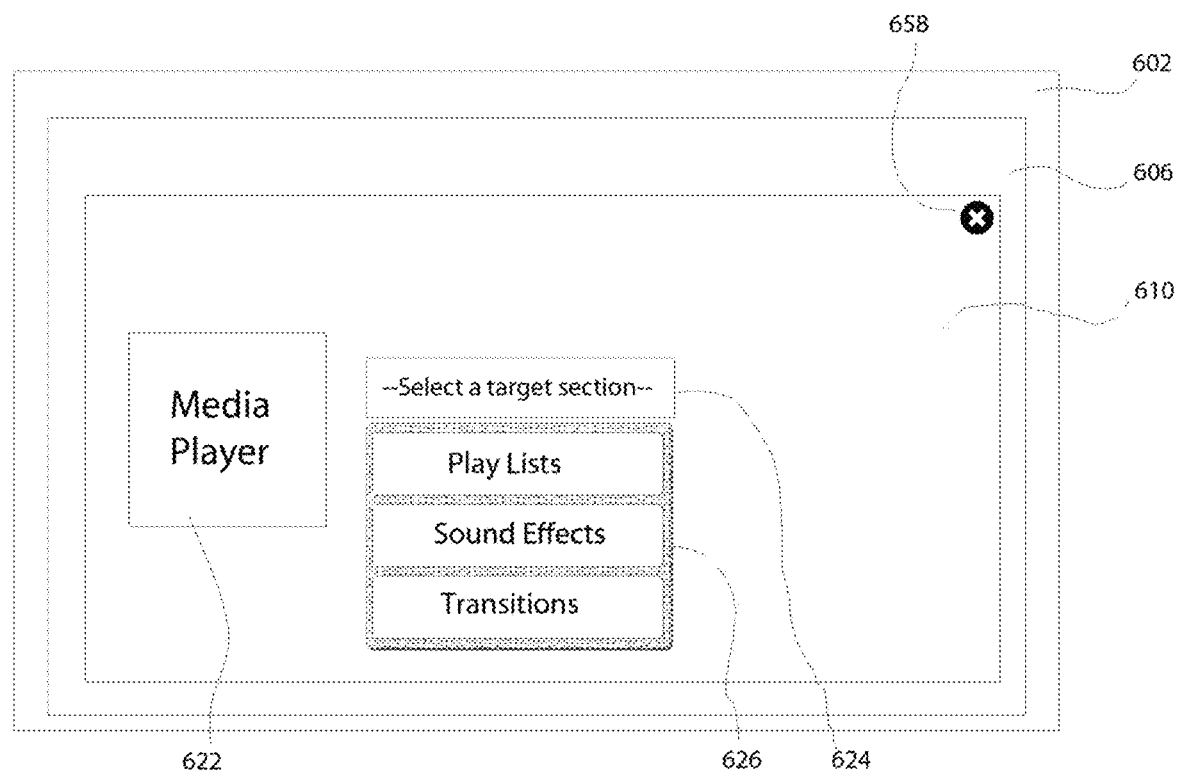
FIG. 6C depicts an example of a SCS Sharing Interface showing a menu from where an application target section can be selected, according to an embodiment of the present invention.
Figure 6D:
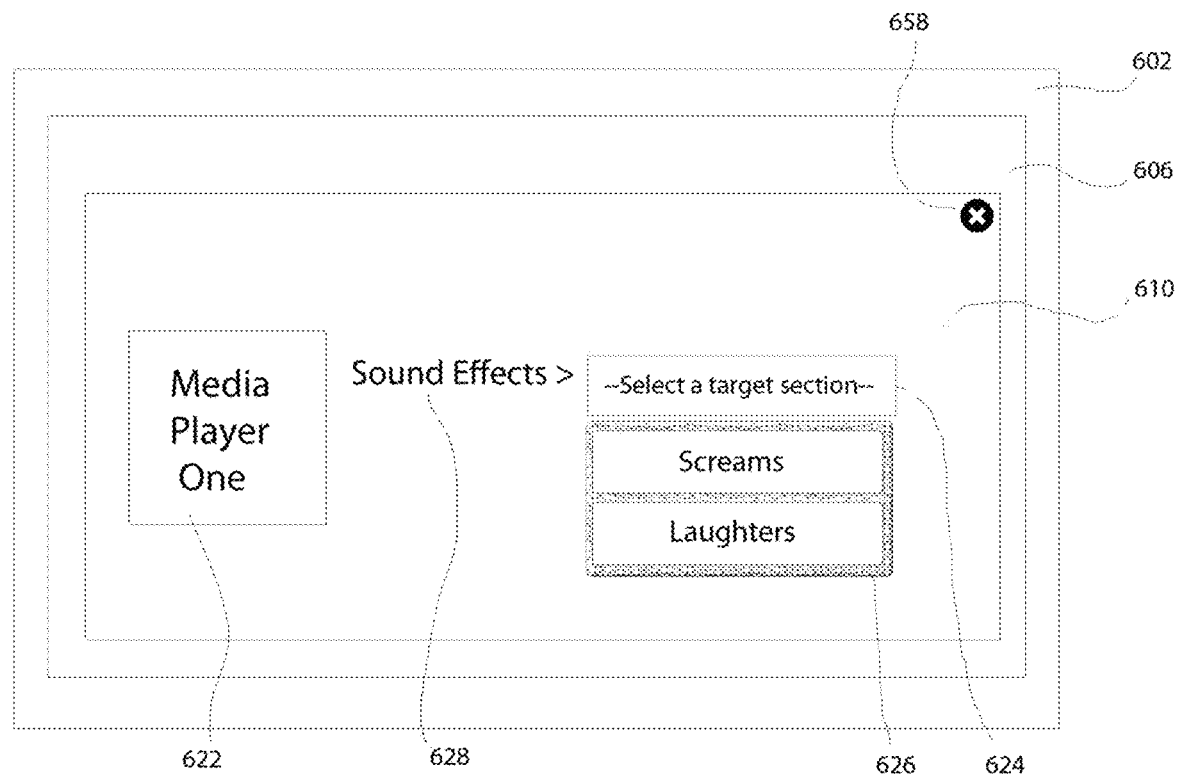
FIG. 6D depicts an example of a SCS Sharing Interface showing a menu from where an application target section is being selected, according to an embodiment of the present invention.
Figure 6E:
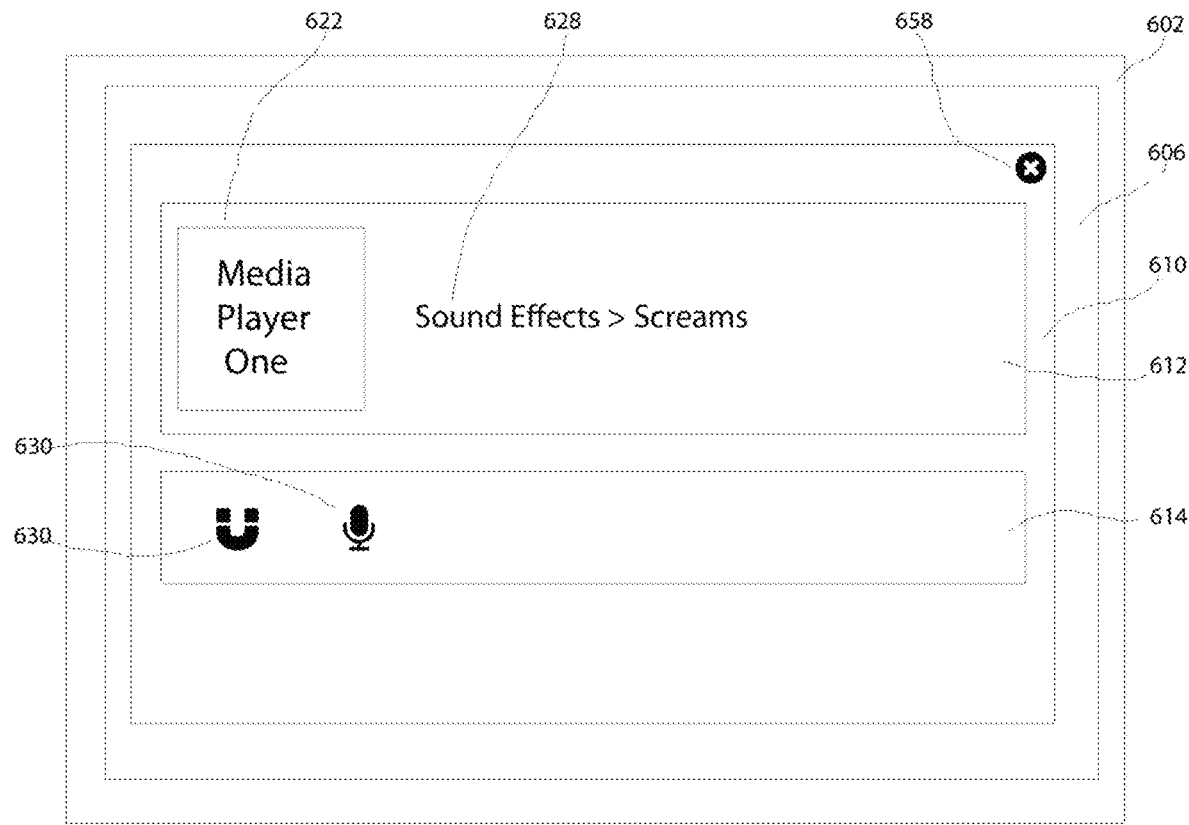
FIG. 6E depicts an example of a SCS Sharing Interface where an application target section is selected, according to an embodiment of the present invention.

The SCS Sharing Interface 606 comprises a destination section 610 where the user indicates the section of the target application 622 that is going to receive the content to be shared. To specify a target section, the user clicks the dropdown control 624 which consequently shows a list of sections 626 (FIG. 6C), of that application, that can be targets of the sharing operation. Next, the user selects a section; for example, "Sound Effects", and in response that section gets rendered as selected 628 (FIG. 6D). If the selected section had sub-sections, the dropdown 624 gets shown again and upon clicking it 626 appears showing the list of available subsections. That process repeats until a destination section gets finally selected and rendered 628 (FIG. 6E) (step 410). In FIG. 6E the target section 628 is the sub-section "Screams" of the "Sound Effects" section of the application Media Player One 622.

Upon the selection of a target application section, the SCS Sharing Interface gets configured according to the types of content said target application section may receive. The tooling section 614 includes different types of tools 630 such as content selection tools and content generation tools. A magnet tool is a content selection tool that enables the user to select content from the active view of the SCS share source. A microphone tool, which is an example of a content generation tool, enables the user to record sounds. The tools shown in the tooling section 614 are tools that can be used to select or generate the type of content the selected target application section may receive (step 412); in the particular case of this example: media content.

Figure 6F:
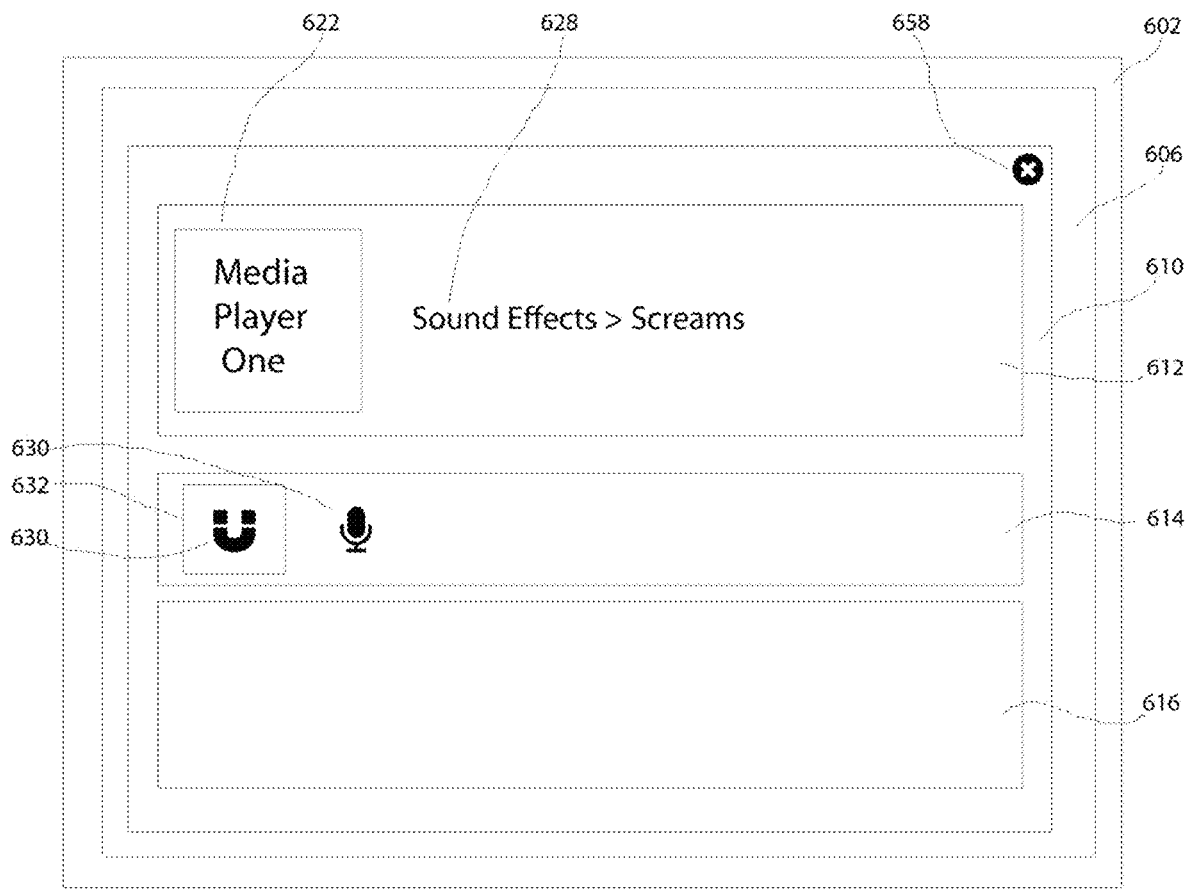
FIG. 6F depicts an example of a SCS Sharing Interface where a content sharing tool is selected, according to an embodiment of the present invention.

The user may activate the magnet tool in order to extract the desired content from the SCS share source view (step 414). It activates said tool by clicking the magnet icon, which gets highlighted showing that the magnet tool is active 632 (FIG. 6F). Upon activating a tool contained in 614, the SCS Sharing Interface shows, if no present, a content section 616 where selected or generated content is to be temporarily kept before it is shared with the target application. Only one tool in 614 is active at a time.

Having the magnet tool active 632 (FIG. 6F), the user extracts the desired content from the SCS share view (step 416). As the user moves a pointing device such as a mouse over content in the active view of the SCS share source, the SCS tests whether the content at the current pointer position can be made sharable or not. FIG. 5A depicts an audio content 510 in a SCS share source view 504 that is to be extracted by a user. If the content at current position can be shared with the selected application target section, the SCS share source view highlights that content; for example in FIG. 56, by showing a textured surface overlay, a border 512 surrounding that content and a button to perform the extraction 514. Once button 514 is clicked, the selected content is inserted into the content section 616.

Figure 6G:
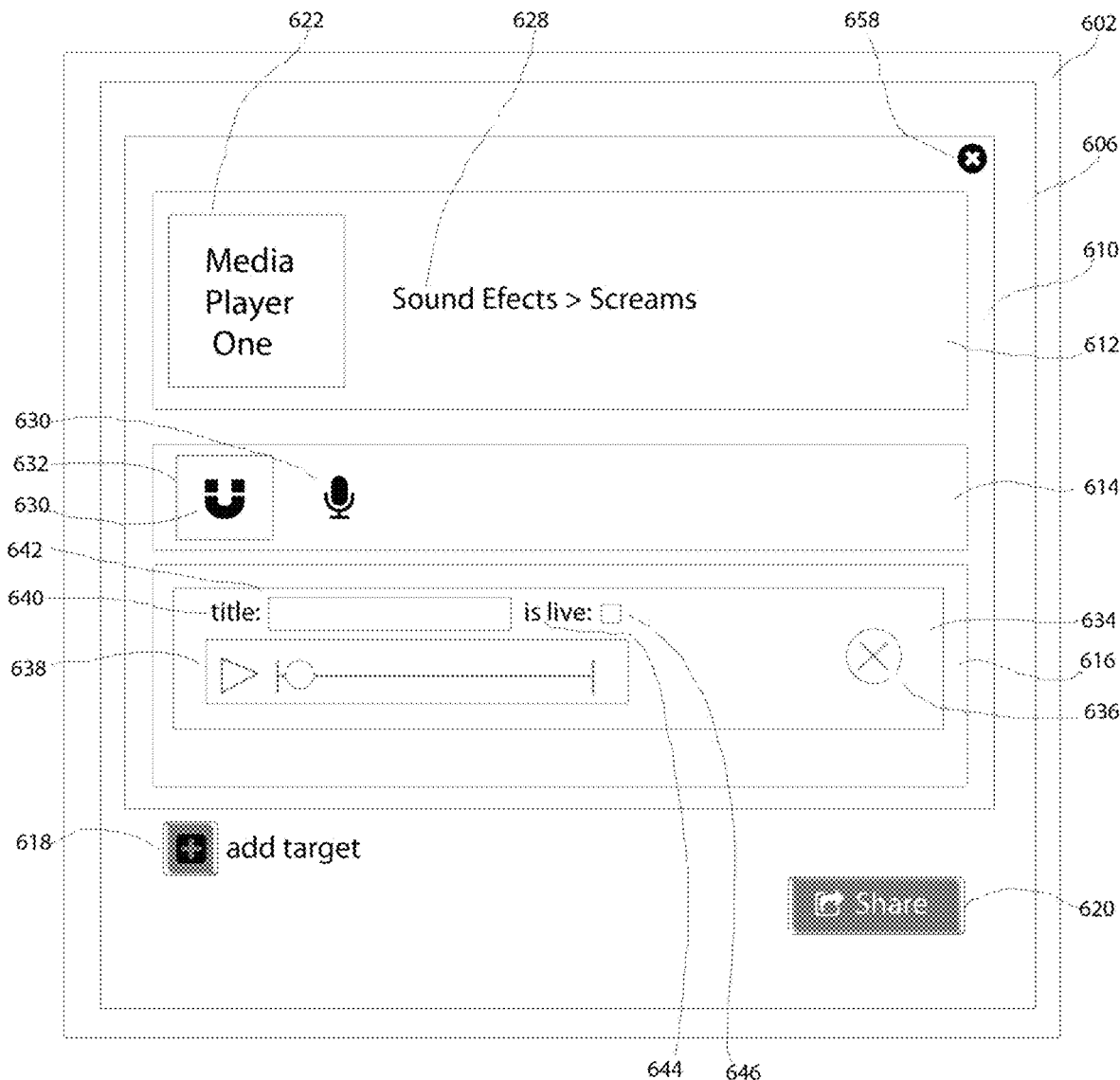
FIG. 6G depicts an example of a SCS Sharing Interface where an audio content instance is temporarily loaded, according to an embodiment of the present invention.

FIG. 6G depicts an example of a typical SCS Sharing Interface 606 with audio content loaded into its content section 616. Upon the content is loaded into 616, buttons 618 and 620 appear on 606. Button 620 is used to submit content in sections 616 to their corresponding targets, and button 618 is used to create new target-scoped sharing regions 610. All elements inside 610 in FIG. 6G are relative to sending content with the route "Sound Effect>Screams" of the media player application. However, in some embodiments, the SCS Sharing Interface supports multi-target sharing experiences. Button 618 represents an instrument to add a new target. When 618 is clicked, a new target-scoped sharing region 610 is created and a process similar to the one so far described can be performed for a new target. A target-scoped sharing region 610 can be removed from 606 by clicking its corresponding remove button 658.

The content section 616 holds any extracted or generated content 638 inside a content editing section 634. Inside content editing sections users modify the extracted or generated content according to a set of specifications that the target application 622 may have indicated to the SCS for its section 628. For example, application Media Player One may have indicated to the SCS that audio content coming into the sub-sections of its "Sound Effect" section should have a title and should indicate whether or not the audio content was recorder live (e.g., recorded from a concert). As a consequence, when sharing content with the "Sound Effects>Screams" section 628 of Media Player One 622, the SCS sharing interface shows label 640 and text box 642 to enable the user to enter a title, and a label 644 and check box 646 for the user to indicate whether or not the audio is live.

Figure 6H:
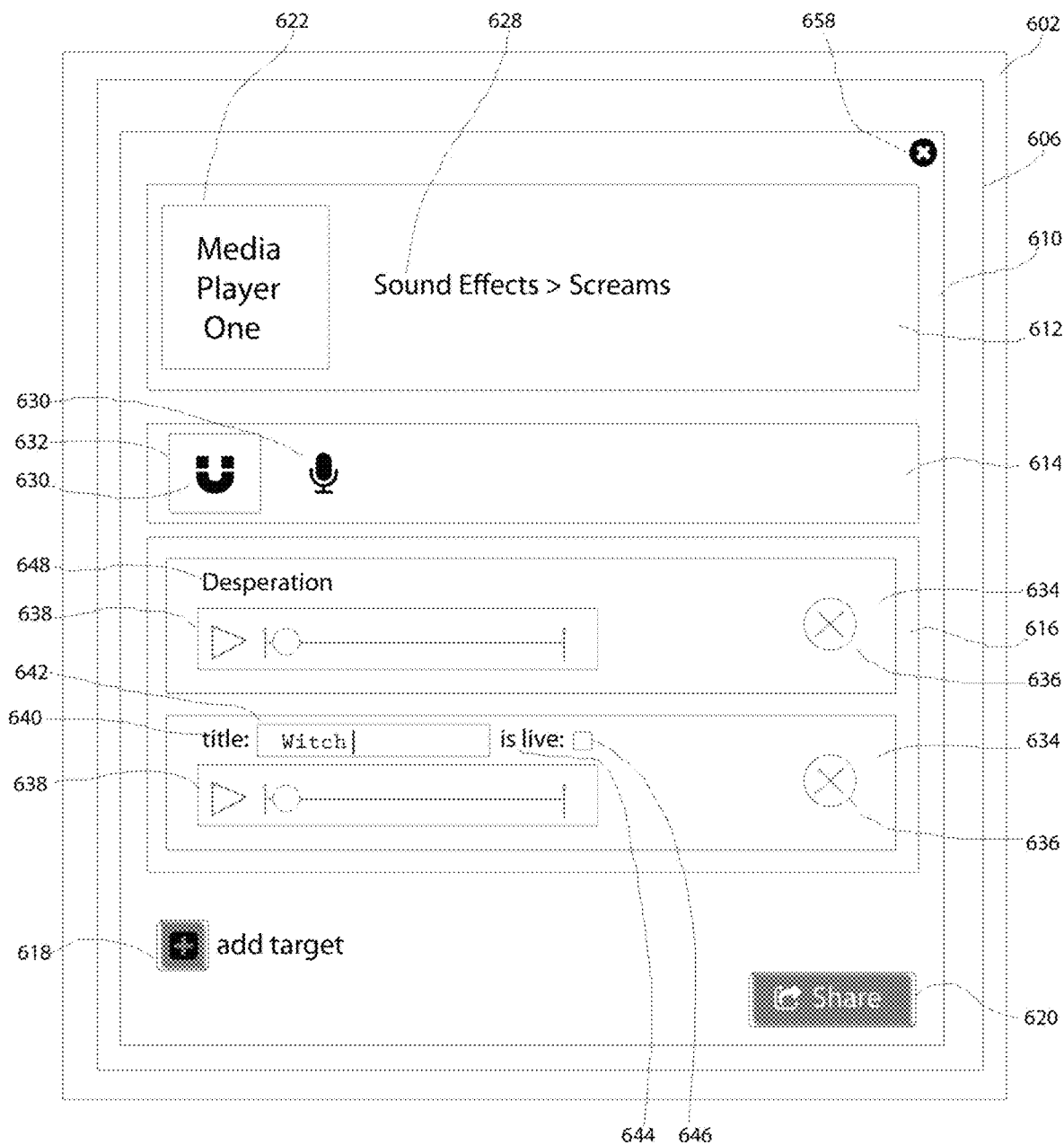
FIG. 6H depicts an example of a SCS Sharing Interface where the content to be shared is being edited, according to an embodiment of the present invention.

In addition to editing tools like 642 and 646, a content editing section 634 also comprises a button 636 to remove itself from the content section 616. In FIG. 6H the content section 616 contains two content editing sections 634 with audio content 638. In the first one, the title has already been entered by the user and is shown rendered 648. In the second one, the user is still typing the title in the text box 642 (step 418).

Finally, on a typical sharing experience, the user clicks the Share button 620 to send the content in the content section 616 to section 628 of the target application 622 (step 420).

Figure 7:
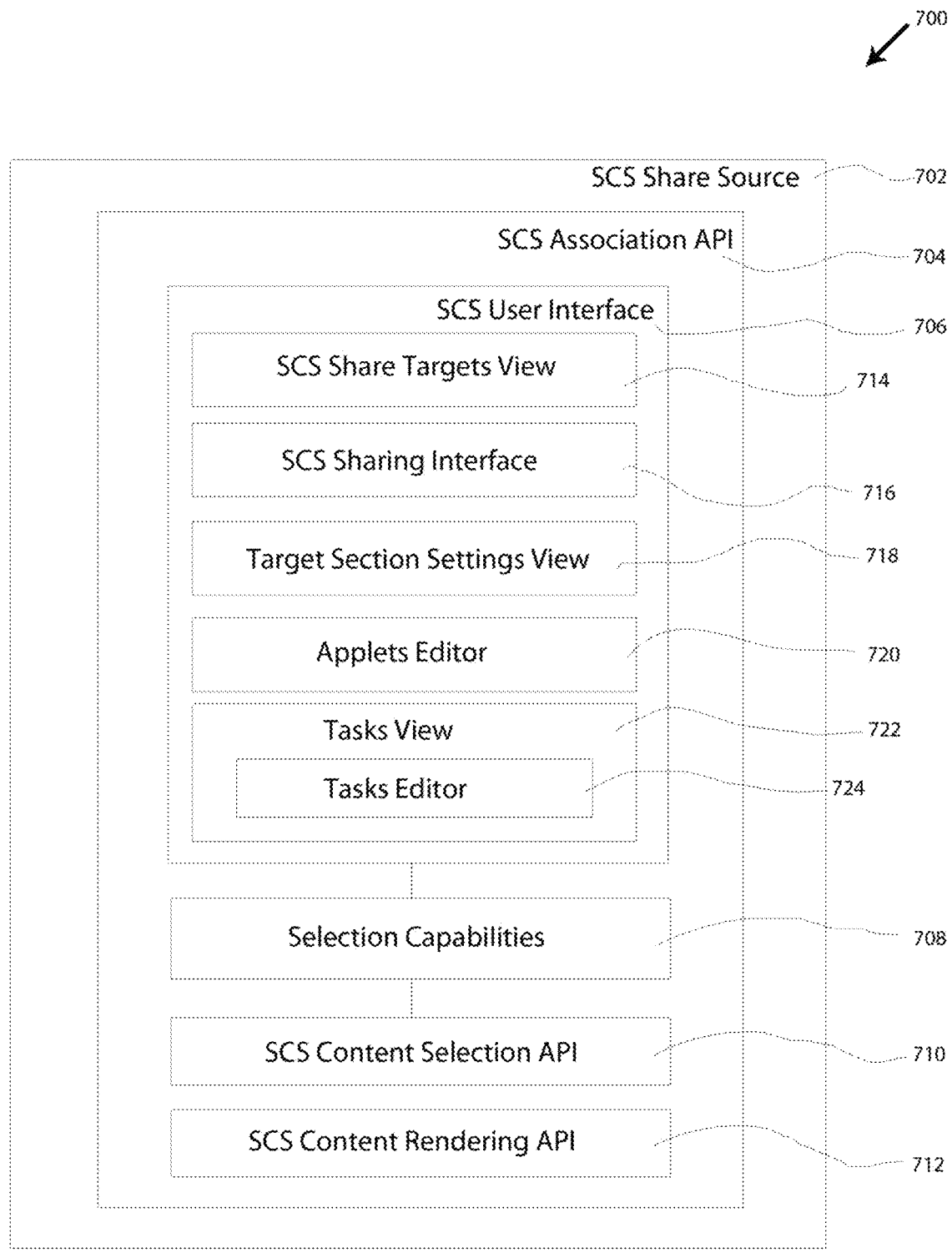
FIG. 7 is a simplified block diagram depicting some of the components of a SCS share source's Association API, according to an embodiment of the present invention.

In one embodiment, the process of sharing content from a SCS share source is managed by the SCS through the SCS share source's Association API. FIG. 7 is a simplified block diagram depicting the different components of the SCS share source's Association API 704, according to an embodiment of the present invention. A SCS Association API 704 integrated with a SCS share source 702 comprises four main components: the SCS User Interface 706, the Selection Capabilities 708, the SCS Content Selection API 710 and the SCS Content Rendering API 712.

The SCS User Interface 706 enables users of the SCS to interact with that SCS, in the context of the SCS share source. It comprises the following components: The SCS Share Targets View 714, the SCS Sharing Interface 716, the Target Section Settings View 718, the Applets Editor 720 and the Tasks View 722. The SCS Share Targets View 714 (also 604 of FIG. 6A) enables users to select a target application from a displayed list of their linked SCS share targets 608. The SCS Sharing Interface 716 (also 606 of FIGS. 6B-6L) enables users to specify a target section for each SCS share target selected by the user. In addition, it provides a set of tools for extracting, generating and modifying content to be sent to the share targets, and a button for sending the content to those targets. Components 718, 720, and 722 will be covered in upcoming sections of the present document.

The SCS Content Selection API 710 provides the SCS share source with functionality that enables the user to easily select, extract and generate content from the SCS share source's active view and insert it into the SCS Sharing Interface 716. In one embodiment, the SCS Content Selection API 710 enables the user to identify sharable content by visually highlighting said content, for example, using borders.

The Selection Capabilities 708 is a component that coordinates the interaction between the SCS User Interface 706 and the SCS Content Selection API 710. It comprises content type related information that indicate to the SCS Content Selection API 710 what content types are to be made sharable. That information is updated by the SCS Sharing Interface 716 when a target application section is changed; for example, when the section "Sound Effects>Screams" 628 (FIG. 6F) is selected, the Selection Capabilities 708 gets updated with information about the content types that the application Media Player One 622 indicated to the SCS could be received by that application section (e.g., audio and video content). That information is used by the SCS Content Selection API 710, for example, to configure the magnet tool to select content of those types only.

The SCS Content Rendering API 712 enables the SCS to modify the visual elements of the SCS share source's active view. Further details about it will be provided in subsequent sections of this document.

The SCS User Interface 706 is the application that enables a SCS registered user to communicate with the SCS from the SCS share source 702 (also 502 of FIGS. 5A-5E) into which it is integrated. In one embodiment, when the user notifies the SCS share source its intention to share some content from its active view (e.g., the user clicks 508), it loads the SCS User Interface 706 into an application view. Initially, that SCS User Interface shows the SCS Share Targets View 714 (also 604 of FIG. 6A). In one embodiment, the application view into which the SCS User Interface is loaded is created in an independent window. In an alternate embodiment, said application view is the active view; therefore the SCS User Interface gets embedded into it.

The SCS Share Targets View 714 (also 604) shows a list of SCS share targets 608 to which the active user is linked (also referred as the active user's share targets). In that view the user selects a desired SCS share target to send content to. Applications 608 represent the active user's share targets. Upon the selection of one of them, the SCS User Interface 706 transitions to the SCS Sharing Interface 716, enabling the user to manage the sharing process. An example of the different states through which a SCS Sharing Interface transits in a typical sharing experience was described above, and is depicted on FIGS. 6B-6H.

Figure 6I:
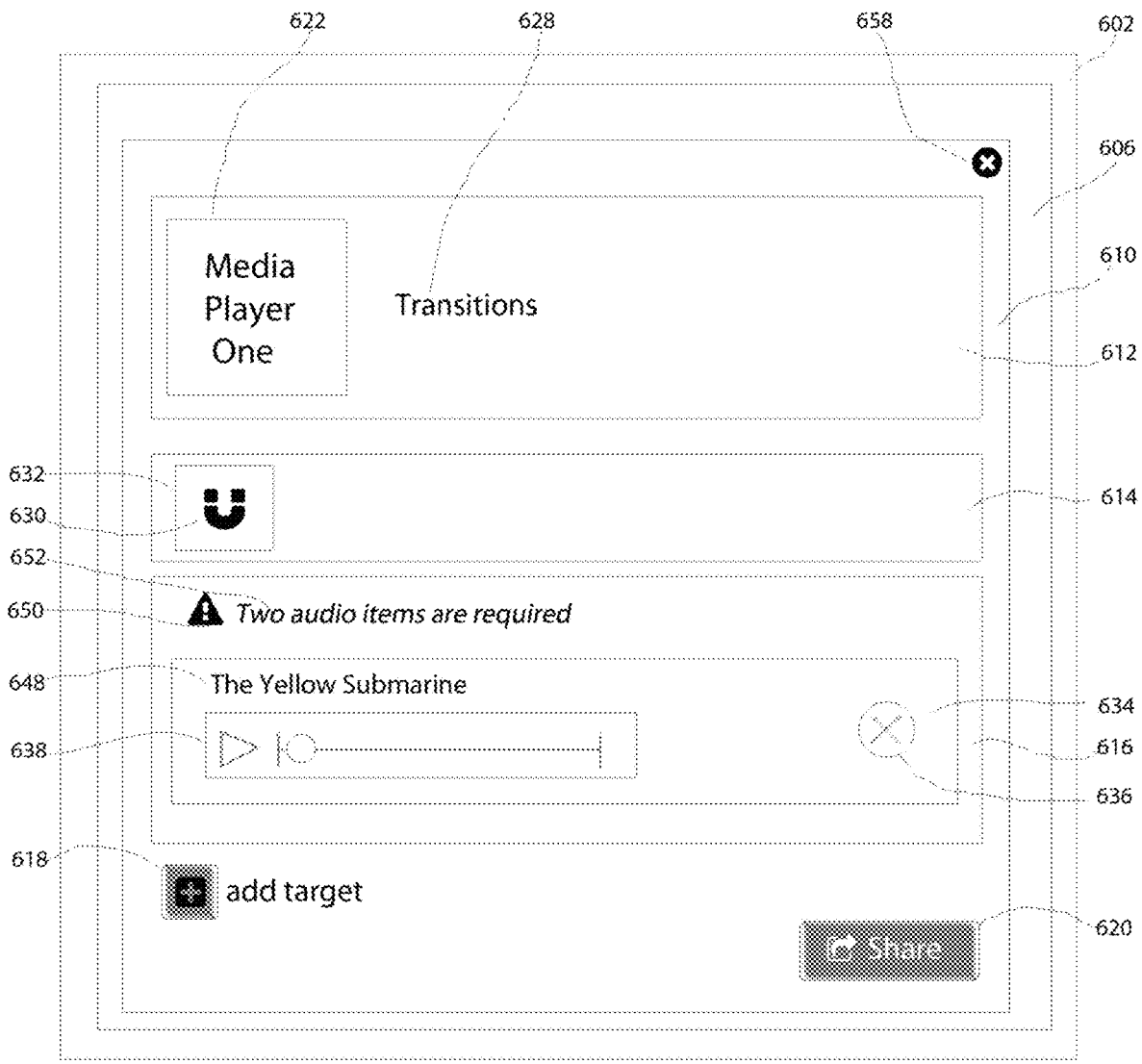
FIG. 6I depicts an example of a SCS Sharing Interface where the content to be shared does not satisfy the necessary requirements, according to an embodiment of the present invention.

In one embodiment, the SCS Sharing Interface enables a user to share content with multiple targets. FIG. 6K depicts an example of how a SCS Sharing interface 606 in a SCS user interface 602 may be structured to manage multi-target sharing, according to an embodiment of the present invention. A SCS Sharing Interface may contain one or more target-scoped sharing regions 610. Those regions scope the functionality of the SCS Sharing interface to a specific share target. The Add target button 618 dynamically appends a new target-scoped sharing region 610 to 606; whereas, 658 removes those regions from 606. In one embodiment, if all target-scoped sharing regions 610 are removed from the SCS Sharing Interface 606, then 606 gets removed from the SCS User Interface 602 and the SCS Share Target View 604 is loaded into 602 instead. The Share button 620 is used to submit the content to be shared to their corresponding targets.

FIG. 6H depicts an example of a SCS Sharing Interface 606 with one target-scoped sharing region 610. In one embodiment, target-scoped sharing region comprises a destination section 612, a tooling section 614 and a content section 616.

The destination section 612 enables the user to specify the section 628 of the target application 622 that is going to receive the content to be shared. In one embodiment, the destination section 612 may initially show the target application identifier 622 and a drop down control 624 as depicted in FIG. 6B. FIGS. 6C-6E depict how the user can select a target section 628 by expanding the drop downs 624 and choosing the desired application subsections that make the target section from the menus 626.

In one embodiment, the tooling section 614 may include different types of tools such as content selection tools and content generation tools 630. A magnet tool is a content selection tool that enables the user to select content from the active view of the SCS share source into the content section 616. A microphone tool, which is an example of a content generation tool, enables the user to record sounds into the content section 616.

The content section 616 holds any extracted or generated content 638 inside a content editing section 634. Inside content editing sections, users can modify the extracted or generated content according to a set of specifications that the target application 622 may have indicated to the SCS for the target section 628. The set of specifications may represent additional information to be appended to the content such as text properties (e.g., a title), Boolean properties (e.g., a flag indicating if the audio track was recorded live), etc. For example, application Media Player One may have indicated to the SCS that audio content coming into potential subsections of its "Sound Effect" section should have a title (text property). As a consequence, the SCS sharing interface shows label 640 and text box 642 to enable the user to enter a title for the audio content that is to be shared with the section "Sound Effects>Screams" of Media Player One. Likewise, Media Player One may have indicated to the SCS that audio content coming into the sub-sections of its "Sound Effect" section should have an "Is Live" flag pointing out whether or not the audio track was recorded live (e.g., from a concert). As a consequence, the SCS sharing interface may shows a label 644 with the text "Is Live" followed by a check box 646 for the user to indicate the flag value.

In addition to editing tools like 642 and 646, a content editing section 634 also comprises a button 636 to remove itself from the content section 616.

The magnet tool enables users to extract content from the SCS share target's active view 504 (in FIGS. 5A and 5B) into content sections 616. In one embodiment, regardless of the number of target-scoped sharing regions 610 existing in a SCS Sharing Interface, only a magnet tool can be active at a time within that SCS Sharing Interface. The target-scoped sharing region 610 containing the active magnet tool is referred as the active share region. In said embodiment, the Selection Capabilities 708 is aware of the content types each share target, specified in a destination section 612, can receive and is also aware of the active share region.

The SCS Content Selection API 710 provides the SCS share source with functionality that enables the user to easily select, extract and generate content from the SCS share source's active view and insert it into the SCS Sharing Interface 716. In one embodiment, the SCS Content Selection API 710 enables the user to identify sharable content by visually highlighting said content, for example, using borders. The content considered sharable by the SCS Content Selection API 710 are the ones that can be received by the application target section 628 of the active share region 610. These content types are provided to the SCS Content Selection API 710 by the Selection Capabilities 708, which gets updated by the SCS Sharing Interface 716 each time a target section 628 is added, deleted or changed and each time a target-scoped sharing region 610 is activated.

FIG. 5A depicts an example of an active view of a SCS share source containing image, text and audio content. FIG. 5B depicts the same view after the magnet tool has been activated 632 on the SCS sharing interface, and the user has positioned an input device such as a mouse over the audio content 510. Provided that the target application 622 had indicated to the SCS that its section 628 accepts audio content, upon activation 632 of the magnet tool, the SCS Sharing Interface 716 updates the Selection Capabilities 708 so that it indicates to the SCS Content Selection API 710 to make audio content sharable. Upon the user positioning the mouse pointer over the audio content 510, the SCS share source's Content Selection API 710 determines that that content is sharable and consequently displays a textured surface overlay, a border 512 surrounding that content and a button 514. These visual artifacts indicate the user that the content at that position is sharable. By clicking button 514, the user extracts that content from the SCS share source's active view 504 into the SCS Sharing Interface's content section 616 (as depicted on FIG. 6G). If the SCS Sharing Interface had multiple target-scoped sharing regions 610, the extracted content would be inserted into the content section 616 of the active share region.

In one embodiment, when a magnet tool is active 632 and a user moves a pointing device such as a mouse over content in the active view of the SCS share source 504, the SCS Content Selection API 710 tests whether the content at the current pointer position can be made sharable or not. To do so, the SCS Content Selection API 710 progressively parses the content at the current pointer position into the content types indicated by the Selection Capabilities 708. If a successful parsing operation is performed, the content is considered sharable; otherwise it is not. In one embodiment, a parsing operation is considered successful if the instance of the content type produced by the parsing operation is in a valid state. In one embodiment, content type instances comprise a validity flag indicating if an instance meets all requirements indicated by the content type. If a content type instance validity flag is true, the instance is referred as a valid content type instance.

Each time the SCS Content Selection API 710 parses the content at the current pointer position on the active view of a SCS share source, into an instance of a content type, the SCS Content Selection API 710 consults information about the context of the potential share operation of said content, from said active view into the selected target section 628 of the indicated SCS share target 622 in the active share region. Such information is referred as the sharing context.

In one embodiment, the sharing context comprises the following information:
 (1) Relevant information from the SCS Sharing Interface (e.g., the target application section).
 (2) Relevant information about the SCS share source.
 (3) Relevant information about the SCS share target.
 (4) Relevant information about the User.
 (5) Relevant information about the user-application linkage.

For example, suppose Web Browser One 110 is associated with a SCS by hosting a web browser extension, and that it is loaded with a web page whose URL is "http://www.example.com/page1.html". Also, suppose that Web Browser One is authored by a company named Sample Company One. In addition, suppose that the target application is Media Player One 120, authored by Sample Company Two, and the target section is "Sound Effects>Screams". In this example, the sharing context comprises the following information:

```
{
    contentViewId: "http://www.example.com/page.html",
    contentViewOwnerId: "example.com",
    contentTechnology: "HTML",
    sourceId: "Web Browser One",
    sourceAuthor: "Sample Company One",
    sourceServices: ["Web Browser"],
    targetId: "Media Player One",
    targetSectionId: "Sound Effects > Screams",
    targetAuthor: "Sample Company Two"
}
```

In one embodiment, the sharing context is examined by a content type each time the Content Selection API 710 parses content into an instance of that type. A content type may use the sharing context in its parsing logic; therefore, in some instances, the sharing context may determine whether or not content can be made sharable by the Content Selection API 710. For example, a SCS may contain a predefined content type named "InternalImage" representing images, in the HTML technology, that are stored in a web server under the same domain as the web page containing that image. An application registered to that SCS may indicate said SCS that one of its sections can receive content of type "InternalImage". In that example, provided that a user wants to send content from a web page to said application section, when parsing an image content inside a web page under a given domain (e.g., example.com), the Content Selection API 710 passes the sharing context to "InternalImage" and the last one produces a valid "InternalImage" instance, as result of the parsing operation, only if the image's SRC attribute's value is under the given domain.

The sharing context may be used by many different components of the SCS. In one embodiment, the SCS may use the sharing context to determine if a SCS share target enables content to be sent to a section of it from the active SCS share source view. In further sections of the present document it will be detailed how a SCS share target may indicate to the SCS that it must not receive content from a given SCS share source view, as well as other scenarios where the SCS uses the sharing context.

In one embodiment, if the SCS Sharing Interface 606 contains multiple target-scoped sharing regions 610, drag and drop operations may be enabled on the SCS Sharing Interface 606 for the user to duplicate a content, from one content section 616 into another content section 616 that belongs to a target-scoped sharing region 610 containing a target section 628 that can receive the type of content of the content being duplicated. By using this drag and drop functionality, a content that a user want to share to multiple targets can be extracted from the SCS share target's active view only once, and then duplicated into the desired target-scoped sharing regions 610 in the SCS User Interface.

In other embodiments of the present invention alternative sharing approaches may be implemented. For example, in one embodiment, the magnet tool may be activated 520 from the SCS share source active view's context menu 518, as depicted in FIG. 5D. Upon such activation, the SCS Association API 704 updates the Selection Capabilities 708 with information about all content types accepted by any section of any of the user's share targets. Consequently, said content types are made sharable by the SCS Content Selection API 710. When the user selects content of those types and clicks button 514 to extract it, a menu 522 is presented so that the user select the target application section to share that content with, as depicted on FIG. 5E. Upon selecting the target section, a SCS User Interface 602 gets open showing the SCS sharing interface 606 with the selected target section in 612 and the extracted content in 616, as depicted in FIG. 6G.

Figure 8:
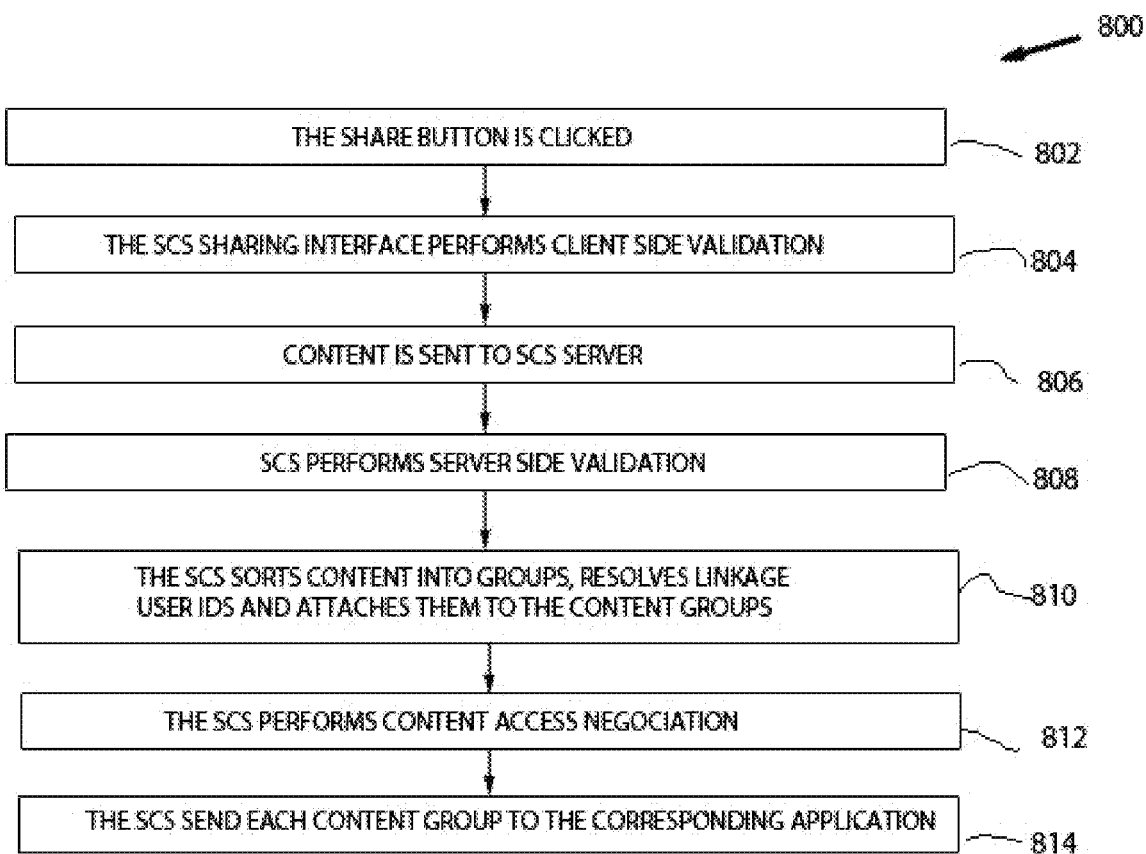
FIG. 8 is a simplified flowchart depicting high level processing performed when a user a user clicks the share button of a SCS Sharing interface, according to an embodiment of the present invention.

A typical user sharing experience concludes when the user clicks the share button 620. FIG. 8 is a simplified flowchart 800 depicting high level processing performed when a user a user clicks the share button 620, according to an embodiment of the present invention. The method depicted in FIG. 8 may be performed by software (e.g., program, code, instructions executed by a processor), in hardware, or combinations thereof. The software may be stored on a computer-readable storage medium.

Figure 9:
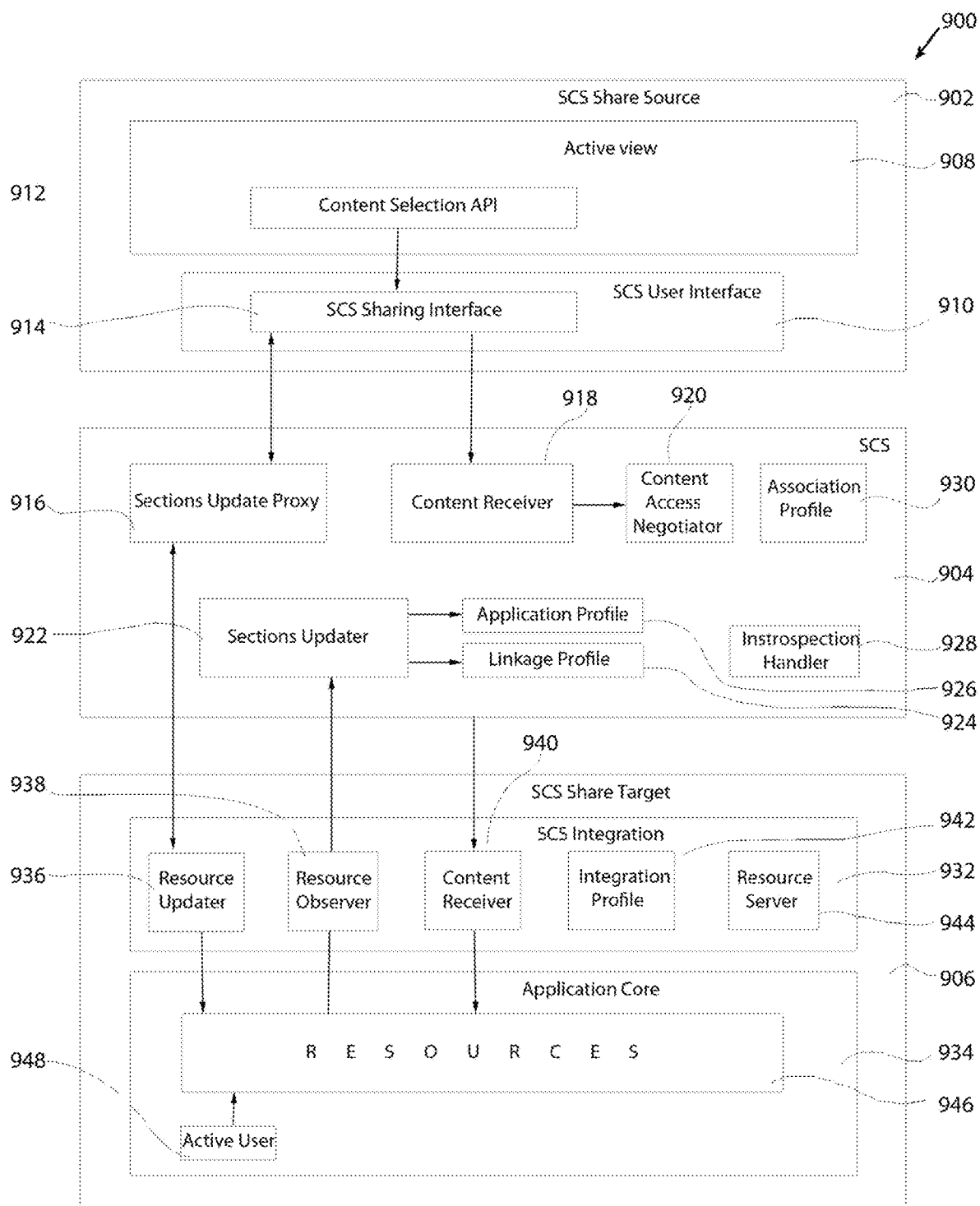
FIG. 9 is a simplified block diagram depicting the interaction of various components of the parties that may participate in a SCS coordinated sharing operation in an embodiment of the present invention.

FIG. 9 is a simplified block diagram 900 depicting the interaction of various components of the parties that may participate in a SCS coordinated sharing operation in an embodiment of the present invention.

Processing may be initiated when a user clicks the share button 620 (step 802). The SCS Sharing Interface 914 may perform a validation process (step 804) to ensure the content to be shared comply all requirements imposed by the target applications to content incoming their corresponding application sections and by other subsystems of the SCS. For example, if the media player application 622 (on FIG. 6G) indicated to the SCS that audio content coming into the sub-sections of its "Sound Effect" section must have a title, the SCS sharing interface must validate that the text box 642 contains some text representing said title.

Upon completion of the validation of the content to be shared, provided that said content is valid, the SCS Sharing Interface 914 sends that content to the SCS server (step 806). The SCS server receives content on its Content Receiver component 918. Content may be sent to the SCS server in a variety of formats such as Extensible Markup Language (XML), JavaScript Object Notation (JSON) and the like. In one embodiment, the data representing content to be sent to the SCS server comprises:

(1) The Sharing Context.
(2) Application defined properties for that content.
(3) Content defined properties.

For example, the first audio content depicted in FIG. 6H is titled "Desperation" and is enclosed in a content editing section 634. The title 648 was asked to be entered by the user in response to a requirement indicated by the application 622 to the SCS regarding audio content to be sent to subsections of its "Sound Effect" section 628. That Title property is an example of an application defined property. The content type "Audio", of which the extracted content 638 is an instance, was selected by the application from a list of content types that are preset on the SCS when indicating the type of content subsections of its "Sound Effect" section would be able to receive.

Content types preset on the SCS expose a list of properties that characterize themselves, which are referred as content properties. For example, Audio content preset on the SCS may expose a property called "SourceUrl" where instances of the Audio type indicate a URL for the audio file.

A portion of the data representation of the "Audio" content type instance titled "Desperation" enclosed in section 634 depicted on FIG. 6H may be described as follows:

(1) Sharing Context:

```
{
contentViewId: "http://www.example.com/page1.html",
contentTechnology: "HTML",
sourceId: "Web Browser One",
sourceAuthor: "Sample Company One",
sourceServices: ["Web Browser"],
targetId: "Media Player One",
targetSectionId: "Sound Effects > Screams",
targetAuthor: "Sample Company Two"
}
```

(2) Values of application defined properties for the "Audio" content instance: {Title="Desperation", IsLive=true}
(3) Values of content defined properties for the "Audio" content instance: SourceUrl="http://www.example.com/scream1.mp3"

A second validation process is performed by the SCS's Content Receiver 918 (step 808). The purpose of that server side validation process is to verify the integrity of the data received, since the SCS Sharing interface may have been tampered by an attacker. For example, the validation process may verify that a linkage exists between the user and the target applications the content is to be shared with. It may also verify that the user is authorized to access the target application sections on their corresponding applications and that those target application sections can accept the type of content being sent to them. In addition, the server side validation process may verify that the content to be shared comply all requirements imposed by the target applications to content incoming their corresponding application sections.

After validation, the SCS's Content Receiver groups the content by target application and replaces the user Id with the linkage user id (step 810). FIG. 6L depicts an example of a SCS sharing interface comprising three target-scoped sharing regions 610, according to an embodiment of the present invention. In that example, the content is to be shared with two applications: Media Player One and Cloud Storage One. Media Player One is to receive content into two different sections, whereas Cloud Storage One is to receive content into just one section. Also in that example, the SCS's Content Receiver sorts the content to be sent into two groups, one corresponding to Media Player One and the other one to Cloud storage One. The SCS attaches to those groups the linkage user ids corresponding to each application respectively.

In one embodiment, once the content is properly sorted by target application into groups, the SCS's Content Receiver 918 passes those groups to the Content Access Negotiator component 920 (step 812), which attaches authorization tokens, whenever is possible, to each group that contains content referencing protected resources, so that those resources can be accessed by the target application. Those tokens can only be attached if the source application, which contains the protected resources, has authorized the SCS to distribute said tokens.

For example, an email application registered to a SCS might have authorized that SCS to distribute access tokens for email attachments. Those tokens may enable a SCS share target to access email attachments on behalf of linked users of the email application that are also linked users of the SCS share target. When one of those users sends content containing a reference to an email attachment to Cloud Storage One 122, for instance, in order to save that attachment to the cloud, the Content Access Negotiator 920 attaches an authorization token to the data corresponding to said attachment in the group where that content was sorted by the SCS's Content Receiver 918, so that Cloud Storage One can get the token to access the attachment.

Further details about the Content Access Negotiator component 920 and how applications may authorize the SCS to distribute access tokens for its protected resources will be provided in subsequent sections of this document.

Finally the SCS independently sends the content to each application (step 814) via the secure communication channels between the applications and the SCS.

In one embodiment, a SCS registered application implements a set of SCS's integration components 932 that enables the interaction between that application and said SCS. One of those components is a Content Receiver component 940 that receives the content sent by the SCS (on step 814) and transforms it into application resources 946.

Application resources represent the data entities that make up an application. They are managed and stored by the application. For example, a media player application may have resources such as Playlists, Records, Sound Effect Lists, Sound Effects, etc. For another example, a cloud storage application may have resources such as files and folders. Application resources may be classified into containers and units. For example, Playlists and Sound Effect Lists are containers, whereas Records and Sound Effects are units on a media player application. For another example, folders are containers, whereas files are units on a cloud storage application.

Users of an application may modify application resources. For example, a user 948 of Media Player One logged into that application may create a new Playlist resource named "Classic Music". Likewise, a user may upload a music file stored on their file system to that playlist, creating a new Record resource on that application. By registering to a SCS, an application may enable users to create application resources from outside the application, specifically from SCS share sources (e.g., from web pages loaded in web browsers).

Sections or routes of a SCS registered application that can be target of a sharing operation and the content being shared in that operation are typically associated with resources of that application. Target sections may typically be associated with container resources and the content being shared may typically be associated with unit resources. For example, in FIG. 6H 628 "Sound Effects>Screams" is the target section for the sharing operation. That section represents a container resource on the target application Media Player One: a Sound Effect List named Screams. Similarly, a content editing section 634 contain the content corresponding to a Sound Effect, which represents a unit resource on Media Player One 622 (also 120 in FIG. 1).

As mentioned before, in one embodiment, a SCS registered application implements a set of SCS's integration components 932 that enable the interaction between that application and said SCS. That set of components comprise: a Content Receiver 940, a Resource Updater 936, a Resource Observer 938, A Resource Server 944 and an Integration Profile 942.

In one embodiment, a Content Receiver component 940 implemented by the SCS registered application manages the transformation of content coming from the SCS server(s) into unit resources of the application, and the storage of said unit resources in the application. In one embodiment, that Content Receiver component 940 comprises an application allocated endpoint where the SCS sends content to that application, in a secure way. It also comprises the functionality to transform the received content, which may come in XML, JSON or other similar formats, according to an embodiment of the present invention, into unit resources, which may be modeled in a variety of formats available in a variety of computer programming languages, according to the technology in which the application was developed. In addition, it comprises the functionary to store said resources in a variety of mediums such as files in a file system, a database in a database management system and the like, according to the implementation of the application.

A Resource Updater component 936 is similar to a Content Receiver component in the fact that both of them enable the creation of application resources from outside the application. A Content Receiver component enables for the creation of unit resources resembling content being received. Similarly, a Resource Updater component enables for the creation of container resources resembling target application sections being created by a user from the SCS Sharing Interface.

In one embodiment, a Resource Updater component 936 implemented by the SCS registered application comprises an application allocated endpoint where the SCS sends content, representing a new application section, to that application, in a secure way. It also comprises the functionality to transform the received data, which may come in XML, JSON or other similar formats, according to an embodiment of the present invention, into a container resource, which may be modeled in a variety of formats available in a variety of computer programming languages, according to the technology in which the application was developed. In addition, it comprises the functionary to store said resource in a variety of mediums such as files in a file system, a database in a database management system and the like, according to the implementation of the application.

Figure 6J:
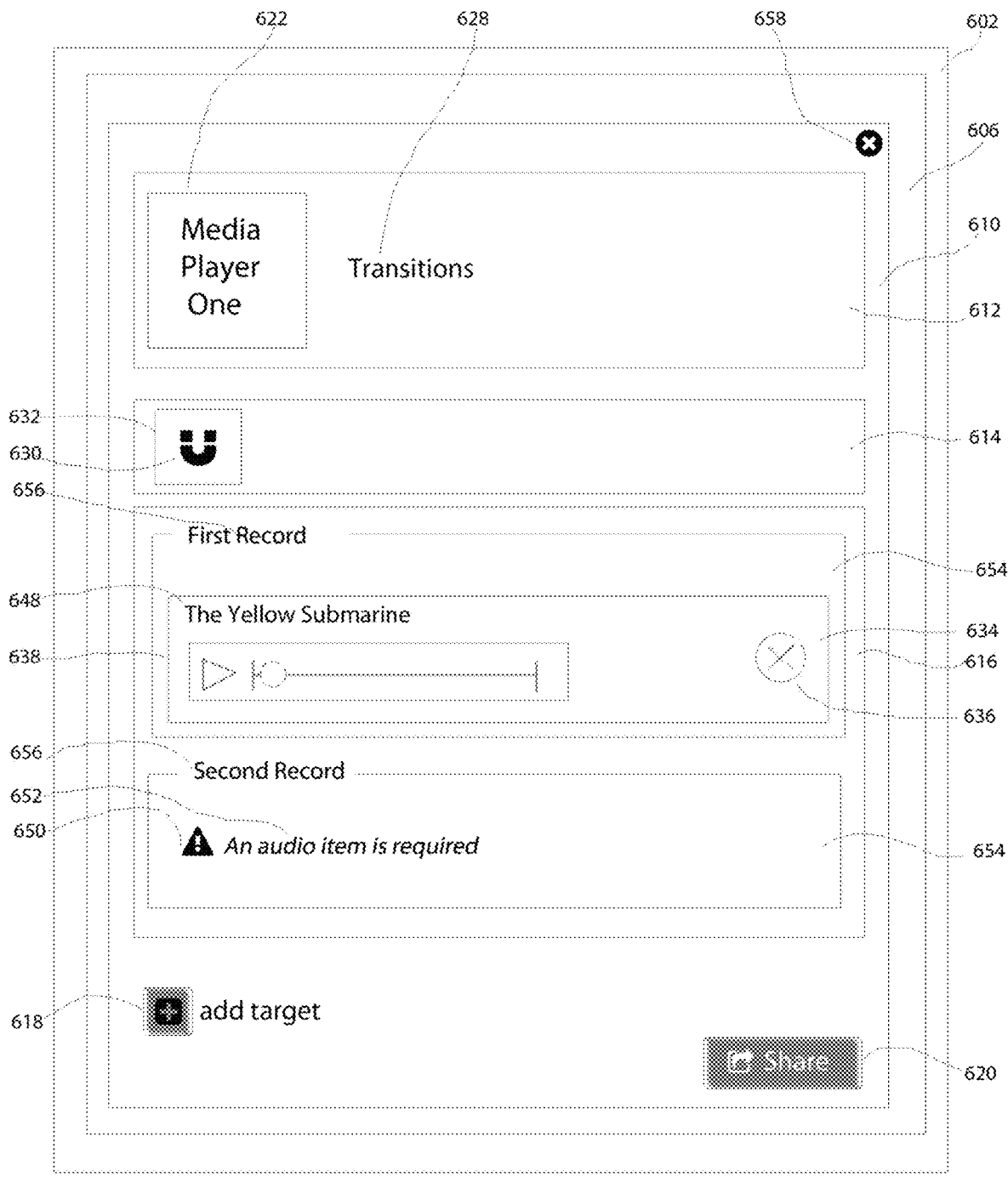
FIG. 6J depicts an example of a SCS Sharing Interface comprising two application section parameters, according to an embodiment of the present invention.
Figure 6K:
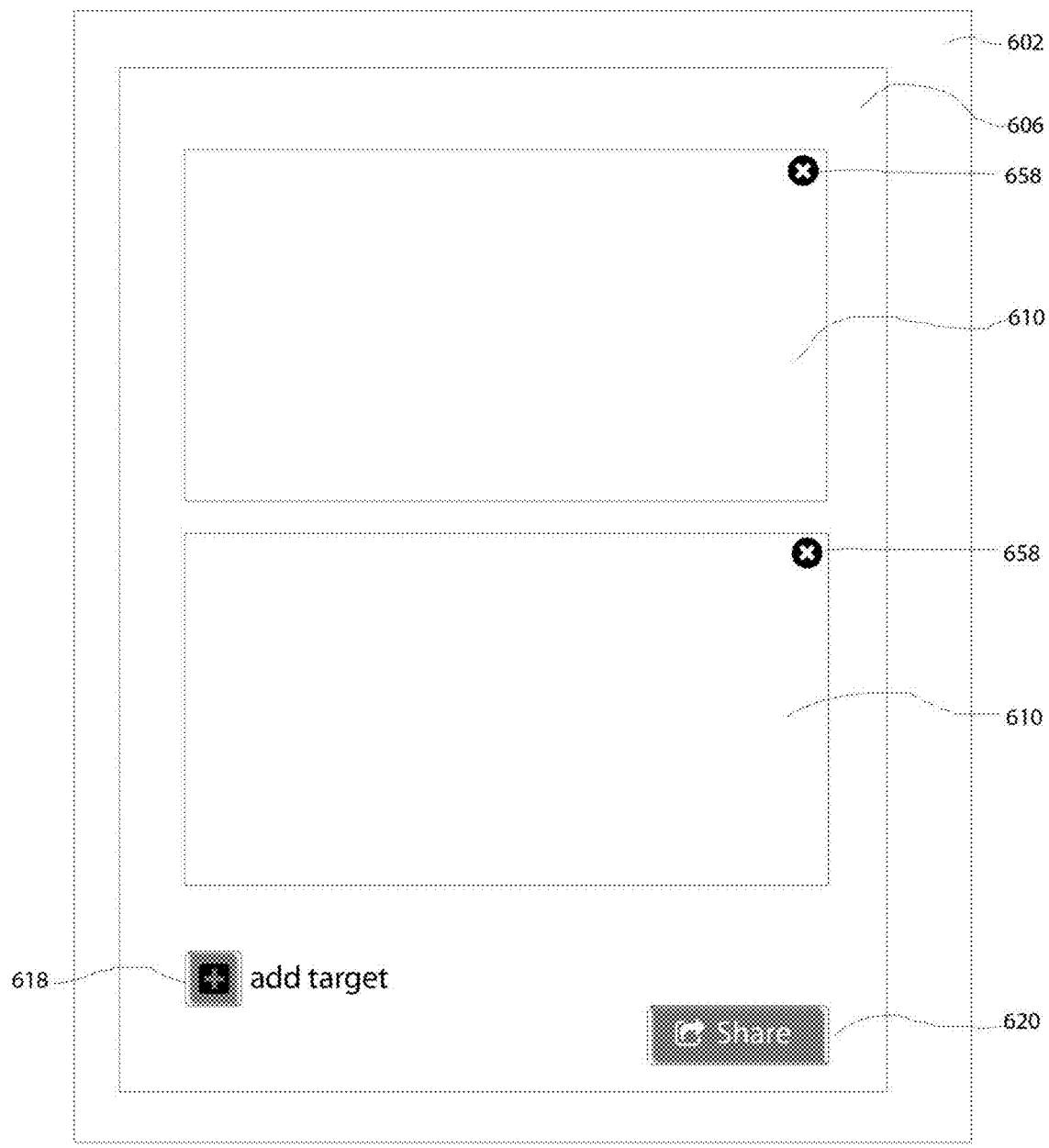
FIG. 6K depicts an example of how a SCS Sharing interface in a SCS user interface may be structured to manage multi-target sharing.
Figure 6L:
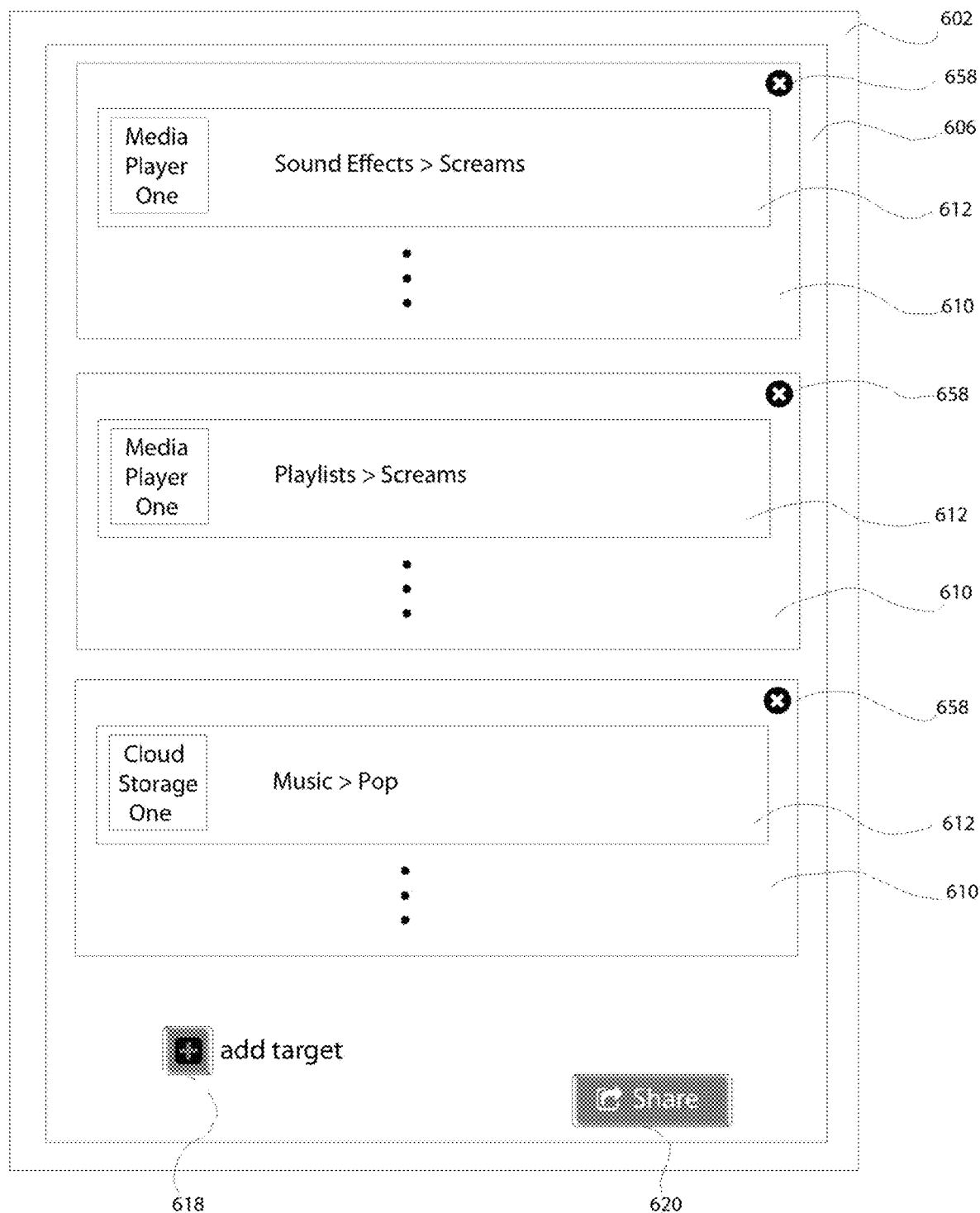
FIG. 6L depicts an example of a SCS sharing interface comprising three target-scoped sharing regions, according to an embodiment of the present invention.
Figure 6M:
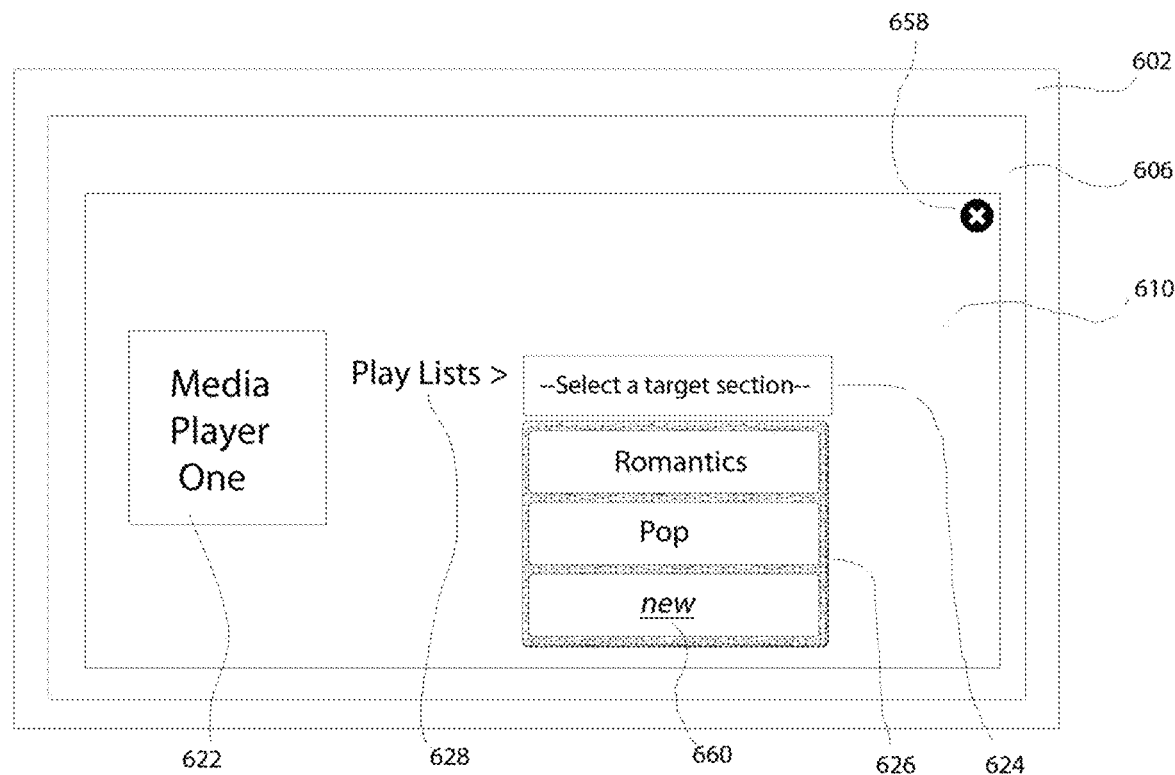
FIG. 6M depicts an example of a SCS Sharing interface from where a user can create a new application target section, according to an embodiment of the present invention.
Figure 6N:
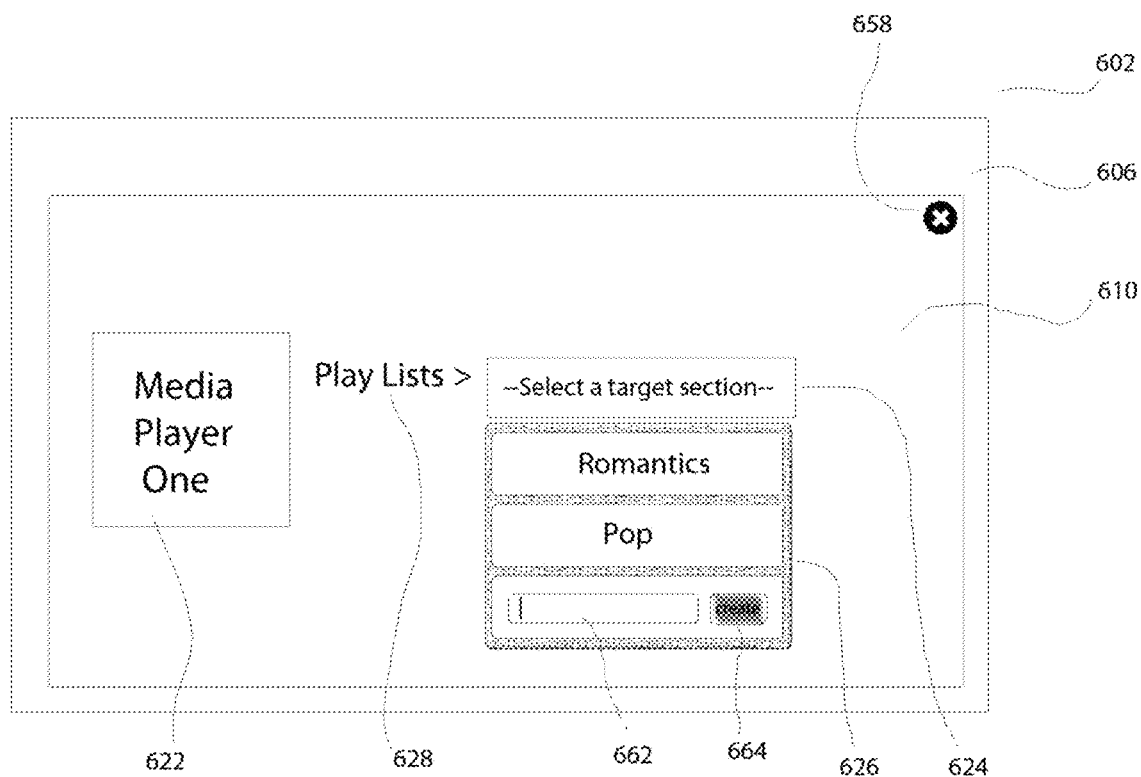
FIG. 6N depicts an example of a SCS Sharing interface where a user is creating a new application target section, according to an embodiment of the present invention.
Figure 6O:
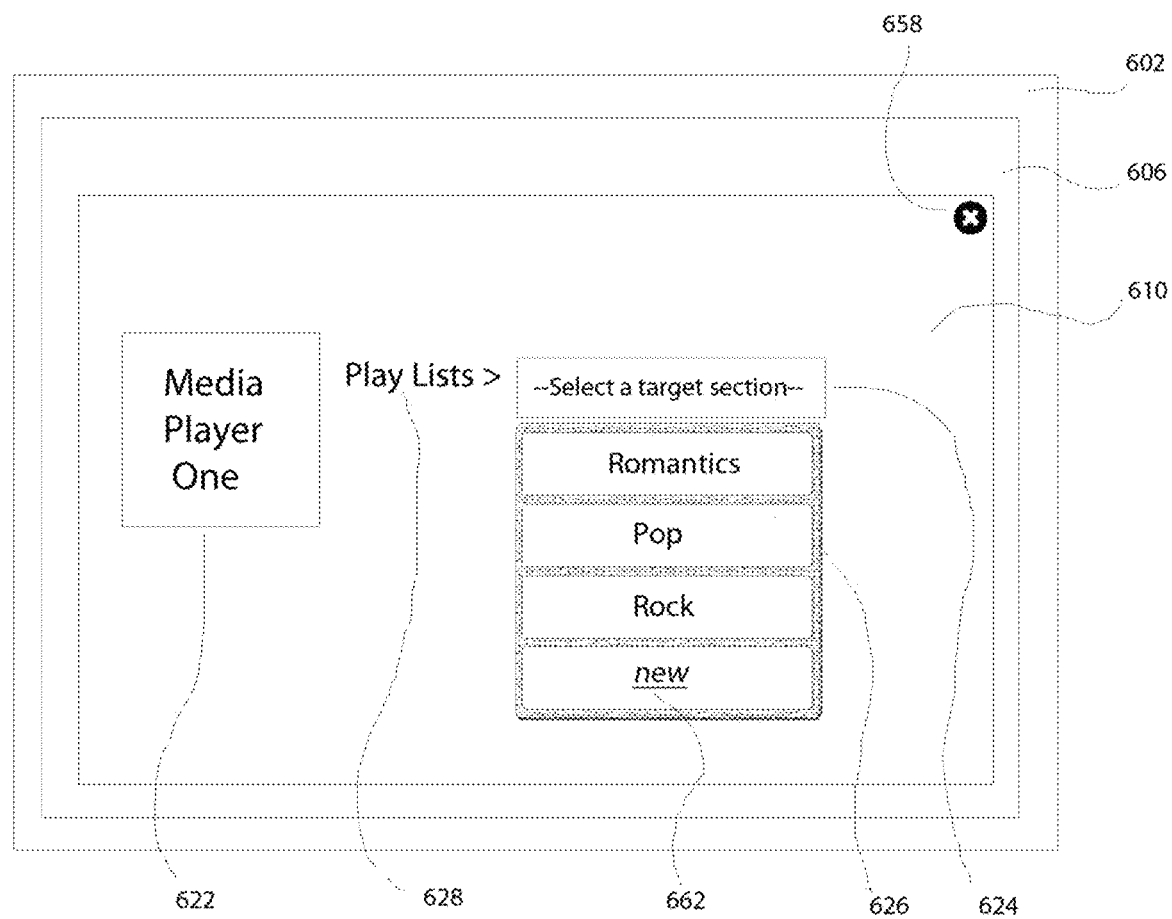
FIG. 6O depicts an example of a SCS Sharing interface where a user created a new application target section, according to an embodiment of the present invention.

FIGS. 6M-6O depict an example of how a new playlist named "Rock" can be created in Media Player One 120 from a SCS Sharing Interface. FIG. 6M depicts an example of a SCS Sharing interface where a user is to select a target section for Media Player One 120 under the Plays Lists section category, according to an embodiment of the present invention. In the depicted example, section Play Lists enables the creation of new subsections under it by clicking the link "new" 660 in menu 626. The capability of creating new subsections in a SCS share source from the SCS Sharing Interface, as depicted in this example, may be indicated by the application to the SCS, and will be detailed in upcoming sections of the present document.

Upon clicking the link 660, the user may be asked to enter a name for the section to be created in a text box 662 (FIG. 6N). Once entered the user may click the "Create" button 664 to submit the name to the SCS and have the SCS create a container resource in the application.

When the "Create" button 664 is clicked, the SCS Sharing Interface requests the SCS server to create a container resource with the name specified in the text box 662 on the target application 622. The request is handled by the Sections Update Proxy 916 component of the SCS, which in turn request the application's Resource Updater component 936 to create the container resource in the application. If the name of the subsection (container resource) to create were somehow invalid, the Resource Updater 936 would respond back to the Sections Update Proxy 916 that such name is invalid and the Sections Update Proxy 916 would echo that response to the SCS Sharing Interface 914 so that the user may choose another name. If the name was admissible, the Resource Updater 936 attempts to create the new subsection and respond back to the Sections Update Proxy 916 notifying the outcome of the process of creating the subsection. Said response is also echoed to the SCS Sharing Interface 914 so that it updates its user interface accordingly. Finally, if the operation succeeded, the new subsection (container resource) is populated in the menu 926 as depicted in FIG. 6O and may be selected as a target section from that moment on.

In one embodiment, the Sections Update Proxy 916 is a component of the SCS that manages requests for updating application sections of a SCS share target coming from the SCS Sharing Interface. Those requests may include but are not limited to creating a new application subsection. In one embodiment, a Sections Update Proxy component 916 implemented by the SCS comprises a SCS allocated endpoint where the SCS Sharing interface sends the request for updating an application section, in a secure way.

Upon receiving a request for updating an application section of a SCS share target coming from the SCS Sharing Interface 914, the Sections Update Proxy component 916 creates a second request directed towards the SCS share target's Updater Resource's end point. That request is to contain the data that describes the update to be performed, present in the first request, and also the authorization token stored in the Linkage Profile associated with the active user and the target application, according to an embodiment of the present invention. That authorization token guarantees that the second request is performed in a secure way. When the corresponding response to the second request is received by the Sections Update Proxy component 916, it generates the response to the initial request and sends it back to the SCS Sharing Interface 914.

Another component that a SCS registered application implements to integrate with its SCS is a Resource Observer component 938, which monitors a subset of the application container resources and notifies the SCS about any relevant changes on those container resources being observed. In one embodiment, the subset of the application container resources being monitored by the Resource Observer component comprises the container resources of said applications that correspond to subsections of application sections that can be target application sections of a content sharing operation. For example, Media Player One 120 may have a Resource Observer component 938 that is constantly monitoring its Play Lists and Sound Effects container resources.

When, for instance, a new playlist is created by the active user in the application 948 or by the Resource Updater 936, the Resource Observer notifies the SCS that the new playlist has been created. The notification is received by the SCS's Sections Updater Component 922.

In one embodiment, the SCS's Sections Updater component 922 is responsible for receiving notifications of changes in the set of all sections of a SCS registered application that may receive content on a sharing operation. It is also responsible for keeping the SCS updated by saving the notified changes into the Linkage Profile 924 or Application Profile 926. For example, suppose that Media Player One 120 may have indicated to the SCS that section "Transitions" and user defined subsections of sections "Play Lists" and "Sound Effects" may receive content on a sharing operation. Since section "Transitions" is available for all users of Media Player One, it may be stored in the Application Profile 926. On the other hand, user defined subsections of sections "Play Lists" and "Sound Effects" (e.g., "Play Lists>Romantics" and "Sound Effects>Screams") should be stored in the Linkage Profile 924. When a new section "Play Lists>Rock" is created by a user, as depicted on FIGS. 6M-6O, the Sections Updater component 922 gets notified of the new container component created in the application by the application's Resource Observer component 938 and consequently saves the new target section "Play Lists>Rock" into the Linkage Profile 924. From that moment on, each time that user selects Media Player One as a target application on the SCS Sharing Interface (606 on FIG. 6O), the newly created section "Play Lists>Rock" may be set as a target section, as depicted on FIG. 6O.

In one embodiment, the Sections Updater component 922 implemented by the SCS comprises a SCS allocated endpoint, where the SCS share target Resource Observer 938 sends the request for updating an application section, in a secure way. That secure way may be the use of an authorization token issued by a trusted security token service and stored in the SCS share target's Integration Profile 942, according to an embodiment of the present invention.

The Integration Profile 942 is a record kept by a SCS registered application into which it stores relevant information regarding its integration with its SCS. In one embodiment, it may contain but is not limited to:
(1) The linkage user id.
(2) Authorization tokens to be used when communicating with the SCS server(s).
(3) The URLs of SCS endpoints to which the application communicates.
(4) Relevant data needed to interact with the trusted security that issues the authorization tokens previously mentioned.

Embodiments of the present invention enable an application registered to a SCS to define, to that SCS, potential sections of itself that are going to have the ability to receive shared content; and to indicate, in said definition, the types of content it can receive in each of those sections when it acts as the target of a sharing operation.

For example, Media Player One 120 can define to the SCS a section of itself named "Transitions" and indicate, in the definition, that said section is to receive only audio content, when said application section acts as the target of a sharing operation. Likewise, Media Player One 120 can define to the SCS a set of potential sections of itself whose names satisfy the pattern "Play Lists>[name]", where [name] corresponds to the name of a user defined playlist; and indicate in the definition that said sections are to receive only audio and video content when said application sections act as the targets of sharing operations.

An expressions like "Play Lists>[name]" can be referred as a potential section pattern. In one embodiment, SCS registered applications use potential section patterns to define subsets of their potential application sections to the SCS. Those patterns are necessary because some application sections may contain subsections defined by the users of the application; therefore, they are unknown to the application until the user defines them.

The complexity of potential section patterns depend on the nature of the application defining them. For example, suppose that Word Processor One 114 comprises a picture repository per each document it can edit, so that linked users can send images to said repositories and use them when editing the corresponding documents. Ponder that a user that owns a document file called "The magic of a sunset", for instance, sends an image from a webpage to section "Documents>The magic of a sunset>Pictures" of the word Processor One 114, in order to store that image in the repository corresponding to said document. When Word Processor One 114 defines the SCS that it can receive images in sections like "Documents>The magic of a sunset>Pictures", that depend on the name of the file to be edited, it may use a potential section pattern in the form: "Documents>[name]>Pictures", where [name] represents the name of the document.

In one embodiment, potential section patterns comprise quantifiers, like the ones used on regular expressions, in order to describe potential sections containing a sequence of user defined subsections. For example, suppose that File Explorer One 112 wants to enable users to send images to any subfolders of folder "C:\Pictures" via the SCS. To do so, it may define the SCS that any subsection of section "C>Pictures", regardless of how nested it is can receive image content. That particular potential sections definition may be accomplished by using the following potential section pattern: "C>Pictures>[name]". Examples of application sections that satisfy that pattern are "C>Pictures", "C>Pictures>Cars", "C>Pictures>Cars>BMW", "C>Pictures>Cars>BMW>SUVs", etc.

The following list shows commonly used quantifiers and their meaning:

"*" means 0 or more
"+" means 1 or more
"?" means 0 or 1
"{n}" means exactly n
"{n,}" means n or more
"{,n}" means n or less
"{n,m}" means between n and m both inclusive In one embodiment, potential section patterns may also indicate if the user can create the unknown subsections via the SCS, for example, from a SCS Sharing Interface 606 as depicted in FIGS. 6M-6O and explained in a previous section of this document. In order to do so, instead of using brackets "[ ]" for the unknown subsection, parenthesis "( )" may be used; for example, "Play Lists>(name)" indicates that the user can create the child subsections of "Play Lists" from SCS Sharing Interface 606.

Embodiments of the present invention enable SCS registered applications to define remote actions that the user can invoke via the SCS Sharing Interface 606 to be performed by the application. An example of those actions is the creation of a new application subsection explained above.

Embodiments of the present invention enable SCS registered applications to define application sections and the type of content they may receive on a sharing operation by means of the SCS's Data Definition Language, also referred as DDL. The DDL enables applications and users to model the objects that are essential for their interaction with the SCS. Some of those objects may represent settings for registered applications that will be stored in the Application Profile or Linkage Profile, for instance. Some other objects may represent a functionality that can be created by a registered application and made available for other registered applications to use, like Content Types. Various embodiments may implement DDLs in a variety of formats. The SCS's DDL format may be outlined by the SCS or adopted from an existing technology.

In one embodiment, the SCS's DDL may have one or more formats that are used to define different type of objects. For example, the SCS's DDL may use one format for defining application settings and another format for defining content types.

In one embodiment of the present invention, the SCS comprises a Type Definition System (TDS) to which every content type that is defined in the SCS belongs. Said TDS comprises a namespace, referred as the Global namespace, in which every content type defined possesses a unique identifier, and a data definition language used for defining content types. Said data definition language is a subset of the SCS's DDL. For example, a content type named "Image" defined in the SCS is associated with the TDS and located in the Global namespace, where its unique identifier is "Image". The properties of content type "Image" can be specified using the data definition language of the TDS of that example, for instance: TypeScript.

In the present document, a TypeScript-like DDL, with some enhancements such as LINQ support, will be used to illustrate the necessary examples that make up this presentation. TypeScript is a free and open-source programming language developed and maintained by Microsoft. It is a strict superset of JavaScript, and adds optional static typing and class-based object-oriented programming to the language. LINQ, which stands for Language Integrated Query, is a Microsoft .NET Framework component that adds native data querying capabilities to .NET languages, although ports to TypeScript and other programming languages have been implement. The DDL used in the present document models the data definition in the form of classes that are written following the TypeScript's syntax. In the embodiments that use said DDL, the SCS may interact with a TypeScript compiler to interpret the definition of a class.

In some embodiments, objects that are modeled in this document using said TypeScript-like DDL might be defined by users from a user interface provided by the SCS of those embodiments.

The following example, illustrates a possible definition of potential sections of Media Player One 120 that satisfy the pattern: "Play Lists>(name)" and can receive audio or video content, according to an embodiment of the present invention.

```
class MediaPlayerOneApplication extends Application
                                 implements IHaveA<PlayListsApplicationSection> {
    constructor( ) {
        super("Media Player One"); //application's identifier
    }
}
```

```
@route("Play Lists > (name)")
class PlayListsApplicationSection extends ApplicationSection
                                 implements IAccept<AudioContent|VideoContent> {
    constructor( ) {
        super("Play Lists"); //section's identifier
    }
}
```

As shown in this example, in order to define potential sections of an application, a class representing that application has to be defined first, according to an embodiment of the present invention. In one embodiment, classes representing applications must extend the SCS preset class "Application", like "MediaPlayerOneApplication" does in the example above, for instance. Extending class "Application" enables the specification of a set of properties that represent a group of settings that are used to configure the interaction of the application, represented by the class being defined, with the SCS. The mention settings comprise an application identifier and potential application sections. In the example above, the application identifier is passed in the constructor of the class to the constructor of "Application", and the application sections are specified by implementing the SCS preset interface "IHaveA< >", according to an embodiment of the present invention.

In one embodiment, generic type arguments representing application sections can be specified to "IHaveA< >" to indicate that the application implementing that interface has the specified groups of potential application sections. For instance, in the example above, "IHaveA<PlayLists- ApplicationSection>" indicates that the application Media Player One, represented by "MediaPlayerOneApplication", has a group of potential application sections represented by the class "PlayListsAppiicationSection". To indicate multiple groups of potential application sections, TypeScript's interception types may be used as in "IHaveA<CuteApplicationSection&AnotherCuteApplicationSection>", according to an embodiment of the present invention. In one embodiment, some of the application settings that can be defined through the extension of class "Application" may be stored in the Application Profile.

To define potential application sections, a class extending the SCS preset class "ApplicationSection" must be defined, according to an embodiment of the present invention. The constructor of that class must pass to the constructor of "ApplicationSection" an identifier for the section being defined. Said identifier may be used by the SCS for displaying purposes unless a display name is specified by using decorator @displayName (not shown in the example above). Decorator "@route" is used to indicate to the SCS the potential section patterns associated with the application sections being defined. To specify multiple patterns, an array of strings may be used as in "@route(["Play Lists>(name)", "(name)>Hits"])"

In one embodiment, every potential application section definition must specify the types of content the section can receive. To do so, like the example above shows, the SCS preset interface "IAccept< >" has to be implemented by the class representing the application section, according to an embodiment of the present invention. In such embodiment, generic type arguments representing content types can be specified to "IAccept< >" to indicate that the application implementing that interface can receive those types of content. For instance, in the example above, "IAccept-<AudioContent|VideoContent>" indicates that the application section, represented by "PlayListsApplicationSection", can receive content of the types represented by "Audiocontent" and "Videocontent".

The type(s) of content that can be indicated by an application section as content it can receive must be content types already defined on the SCS. A SCS may have a wide variety of content types defined; for example, content types representing generic audio content (e.g., "Audiocontent"), generic video content (e.g., "Videocontent"), image content, text content, product content, video content from a specific media provider like YouTube.com or Vimeo.com, etc.

In one embodiment, the definition of potential application sections may also indicate whether the section must expect a single instance of the specified content type(s) or multiple instances. The example above indicates that incoming content must be a single instance of either "AudioContent" or "VideoContent". To indicate that more than one instance of those types may be received, that example may be modified by changing "IAccept<AudioContent|VideoContent>" into "IAccept<Array<AudioContent|VideoContent>>"

Content types, like Application Sections, can be defined to the SCS. Further details about the definition of content types will be provided in upcoming sections of this document.

Upon being specified that Media Player One 120 can receive "VideoContent" and "AudioContent" instances on its sections that satisfy the pattern "Play Lists>(name)", the SCS Content Selection APIs 710 of each SCS source applications can get configured to enable the selection of only "VideoContent" and "AudioContent" instances when the user sets for the target section 628 of Media Player One 622 a section that satisfies the pattern "Play Lists>(name)". The media player application does not have to implement any selection logic for the audio or video content, since those content types are predefined on the SCS.

In one embodiment, the definition to the SCS of potential application sections that are going to have the ability receive shared content may also comprise specifying additional settings concerning the functionality of those sections as targets of sharing operations. For example, said settings may include but are not limited to: custom data to be collected from the SCS Sharing Interface 606, requirements to be met by the custom data and by the content type instances to be shared, the incorporation of content selection and content generation tools 630 into the SCS Sharing Interface 606, etc.

In one embodiment, the definition of potential application sections may indicate some custom data to be collected from the SCS Sharing Interface 606, when sharing to the defined potential sections. For example, in FIG. 6G a title 640 and a flag value 644 need to be collected. According to an embodiment of the present invention, the data to be collected may be indicated in the corresponding definition of potential sections by implementing interface "IAccept< >" using a TypeScript's intersection type as follows:
"IAccept<Array<{title: string; @displayName("is live") isLive: boolean;}&(AudioContent|VideoContent)>>"

In the example above, the custom data to be collected is defined in an object and combined to the SCS defined content types expected to be received by the potential sections. Such combination, determines the elements that the SCS Sharing Interface 606 shows in sections 634 containing the expected content type instances. Decorator "@displayName" is provided by the SCS to indicate the display name of a property when it should be different from property name, according to an embodiment of the present invention.

In one embodiment, the definition of potential application sections may indicate requirements those sections must meet, which may be formulated in terms of, but not limited to, the custom data to be collected and the content type instances to be shared. In one embodiment, potential application section requirements may be indicated by using a set of defined decorators or by implementing a validation function.

For example, decorator "@required" may be used to indicate that certain property requires to have a value assigned, as in "{@required title: string; @displayName("is live") isLive: boolean;}", where its use implicate that the SCS Sharing Interface 606 depicted in FIG. 6G will fail the validation process (step 804 of 800 in FIG. 8) if a title is not entered in 642. For another example, decorator "@quantify" may be used to indicates that certain array property must have a length that satisfy a quantifier like the ones previously described in this document. Decorator "@quantify" may also be applied to the definition of the class representing an application section that accepts an array of content in order to apply the length restrictions to said array, according to an embodiment of the present invention. For example:

```
@route("Play Lists > (name)")
@quantify("{2,3}")
class PlayListsApplicationSection extends ApplicationSection
        implements IAccept<Array<AudioContent>> {
    //content suppressed for simplicity
}
```

In one embodiment, a definition like the one shown above implicates that the SCS Sharing Interface 606 depicted in FIG. 6G will fail the validation process (step 804 of 800 in FIG. 8) if less than 2 or more than 3 "AudioContent" instances are in 616 to be sent to 628.

The following code illustrates a potential application section's requirement indicated by implementing a validation function, according to an embodiment of the present invention.

a web browser. In the previous example, generic function "IdOf" is a helper function defined by the SCS which return the string value of the identifier of a class. Application services (e.g., "WebBrowserService"), like application sections, are defined as classes according to an embodiment of the present invention.

In one embodiment, validation error messages may be indicated when defining section requirements. The SCS may show those messages to users to warn them about validation errors. In the previous example, according to an embodiment of the present invention, inside function "IsValid" a message may be assigned to property "InvalidMessage" to indicate to the SCS the error message that should be shown when said function returns false. Property "InvalidMessage" is an inherited property available to any class extending the SCS preset class "ApplicationSection". SCS preset decorators that can be used for validating data (e.g., "@required") may also have an associated error message, according to an embodiment of the present invention.

Section requirements are used by the SCS to prevent invalid data to be sent or processed. For example, in one embodiment, the SCS Content Selection API 710 may not make sharable content that is to be sent to a section into which that content is resolved as invalid; meaning that no borders will be shown when the user hovers over that content.

For another example, in one embodiment, the SCS Sharing Interface 716 prevents the user from sharing content that does not satisfy the requirements specified by the application to the SCS. In addition to prevent the content from being shared, the SCS Sharing Interface 716 can also show validation error messages and other visual aids to notify the user about the requirements that need to be met. FIG. 6I depicts a possible SCS Sharing Interface 606 for Media Player One 120, according to an embodiment of the present invention. The destination section 612 indicates that the target application section is "Transitions". Suppose that the definition of section "Transitions" indicates that said section accepts exactly two instances of audio content, as shown in the following example, according to an embodiment of the present invention:

```
@route("Transitions")
@quantify("{2}")
```

```
@route("Play Lists > (name)")
class PlayListsApplicationSection extends ApplicationSection
                    implements IAccept<AudioContent> {
    constructor( ) {
        super("Play Lists"); //section's identifier
    }
    IsValid: (context: SharingContext) => {
        this.InvalidMessage = "Audio duration must be greater than 20 seconds.";
        return Content.Duration > 20 && context.sourceServices.indexOf(IdOf<WebBrowserService>( )) != -1;
    }
}
```

The validation function "IsValid" may be implemented by any class extending "ApplicationSection" to define a requirement that combine multiple elements of that class, according to an embodiment of the present invention. In the example above, a sharing operation to an application section that satisfy the pattern "Play Lists>(name)" is considered valid if the audio content to be shared has a duration greater than 20 seconds and is sent from a SCS share target that is -continued

```
class TransitionsApplicationSection extends ApplicationSection
                implements IAccept<Array<AudioContent>> {
    //content suppressed for simplicity
}
```

The content section 616 shows only one audio content instance, out of the two that are required by the "Transitions" sections in order to accept the shared content. Since requirements are not met, a warning icon 650 and a validation message 652 are shown to the user. In addition, the share button 620 is disabled to prevent the user from sharing that content. When a user extracts a second audio content into the content section 616, 650 and 652 are removed from 616, the share button 620 gets enabled so that content can be shared and the magnet tool 630 gets disabled so that no more than two audio contents can be selected to be shared.

In the previous example, although the user can assume that the first audio content in 616 corresponds to the first record of the transition and the second audio content corresponds to the second record of the transition, it would be more explicit to have a visual structure that indicates so.

In one embodiment, an application can specify section parameters in order to classify content that its application sections can receive. Section parameters represent subsections of the containing application section comprising their own name, validation mechanism, among other features similar to the features of an application section. For example, Media Player One 120 may define to the SCS its "Transitions" application section, according to an embodiment of the present invention, as follows:

```
@route("Transitions > (name)")
class TransitionsApplicationSection extends ApplicationSection {
    constructor( ) {
        super("Transitions"); //section's identifier
    }
    Parameters: Array<ApplicationSectionParameter> =
        [new FirstRecordParameter( ), new SecondRecordParameter( )]
}
@required
class FirstRecordParameter extends ApplicationSectionParameter
                implements IAccept<AudioContent> {
    constructor( ) {super("First Record"); //parameter's identifier
    }
}
@required
class SecondRecordParameter extends ApplicationSectionParameter
                implements IAccept<AudioContent> {
    constructor( ) { super("Second Record"); //parameter's identifier
    }
}
```

In this example, the application section "Transitions" contains two section parameters: "First Record" and "Second Record". They are included into the application section definition by means of the property "Parameters", which holds an array of application section parameter objects and is available to all classes extending "ApplicationSection", according to an embodiment of the present invention. Each application section parameter can be defined by extending the SCS preset class "ApplicationSectionParameter". Classes "ApplicationSectionParameter" and "ApplicationSection" share a common interface; therefore, property "InvalidMessage", function "IsValid", decorators "@required" and "@quantify", among other features work the same for "ApplicationSectionParameter" as for "ApplicationSection"", according to an embodiment of the present invention. Both application section parameters defined in the example receive audio content and both require exactly one instance of that content type.

FIG. 6J depicts an example of a SCS Sharing Interface for Media Player One 120 that corresponds to the "Transitions" application section defined in the example above, according to an embodiment of the present invention. The destination section 612 indicates that the target application section is "Transitions". The content section 616 shows two content groups 654: one named "First Record" and the other one named "Second Record". Those content groups correspond to the section parameters defined by Media Player One 120 for its "Transitions" section. In the example above, the content group named "First Record" contains one audio content instance; therefore, its content requirements are satisfied. On the other hand, the content group named "Second Record" is empty, that is why 650 and 652 (now inside 654) indicate that the content requirements for that content group are not met.

Figure 5C:
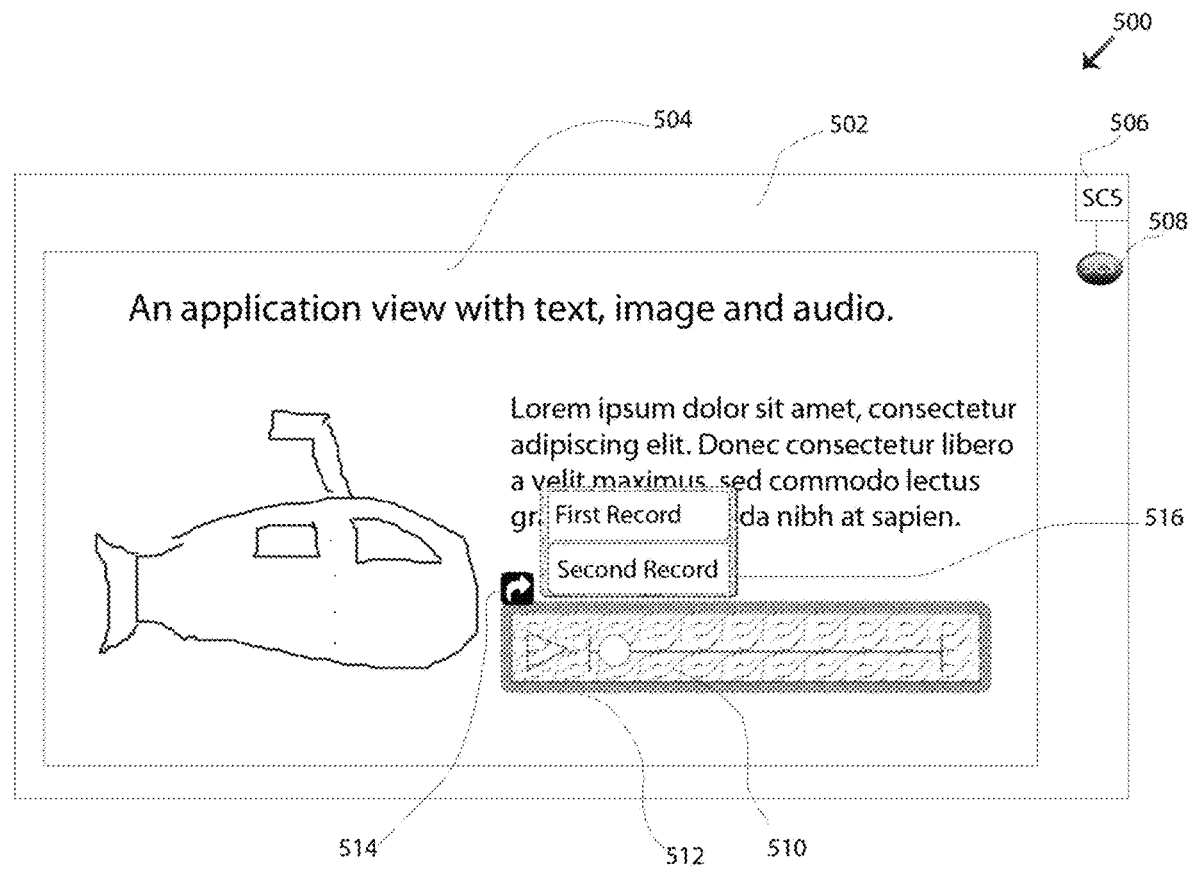
FIG. 5C depicts an example of a SCS share source view from where audio content is being selected, to be sent to a SCS Sharing interface, according to an embodiment of the present invention.
Figure 5D:
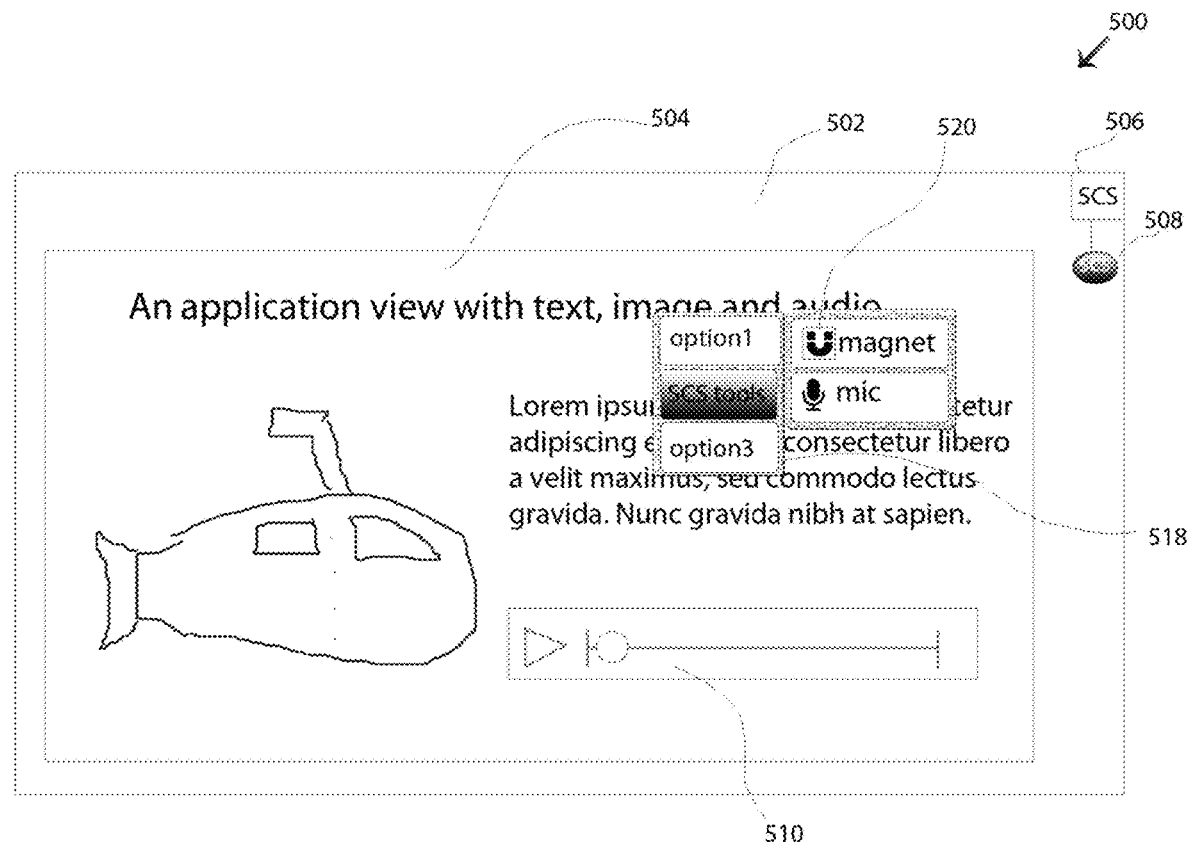
FIG. 5D depicts an example of an alternative sharing approach where the sharing tools may be selected from a context menu in the SCS share source view, according to an embodiment of the present invention.
Figure 5E:
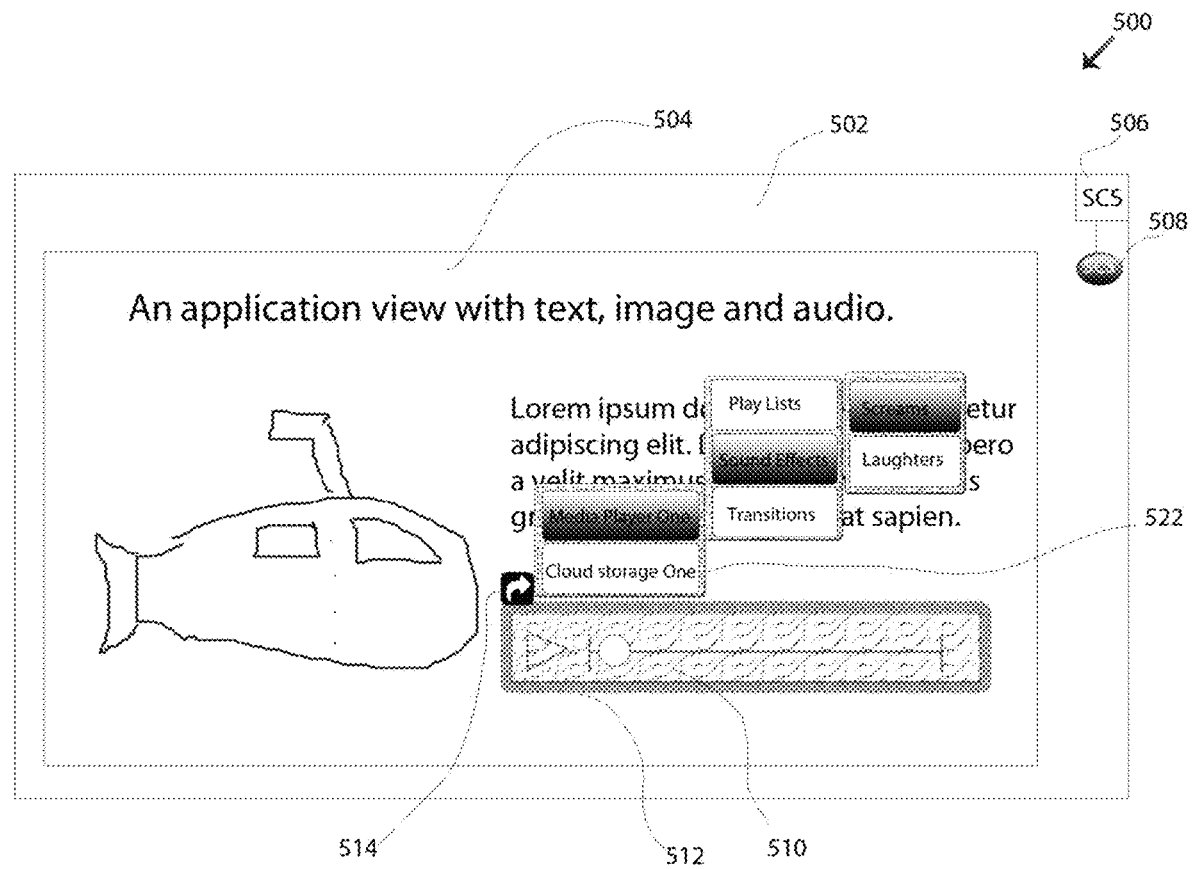
FIG. 5E depicts an example of an alternative sharing approach where the SCS share target may be selected from a context menu in the SCS share source view, according to an embodiment of the present invention.

FIG. 5C depicts an example of a SCS share source from where an audio content is being selected, to be sent to the SCS Sharing interface 606 depicted on FIG. 6J, according to an embodiment of the present invention. Once the audio content is selected, and button 514 is clicked, a context menu is shown so that the user chooses to which application section parameter the content should be sent.

In one embodiment, section requirements may reference data from different section parameters and the section itself. For example, in the previous definition of potential application sections satisfying pattern "Transitions>(name)", a validation function "IsValid" may be defined containing the following code: "return Parameters[0].Content.Duration>20 && Parameters[1].Content.Duration>5", meaning that a pair of audio content instances is considered valid if the first one lasts more than 20 seconds and the second one more than 5 seconds.

In one embodiment, an application section is considered to be valid by the SCS if all its section parameters and itself are valid.

In addition to defining custom data and requirements, an application section definition may indicate which content selection and content generation tools 630 that are compatible with the content types to be received are to be shown on the SCS Sharing Interface 606.

In one embodiment, the default behavior of the SCS Sharing Interface is to show all tools integrated with the content types that can be received by the selected target section. For example, a SCS preset "AudioContent" content could be integrated with a microphone tool 630 (FIG. 6H), so that the user could generate and share audio content. In one embodiment, an application can override said default behavior by opting out undesired tools when defining the application section. For example, Media Player One 120 may prevent the SCS Sharing Interface from showing the microphone tool for target sections satisfying the pattern "Sound Effects>[name]" by implementing the SCS preset interface property "IExclude< >", according to an embodiment of the present invention, as follows:

```
@route("Sound Effects > (name)")
class SoundEffectssApplicationSection extends ApplicationSection
                implements IAccept<AudioContent>
                implements IExclude<MicrophoneTool> {
    constructor( ) {
        super("Sound Effects"); //section's identifier
    }
}
```

In the previous example, "MicrophoneTool" is a SCS preset class that represents the microphone tool 630, according to an embodiment of the present invention. In one embodiment, multiple tools may be excluded by using TypeScript's interception types as in "IExclude<MicrophoneTool&MagnetTool>".

In one embodiment of the present invention, the SCS's Type Definition System (TDS) comprises a functionality that enables the definition of types of objects that support multiple versions across different technologies. That functionality is referred as Universal Type Definition System (UTDS).

In addition to all capabilities of its hosting DDL, an UTDS enables the definition of types that can be versioned on all technologies it supports, which are represented by technology-dependent namespaces. A UTDS supported technology comprises a computer programming language (e.g., JavaScript, C#, etc.) and may comprise other frameworks that may be associated to those languages; for example HTML, XAML, PDF, etc. An example of a UTDS supported technology may be one comprising the JavaScript programming language and the HTML framework. Such technology may be called ".HTML" and the type definitions for that technology may be located in a namespace called "HTMLContent", according to an embodiment of the present invention. Another example of a UTDS supported technology may be one comprising C# as the programming language and the PDFsharp library to interact with PDF documents. Such technology may be called ".PDF" and the type definitions for that technology may be located in a namespace called "PDFContent", according to an embodiment of the present invention.

In one embodiment, an UTDS keeps different versions of a type in separate files and guarantees the integrity of said versions by synchronizing the compilation those type versions. That synchronization comprises checking that each property of the DDL defined type is defined in each independent version, with the same property name and a correctly mapped property type; and also checking that functions defined in the DDL type that are marked to be implemented by the type versions are properly implemented in said versions.

For example, suppose that a UTDS supports both ".HTML" and ".PDF" technologies. A type named "ImageContent" may be defined in that UTDS, according to an embodiment of the present invention, as follows:

```
--- In a DDL File (types defined here belong to the Global namespace of the UTDS)
class ImageContent extends Content {
  constructor( ) {
    super("Image"); //content type's identifier
  }
  ImageUrl: string;
  ImageFormat: string;
  ImageBits: string;
  Size: number;
  IsValid(context: SharingContext){
      return this.ImageUrl !== null || (this.ImageFormat !==
      null && this.ImageBits !== null)
  };
  @external
  Parse(element: any){ }
  @external
  Render( ){ }
}
--- In a JavaScript File (.HTML technology, types defined here belong to the HTMLContent namespace of the UTDS)
class ImageContent {
  constructor(ImageUrl, ImageFormat, ImageBits, Size) {
    this.ImageUrl = ImageUrl;
    this.ImageFormat = ImageFormat;
    this.ImageBits = ImageBits;
    this.Size = Size
  }
```

```
  Parse(element){
      // JavaScript code omitted
  }
  Render( ){
      // JavaScript code omitted
  }
  AnotherFunctionNotInDDLClass( ){
      // JavaScript code omitted
  }
}
--- In a C# file (.PDF technology, types defined here belong to the PDFContent namespace of the UTDS)
class ImageContent {
  public string ImageUrl {get; set;}
  public string ImageFormat {get; set;}
  public string ImageBits {get; set;}
  public int Size {get; set;}
  public bool AnotherPropertyNotInDDLClass {get; set;}
  void Parse(Object element)
  {
      //C# code omitted
  }
}
```

This example shows how both versions of the DDL defined type "ImageContent" are properly implemented in the supported technologies, according to an embodiment of the present invention. Decorator "@external" is used in the DDL type to indicate that methods "Parse" and "Render" may be implemented in its technology specific versions. The implementations were omitted for the sake of the simplicity of the example. Method "Parse" is implemented in both supported technologies, whereas "Render" is only implemented in the ".HTML" technology. Since function "IsValid" is not marked with "@external", technology specific versions of DDL type "ImageContent" are not required to implement said function. In addition to the properties defined by the DDL type, the C# version of "Imagecontent" comprises a property named "AnotherPropertyNotInDDL-Class" and the JavaScript version of "Imagecontent" comprises a function named "AnotherFunctionNotInDDLClass" which, although are not included in the DDL type, do not invalidate the integrity of the UTDS, according to an embodiment of the present invention. Property "AnotherPropertyNotInDDLClass" and function "AnotherFunctionNotInDDLClass" can be referred as technology-scoped elements of the type defined.

In one embodiment of the present invention, in addition to a UTDS, the SCS's Data Definition Language also comprises a functionality that enables types created in the UTDS to be shared among SCS registered users and application, and also enables the creators and owners of those types to control the accessibility of said types to other registered users or applications. Such functionality is also referred as SCS Licensing API. The SCS Licensing API also enables type authors to delegate their ownership rights to other SCS registered users, according to an embodiment of the present invention.

In one embodiment, the SCS Licensing API enables type owners to authorize an application to use a type they own for a given period of time (e.g., for a year or for a 15 days trial period). In another embodiment, the it enables type owners to authorize an application to use a type they own for a limited number usage instances; for example, the owner of a content type may limit an application that can receive content of that type into some of its application section to a given number of parsing operations into instances of that content type, to be performed by the SCS Content Selection API. In other embodiments, the SCS Licensing API may offer other sorts of licensing models, including free of charge ones.

In one embodiment, the SCS offers functionality for registered users and applications, or the SCS itself to make payments to other registered users and applications, or the SCS itself. Such payment system can be integrated to the SCS Licensing API so that registered users and applications may buy licenses to use types defined in the DDL, according to an embodiment of the present invention.

In one embodiment, the SCS Licensing API is integrated to a collection of SCS components to enforce the license agreements on the use of DDL defined types consumed by said components. Therefore, the unauthorized use of a DDL defined type may cause a malfunctioning of the sharing coordination process. In one embodiment, to define a new type that extends another type in a SCS's DDL's UTDS, the author of the new type must have a valid license to use the type being extended.

In the upcoming sections of this document, DDL defined types that may be subject to licensing in some embodiments will be pointed out.

In one embodiment of the present invention, the definition by an application of the types of content which its potential sections will be able to receive comprises defining a new content type to the SCS. Such operation comprises the description of selection criteria to select content of that type from a set of elements that are made available to the SCS by the SCS share source (e.g., the set of HTML tags that represent the web page loaded in the browser made available to a SCS browser extension by the browser).

For example, Media Player One 120 can receive, on its potential sections that satisfy the pattern "Play Lists> [name]", a type of media content that is not available on the SCS. Although Media Player One 120 may have indicated to the SCS that it can receive content of the SCS preset content type "Video", on its potential sections in the form "Play Lists>[name]", it may also be able to receive a different type of video content that is not preset on the SCS. For instance, the "Video" content type preset on the SCS might have based its selection criteria, when selecting from a web page, on parsing html video tags only; however, the media player application may be interested in video content with a different HTML structure. The representation of a video content in a web page does not have to necessarily involve an html video tag; it might just be an image link that when clicked takes the user to a web site such as Vimeo.com, for instance. If the Media Player One 120 wanted to be able to receive said representations of Vimeo.com videos, and there were no suitable content type available on the SCS, Media Player One 120 would have to create, on the SCS, a new content type by specifying a unique name for the type (e.g., "Vimeo Video") and also by providing selection criteria so that the SCS can interact with that content in an HTML page.

In one embodiment, once an application creates a new content type on the SCS, it might be included as a preset content type of the SCS so that other applications can use it.

In one embodiment, a SCS can offer its registered users and applications functionality for creating, maintaining and sharing content types. In one embodiment, a SCS content type can be authored by the SCS, a SCS registered user or a SCS registered application. In one embodiment, a SCS content type can be shared with any SCS registered application, shared with a particular group of SCS registered applications or kept private to its author.

In one embodiment, the SCS Licensing API manages content types. For example, a user can create a SCS content type named "Vimeo Video" that enables the SCS to interact, in web pages, with different types of representations of videos hosted on Vimeo.com, which might be contained on those web pages. That user may want to maintain that content type by keeping the selection criteria for said content type up to date, since variation in the HTML structure of the representation of videos hosted on Vimeo.com may appear on web pages. In addition, said user might decide to charge a fee to applications that want to use its "up to date" "Vimeo Video" type, and for that purpose he can use the SCS Licensing API. On the other hand; having Vimeo.com registered to the SCS, it can author a content type called "Official Vimeo Video" which offers the same functionality and may be made free to use by any SCS registered application, also by means of the SCS Licensing API.

Creating a new content type on the SCS comprises assigning it a unique name within the context of that SCS; meaning that there cannot be a previously created context type on that SCS with the same name. In one embodiment, Content types are created by means of SCS's DDL's UTDS, which enforces the uniqueness of content type names.

In one embodiment, besides providing a unique name, creating a new content type on the SCS also comprises the definition of properties, selection criteria and rendering procedures. Properties of a content type contain data describing the content type. For example, a "Vimeo Video" content type might expose properties such as: "VideoTitle", "VideoUrl" and "ThumbnailImageURL".

The definition of content type selection criteria may be divided into two steps: defining content extraction criteria and defining content type requirements. When defining the content extraction criteria, a content type author indicates to the SCS how to extract the values of those content type properties, from a given object that represents an available sharable content element of a SCS share source's view, into a new content type instance. By defining content type requirements, a content type author indicates to the SCS how to validate an instance of a content type. Defining rendering procedures indicate how to render instances of said content type into application views.

For example, suppose the content type being defined to the SCS operated in the .HTML technology and the SCS share source were a web browser, associated with a SCS via a browser extension, which is loaded with a web page. The extraction criteria of a content type may have been defined in the form of a JavaScript function that takes an HTML element and attempts to extract, from that element, the values corresponding to the properties defined on the content type being defined; creating an instance of said content type. For that example, the requirements of the content type being defined may have been defined in the form of a DDL function (e.g., a function named "IsValid") that is run immediately after the extraction criteria is run in order to test the validity of the created content type instance. Defining content type requirements in a DDL function or using DDL decorators avoids the need to redefine those requirements for each technology that said type may support, according to an embodiment of the present invention. An example of a requirement for a content type is that each of its defined properties must have an assigned value. Finally, for the present example, a rendering procedure may be defined in the form of a JavaScript function that builds an HTML element representing the content type instance. Said representation may be used by the SCS Sharing Interface 606 (on FIG. 6G) to visualize the content 638, for instance.

Selection criteria defined on a SCS content type operates on the set of available sharable content in the active view of SCS share sources. This sharable content is made available to the SCS Content Selection API 710 by the SCS share source so that it can extract instances of desired content types. The nature of said sharable content depends on the technology associated with the SCS share source; therefore selection criteria depend on the technology associated with the SCS share source. For that reason, content types are defined on the SCS's UTDS, according to an embodiment of the present invention. For example, if the SCS share source is a web browser, the available share content may be a subset of the HTML tags that represent the web page loaded in the browser. For another example, if the SCS share source is a PDF visualizer application, the available share content may be a subset of the elements on the Carousel Object Structure that represent a PDF document. In one embodiment, a content type may define selection criteria for different technologies, provided that the SCS's UTDS support those technologies.

Rendering procedures depend on the technology the type instance is being rendered into. If the SCS Sharing Interface 710 operates in the ".HTML" technology, the rendering function of the .HTML-version of the content type will be consumed by the SCS Sharing Interface; likewise for other technologies onto which the SCS Sharing Interface may be operating.

The previous example showing the definition of class "Imagecontent" exhibits a way to define a content type named "Image", according to an embodiment of the present invention. In one embodiment, a new content type may be defined to the SCS by extending the SCS preset class "Content" or extending a class derived from it. Functions "IsValid", "Parse" and "Render" are inherited functions available to override by any class derived from "Content". In the definition of class "Imagecontent" in the previous example, DDL implemented function "IsValid" outlines the desired requirements for the content type, function "Parse" is used to define content extraction criteria in each supported technology from where instances of the content type may be extracted, and function "Render" is used to define rendering procedures to the supported technologies into which the SCS Sharing Interface 710 may be implemented (.HTML but not .PDF).

In one embodiment, a content type may embody a component that can be rendered into specific technologies. That component may comprise several views and the corresponding functionality to manage the interaction of clients (e.g., users) with them. For example, in an embodiment where rendering procedures for content types are implemented in different versions of a function called "Render", that function may render a representation of the content type instance into a variety of UTDS's supported technologies. That representation may be considered the initial view of a technology scoped component representing the content type instance. That view may contain visual controls such as buttons, text inputs and the like that a user may use to interact with the component. The functionality of said controls (e.g., event handlers) may be implemented by functions that are not necessarily external function of the DDL content type definition, but technology-scoped. Likewise, the generation of other component views and the functionality to transition from one view to another view of the component may be implemented by those functions.

In one embodiment, the definition of a new SCS content type comprises a set of procedures to integrate that type with SCS preset sharing tools, including but not restricted to: content selection tools (e.g., a magnet tool 630 in FIG. 6F) and content generation tools (e.g., a microphone tool 630 in FIG. 6F). SCS sharing tools may interact with SCS share source views in order to select or generate content type instances. Since SCS share source's views may operate in various technologies, SCS sharing tools may also operate on them. For that reason, content types are defined on the SCS's UTDS, according to an embodiment of the present invention.

In one embodiment, a SCS can offer its registered users and applications functionality for creating, maintaining and sharing SCS sharing tools. In one embodiment, a SCS sharing tool can be authored by the SCS, a SCS registered user or a SCS registered application. In one embodiment, a SCS sharing tool can be shared with any SCS registered application, shared with a particular group of SCS registered applications or kept private to its author. In one embodiment, the SCS Licensing API manages SCS sharing tools.

To illustrate how a content type may integrate with a SCS preset sharing tool, suppose that a SCS have a content generation tool called "Screenshot" that let users to take a screenshot of a portion of the screen. The Screenshot tool may expose a property called "Format" and a property called "Data" to be used by content types integrating with it. The "Format" property may hold a string describing the format of the image generated by the tool and the "Data" property may hold an array of bytes representing the image data.

The following example shows a portion of the definition of a SCS content type where said type indicates to the SCS how to integrate with the "Screenshot" content generation tool described in the previous example, according to an embodiment of the present invention.

```
--- In a DDL File
class ImageContent extends Content
            implements IUse<ScreenshotTool> {
    //some content removed for simplicity.
    ImageFormat: string;
    ImageBits: string;
    UseTools: (tool) => {
        if (tool instanceOf ScreenshotTool){
            this.ImageFormat = tool.Format;
            this ImageBits = tool.Data;
        }
    }
}
```

The implementation of the SCS preset interface "IUse< >" is used to list which SCS sharing tool the content type being defined is to integrate with, according to an embodiment of the present invention. In the example above, "IUse<ScreenshotTool>" indicates that the content type "Imagecontent" will be integrated with the Screenshot tool, represented by "ScreenshotTool". In one embodiment, a content type may also indicate that it integrates to multiple by using TypeScript's union types as in "IUse <ATool|AnotherTool>". The implementation of "IUse< >" also enforces the definition of function "UseTools" in the class that implements the interface, according to an embodiment of the present invention. In one embodiment, said function may be used to indicate how the integration is to take place, particularly by assigning the tool generated data to the corresponding content type instance properties.

In one embodiment, the SCS enables for the definition of abstract content types, which are content types for which some functionality (e.g., selection criteria or rendering procedures) is not defined, but needs to be defined by derived content types. In one embodiment, a SCS content type can be defined by extending a SCS preset content type whether it is abstract or not (e.g., as the definition of "ImageContent" in the examples above, according to an embodiment of the present invention).

The following code illustrates the definition of a SCS abstract content type named "Content", according to an embodiment of the present invention. Abstract content can also be authored by registered users and applications.

```
abstract class Content {
  IsValid: boolean; //public
  protected abstract IsValid(context: SharingContext): boolean;
  protected abstract Parse(element: any){ }
  protected abstract Render( ): any { }
}
```

In one embodiment, the SCS offers functionality that enables the definition of dynamic content types. Dynamic content types embody a mechanism for indicating the SCS a procedure for resolving content types at parse time. Such functionality and the resolution procedures it comprises are referred as the SCS's Dynamic Content Type Resolution API. According to an embodiment, the Dynamic Content Type Resolution API comprises the following features:
(a) A mechanism for indicating the SCS to parse the content to be parsed using a specific content type.
(b) A mechanism for indicating the SCS to parse the content to be parsed using a content type resolved according to a SCS predefined resolution policy.
(c) A mechanism for accessing the content type instance produced by (a) or (b).
(d) A mechanism for defining resolution criteria by combining all of the previous and other mechanisms that may be offered by the SCS.

The following example illustrates the definition of a dynamic content type named "Smart Image", according to an embodiment of the present invention:

```
class SmartImageDynamicContent extends DynamicContent {
  constructor( ) {
    super("Smart Image"); //content type's identifier
  }
  Resolve: ( ) => {
    if (Instance<AnotherImageContent>( ).IsValid &&
    Instance<AnotherImageContent>( ).Url.length > 15)
      return Be<DefaultImageContent>( );
    return
      Be<CuteImageContent>( ) ||
      Be<LargeImageContent>( ) ||
      Be<ImageContent, OfficialResolutionPolicy>( )
  }
}
```

In this example, a dynamic content type named "Smart Image" has been defined by extending the SCS preset class "DynamicContent". Function "Resolve" is used to indicate the resolution criteria (as mentioned in item d). In one embodiment, function "Resolve" is available for classes derived from "DynamicContent" and can be overridden to delineate the resolution criteria of the class being defined.

Two different versions of a generic function named "Be" have been included in the example: "Be< >( )", which embodies item a, and "Be<,>( )", which embodies item b. Each of them may have a corresponding version of function "Instance" ("Instance< >( )" and "Instance<,>( )"), that can be used to access the content type instance produced by the parsing operation, according to item c. Functions "Be" and "Instance" are also inherited from "DynamicContent", according to an embodiment of the present invention.

The first version, "Be< >( )" embodies a mechanism for indicating the SCS to parse the content to be parsed using the content type specified in the generic parameter (as mentioned in item a); for example, in the definition of class "SmartImageDynamicContent" presented above, "Be<CuteImageContent>( )" indicates to the SCS to parse the content to be parsed into content type "CuteImageContent". If said parsing operation returns a valid instance, the dynamic content type is said to be resolved into content type "CuteImageContent" and function "Be" returns true. Otherwise, "Be<CuteImageContent>( )" returns false and the resolution criteria (defined by "Resolve") moves into the next strategy, which is to attempt to resolve the dynamic content type into content type "LargeImageContent".

Function "Instance< >( )" operates like function "Be< >( )", but instead of returning a flag, it returns the content instance created by the parsing operation. To test if the instance returned is a valid instance, property "IsValid", which is inherited from "Content" may be probed as in "Instance<AnotherImageContent>( ).IsValid" (from the example above), according to an embodiment of the present invention.

The second version of function "Be" shown in the example, "Be<,>( )", comprises a second type parameter that represents a content resolution policy. In one embodiment, a content resolution policy is a procedure to be followed by the SCS to resolve a dynamic content type into a specific content type that comprises resolution criteria which may depend on the sharing context of the content to be parsed. In order for a resolution policy to be resolved into a specific content type, the content type must indicate that it supports said resolution policy.

The following example illustrates how a content type named "Cute Image" indicates to the SCS's Dynamic Content Type Resolution API that it supports a resolution policy named "The Official Content Resolution Policy", according to an embodiment of the present invention.

```
--- In a DDL File
class OfficialExampleImageContent extends ImageContent
              implements ISupport<OfficialResolutionPolicy> {
  constructor( ) {
    super("Example Image");   //content type's identifier
  }
  //some content removed for simplicity.
}
```

In the example above, the implementation of the SCS preset interface "Isupport< >" is used to indicate a list of resolution policies supported by the content type being defined, for instance, a resolution policy named "Official Content Resolution Policy" that is represented by the SCS preset class "OfficialResolutionPolicy", according to an embodiment of the present invention. In one embodiment, a content type may indicate that it supports multiple resolution policies by using TypeScript's intersection types as in "ISupport<AResolutionPolicy&AnotherResolutionPolicy>".

In one embodiment, the resolution policy named "Official Content Resolution Policy" is provided by the SCS (represented by "OfficialResolutionPolicy" in the example above). The Official Content Resolution Policy resolves a base content type into a final content type if all the following conditions are met:
(a) the final content type is derived from said base content type
(b) the final content type supports said policy
(c) the final content type was authored by the application from where the content is ultimately being resolved (e.g., to parse content).

For example, suppose the SCS registered application "Example", whose domain name and SCS identifier is "example.com" were the author of "OfficialExampleImageContent" (defined above). The type "OfficialExampleImageContent" would be resolve by "Be<ImageContent, OfficialResolutionPolicy>( )" in the following instances:

(a) the content being parsed is inside the Windows desktop version of application Example.
(b) the content being parsed is inside the Apple iPhone version of application Example.
(c) the content being parsed is inside a webpage loaded into a browser and its URL is under the domain "example.com".

The Official Content Resolution Policy may be used by applications to provide their official version of a content type, according to an embodiment of the present invention. For example, a type named "YouTube Video" may have multiple extensions in the SCS's UTDS, one of which may be called "Official YouTube Video" and be authored by YouTube itself supporting The Official Content Resolution Policy. In that extension of the "YouTube Video" content type, YouTube itself would implement how to select its videos from within its website and application versions (e.g., for iPhone or Android).

In one embodiment, content resolution policies define constrains that are enforced by the Dynamic Content Type Resolution API. For example, in one embodiment, the Dynamic Content Type Resolution API prevents a CSC registered application from being the owner of two content types that extend the same base content type for the Official Content Resolution Policy. That restriction prevents the Dynamic Content Type Resolution API from running into ambiguity cases when resolving dynamic content types under the Official Content Resolution Policy.

In one embodiment, a SCS can offer its registered users and applications functionality for creating, maintaining and sharing resolution policies. In one embodiment, resolution policies can be authored by the SCS, a SCS registered user or a SCS registered application. In one embodiment, a resolution policy can be shared with any SCS registered application, shared with a particular group of SCS registered applications or kept private to its author. In one embodiment, the SCS Licensing API manages resolution policies.

In an embodiment of the present invention, a SCS may provide a variety of techniques for controlling access to sharable content. For example, the SCS may offer functionality comprising:

(1) A mechanism for SCS share targets to restrict incoming content from certain SCS share source views.
(2) A mechanism for SCS share source views to limit the exposure of available sharable content to certain SCS share targets.
(3) A mechanism for SCS registered users to limit the content types that sections of their linked applications can receive, in the scope of their user accounts.
(4) A mechanism for SCS registered applications to authorize SCS share targets to access some of their protected resources.

In one embodiment, the SCS provides SCS share targets with a mechanism to restrict incoming content from certain SCS share source views.

In one embodiment a SCS registered application can select, from a list of SCS associated applications provided by the SCS, a subset of said applications from which potential sections of it should not receive or should only receive content. For example, Media Player One 120 may indicate to the SCS that its potential sections satisfying the pattern "Sound Effect>[name]" should not accept any content from the SCS subscribed application "File Explorer One" 112, according to an embodiment of the present invention, by evaluating the following condition in its validation function (e.g., function "IsValid"): "if (context.sourceId==='File Explorer One') return false;".

In one embodiment, a SCS registered application can indicate to the SCS that some potential sections of it should not receive or should only receive content from applications that offer a service listed in a specific set of service types predetermined on the SCS. For example, Media Player One 120 may indicate to the SCS that its potential sections satisfying the pattern "Sound Effect>{name}" should not accept any content from a SCS subscribed application that is a File Explorer by evaluating the following condition in its validation function (e.g., function "IsValid"): "if (context-.sourceServices.indexOf(IdOf<FileExplorerService> ( ))!==-1) return false;".

In one embodiment a SCS registered application can provide the SCS a set of application view identifiers and indicate to that SCS that potential sections of it should not receive or should only receive content from the application views corresponding to those identifiers. For example, Media Player One 120 may indicate to the SCS that its potential sections satisfying the pattern "Sound Effect> [name]" should not accept any content from a web page which URL starts with "www.Example.com/badexamples/" by evaluating the following condition in its validation function (e.g., function "IsValid"):

"if (context.contentViewId.match(/https?:Wwww\.example\.comVbadexamplesV([^#\&\?]*).*/)) return false;".

In addition to define restrictions for incoming content at the application section level, in one embodiment, the SCS enables SCS share targets to define restrictions for incoming content at the application level. The following example illustrates how Media Player One 120 may reject any content coming into any of its sections from File Explorer One 112, according to an embodiment of the present invention.

```
class MediaPlayerOneApplication extends Application
                implements IHaveA<PlayListsApplicationSection>
                implements IRestrictIncomingContent {
    constructor( ) {
        super("Media Player One"); //application's identifier
    }
    RestrictIncomingContent: (context: SharingContext) => {
        if (context.sourceId === 'File Explorer One') return true;
    }
}
```

In the example above, the implementation of the SCS preset interface "IRestrictIncomingContent" enforces the definition of function "RestrictIncomingContent" in the class that implements that interface, according to an embodiment of the present invention. In one embodiment, said function may be used to define restrictions that apply to all section of the application represented by the class implementing the interface.

In embodiments where restrictions for incoming content may be defined at multiple levels, the effective set of restrictions for incoming content get computed according to a predefined cascading rule. For example, according to an embodiment of the present invention, the effective set of restrictions for content incoming to an application section is the union of that section's restrictions and the application level restrictions.

Other ways to restrict incoming content from certain SCS share source views into potential sections of a SCS share target can be implemented similarly, according to the restriction formulation capabilities for incoming content existing in different embodiments of the present invention. Different embodiments may offer different restriction formulation capabilities for incoming content, depending on factors such as but not limited to: their implementation of the Share Context and the capabilities of the SCS's Data Definition Language.

In one embodiment, the SCS provides SCS share source views with mechanism to limit the exposure of available sharable content to certain SCS share targets. That mechanism is also referred as Content Exposure API. In one embodiment, the Content Exposure API comprises an Annotation System, an Exposure Policy and a Restriction Approval System.

The Content Exposure API's Annotation System is a mechanism for indicating the exposure scope of available sharable content of a SCS share source view. In one embodiment, A SCS share source view can limit the exposure of a subset of its available sharable content by excluding a group of SCS share targets from receiving that content. In order to achieve that, said content is annotated with directives provided by the Annotation System. The nature of those directives is relative to the technology on which the content to be annotated operates. For a simple example, in one embodiment, a SCS share source view with HTML content can restrict access to a DOM element by adding a "data-scs-deny-app" attribute to that element. An annotation like "data-scs-deny-app='Cloud Storage One'" in a DOM element indicates to the SCS that said element should not be made sharable with application Cloud Storage One 122. Content that is annotated to be restrained from a SCS share target is also referred as "content protected from" that SCS share target or, for simplicity, protected content.

The Content Exposure API's Exposure Policy indicates to the SCS how to manage content annotated by the Annotation System (e.g., protected content). In one embodiment, the Content Exposure API can operate under "The Strict Policy", which indicates to the SCS to prevent users from sharing protected content, of a SCS share source view, to the corresponding restricted SCS share targets. In another embodiment, the Content Exposure API can operate under "The Flexible Policy", which indicates to the SCS to prevent users from sharing protected content, of a specific SCS share source view, to a corresponding restricted SCS share target, only if that SCS share target has indicated to the SCS that it acknowledges the content protection rules that are specified by said SCS share source view.

The SCS's Content Exposure API's Exposure Policy does not have to be fixed or unique. In one embodiment, the sharing context may determine the type of policy to be used. For example, the SCS may rule that when a SCS share source is a web browser a The Flexible Policy will be effective by default and when a SCS share source is a banking application The Strict Policy will be effective. In one embodiment, the SCS may resolve the policy to be used by applying a set of cascading rules for qualifying policies; for example, the fact that the SCS share source is a banking application, loaded in the web browser of the previous example may have the SCS determine that the Content Exposure API's must operate under The Strict Policy, instead of The Flexible Policy which is the default for said web browser, according to the previous example.

The Content Exposure API's Restriction Approval System enable SCS share targets to indicate to the SCS under which conditions content restrictions specified by SCS share source views should be honored, when operating under The Flexible Policy. In one embodiment, the Restriction Approval System can be implemented by means of functions that evaluate a set of conditions to determine whether or not content exposure restrictions present in potentially incoming content should be honored. For example, according to an embodiment of the present invention, the definition of a set of potential application sections may include one of said functions, called "RestrictionsApproved", whose definition is enforced by implementing the SCS preset interface "IAproveRestrictions" as follows:

```
@route("Play Lists > (name)")
class PlayListsApplicationSection extends ApplicationSection
                       implements IAproveRestrictions {
  //other class definition elements omitted for simplicity
  RestrictionsApproved: (context: SharingContext) => {
    return context.sourceId === 'Media Player Two' ||
        context.sourceServices.indexOf
        (IdOf<CloudStorageService>( )) !== -1 ||
        context.contentViewId.match(/https?:\/\/www\.example\.com\/
        badexamples\/(['#\&\?]*).*/));
  }
}
```

In this example, application Media Player One 120 indicates to the SCS that when operating under a The Flexible Policy, it must honor the restrictions imposed to protected content potentially incoming to a potential application section satisfying the pattern "Plat Lists>(name)" if said protected content:

(a) Is coming from an application whose identifier is "Media Player Two" OR (b) Is coming from an application that is a cloud storage service OR (c) Is coming from an application view (e.g., a web page) whose identifier starts with "www.Example.com/badexamples/".

Other ways to honor restrictions of potentially incoming protected content can be implemented similarly in the dedicated functions of the application sections definition. Different embodiments may offer different ways to honor restriction for incoming protected content, depending on factors such as but not limited to: their implementation of the Share Context and the capabilities of the SCS's Data Definition Language.

In addition to defining functions like "RestrictionsApproved", at an application section definition level, in some embodiments, a similar function may also be defined at the application level. In those embodiments, and other embodiments, a plurality of said functions may be defined at different levels interacting according to a predefined cascading rule. For example, according to an embodiment of the present invention, a function "RestrictionsApproved" defined at an application section level may override the outcome of a function "RestrictionsApproved" defined at the application level.

In one embodiment, a Context Exposure API operating under a The Flexible Policy can have the SCS notify its users when they are attempting to share content that is being restricted by the SCS share source's active view which restrictions are not honored by the SCS share target. The final decision to share the content is up to the user performing the sharing action.

In order to illustrate the operation of the Content Exposure API, consider the following example, which assumes that File Explorer One 112 is running on a Windows Operative System and is associated with a SCS, Cloud Storage One 122 is registered to the same SCS and the Content Exposure API of the Association API operates under The Strict Policy.

When the file explorer navigates to a specific folder such as "Pictures", the folder content is visualized; therefore, a folder represents a view of the file explorer application. In that scenario, files and folders inside "Pictures" represent the available sharable content of that application view. The Content Exposure API's Annotation System, for this scenario, interacts with files and folders of the WINDOWS technology by using a file called "deny.scs", which is inside folder "Pictures". File "deny.scs" is not considered sharable content by the SCS Association API; therefore, it cannot be shared through the SCS. The purpose of "deny.scs" is to list SCS registered applications from which some content of a folder should be protected. File "deny.scs" may contain a single line such as "{'*.bmp', 'Cloud Storage One'}" meaning that bitmap files inside the folder containing "deny.scs" (e.g., "Pictures") should not be made available by the SCS to be shared with Cloud Storage One 122 (e.g., should not be able to be saved into Cloud Storage One's Cloud). For this example, since the Content Exposure operates under The Strict Policy, the SCS Sharing API prevents bitmap files inside the Pictures folder from being shared with Cloud Storage One 122.

For another example illustrating the operation of the Content Exposure API, ponder that Web Browser One 110 is associated with a SCS through a web browser extension 130, Cloud Storage One 122 is registered to the same SCS, and the Content Exposure API operates under The Flexible Policy.

A web page, which represents a view of the web browser application, may restrict access to a DOM element by adding a "data-scs-deny-app" attribute to that element. By annotating a DOM element of the web page which URL is "http://example.com" with the attribute assignment "data-scs-deny-app='Cloud Storage One'" that web page indicates to the SCS that said element should not be considered sharable with Cloud Storage One 122. Since the Content Exposure operates under The Flexible Policy, the SCS Sharing API prevents the protected content of the mentioned web page from being shared to Cloud Storage One 122 only if Cloud Storage One had indicated to the SCS, via the Restriction Approval System, that it acknowledges restricted content in "http://example.com". In case Cloud Storage One 122 had not made such indication to the SCS, the SCS Sharing API does not prevent the protected content of the mentioned web page from being shared to Cloud Storage One 132; however, it makes the SCS to warn the user about the fact that "http://example.com" does not recommend that content to be shared with Cloud Storage One when it attempts to share said content with Cloud Storage One.

The Content Exposure API also comprises a server-side component on the SCS that is used to reevaluate the content exposure rules on the server side validation previously mentioned for step 804 (FIG. 8). When an application issues an annotation for a set of its application views, it also registers the annotation in the server-side component so that the content exposure rules can be reevaluated on the SCS server(s). This reevaluation is necessary since the client side directives may be altered by a user (e.g., file "deny.scs" or attribute "data-scs-deny-app" from previous examples may be altered or deleted by the user).

In one embodiment, the SCS provides SCS registered users with a mechanism to limit the content that sections of their linked applications can receive, in the scope of their user accounts. In one embodiment, a SCS registered user linked to a SCS share target can restrict the types of content that sections of that target application can receive and can also set requirements to be met by content incoming to some of said sections, in the scope of their user accounts. In one embodiment, some of those requirements may depend on data contained in the sharing context.

Figure 10:
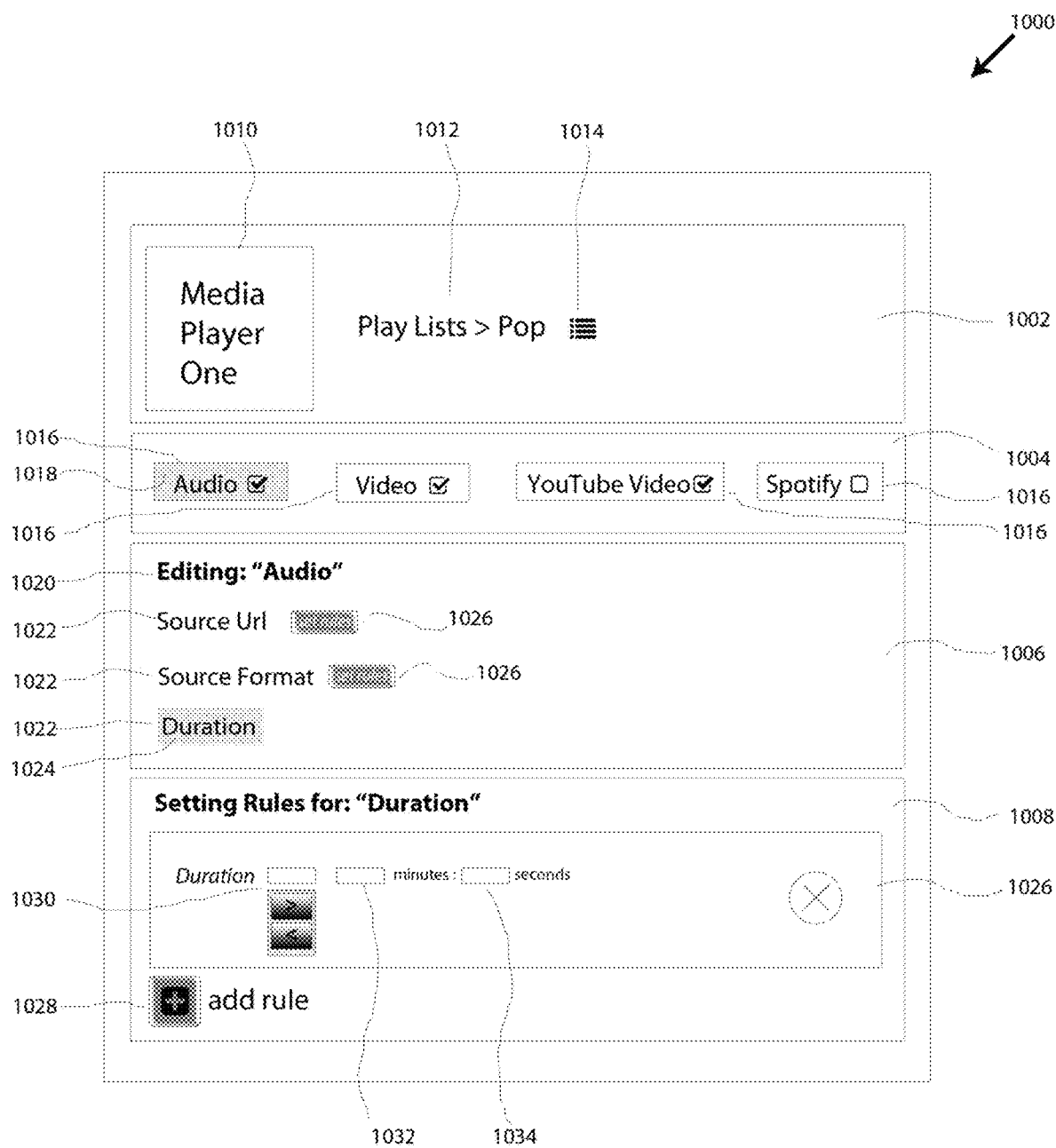
FIG. 10 depicts an example of a Target Section Settings View of a SCS User Interface, according to an embodiment of the present invention.

FIG. 10 depicts an example of a Target Section Settings View 718 (also 1000) of a SCS User Interface 706, according to an embodiment of the present invention. In that view, a user can restrict the types of content that a section of an application can receive and set requirements for incoming content, in the scope of their user accounts. View 718 comprises a target section 1002, a content types section 1004, a content properties section 1006 and a rules section 1008.

The target section 1002 shows the target application 1010 and the section of it 1012 whose settings are being edited. It also comprises a button 1014 that enables the user to change the current target section 1012 into another section of the target application or even change the target application 1010.

The content types sections 1004 comprises a list of the content types 1016 that the target application section can receive. Each of those content types has a checkmark associated which initially is shown checked. By unchecking a checkmark, the user indicates to the SCS that the target application section 1012 must not receive the content type associated with that checkmark. For example, in 1000 a user unchecked the checkmark associate with content type "Spotify", therefore the section "Play Lists>Pop" of application Media Player One cannot receive content of type "Spotify", for said user.

The content properties section 1006 displays properties 1022 of the content type 1016 that is selected 1018 in 1004, for which requirements can be set. The selected content type is also listed in 1020. For example, in 1004 content type "Audio" has been selected by the user and consequently the properties section 1006 is showing a set of properties 1022 of the "Audio" content for which requirements can be set. Those properties are "Source Url", "Source Format" and "Duration". Next to each property name, a button 1026 is initially shown. A user may set requirements for a property section by clicking the "set rules" button 1026 next to the property. When those buttons are clicked they disappear and the rules section 1008 loads a set of tools that enables the user to set requirements for that content type property. In the properties section 1006, property "Duration" has no "set rules" button next to it because it was previously clicked by the user, so it disappeared. Upon clicking that button, the rules section 1008 was loaded with a set of tools to set requirements for the "Duration" property of the "Audio" content type.

The rules section 1008 comprises one or more rule sections 1026 and an add rule button 1028. Each rule section 1026 comprises a set of tools that enable the user to set a requirement for the selected property 1024. For example, the rule section 1026 contains a dropdown list 1030 where the user can select either ">" or "<", a text box 1032 to input a number representing minutes and a text box 1034 to input a number representing seconds. By using said tools, the user can set a requirement such as "duration>1 minutes: 20 seconds" to audio content incoming to the "Play Lists>Pop" section of Media Player One.

The add rule button 1028 enables the user to add a new rule section. For example, if the user in the previous example wanted to add another requirement such as "duration<5 minutes: 10 seconds" it could do that by clicking button 1028 and setting that requirement in the new rule section consequently added.

Other embodiments may enable the formulation of more advanced rules that may comprise multiple properties of a content type.

In one embodiment, the SCS provides a mechanism for a SCS registered application to authorize other SCS registered applications to access some of their protected resources, which can be classified into user owned resources or application owned resources. In one embodiment, at a high level, said mechanism can be divided into two processes: the Resource Authorization Declaration and the Content Access Negotiation.

The Resource Authorization Declaration is a process where a SCS registered application indicates to the SCS a set of potential protected resources of itself, which can be user owned resources or application owned resources, for which access can be granted to some other SCS registered applications. Said process comprises a mechanism to describe the mentioned set of potential resources and a mechanism to describe the group of SCS registered application to which access to those resources can be granted.

The Content Access Negotiation is a process where the SCS attaches authorization tokens to content being shared before it is submitted to the target application. Those tokens are attached to content that contain references to protected user resources whose owner applications have indicated to the SCS to grant access to other applications, according to the corresponding Resource Authorization Declaration. SCS share targets receiving those authorization tokens can access the associated protected resources by sending the tokens in the resource access requests.

The following example illustrates how an email application named "Email Example", registered to the SCS, can indicate in its Resource Authorization Declaration that the SCS can grant access for any file whose URL starts with "https://emailexample.com/attachments/", which is owned by a linked user, to any SCS registered application to which said user is also linked, according to an embodiment of the present invention. The Resource Authorization Declaration is indicated inside the definition of class "EmailExampleApplication" which extends the SCS preset class "Application", according to an embodiment of the present invention.

```
class EmailExampleApplication extends Application
                implements IAuthorize {
    constructor( ) {
        super("Email Example");   //application's identifier
    }
    ResourceAuthorizations: Array<ResourceAuthorization> = [ new
    UserResourceAuthorization( ){
        Urls: ["https://emailexample.com/attachments/*"],
        GrantAccessTo: (app: Application) => {
            return true;
        }
    }];
}
```

In the example above, the implementation of the SCS preset interface "IAuthorize" enforces the definition of property "ResourceAuthorizations" in the class that implements that interface, according to an embodiment of the present invention. In one embodiment, to said property a sequence of instances of classes derived from the SCS preset class "ResourceAuthorization" can be assigned, in particular, instances of the SCS preset class "UserResourceAuthorization". Each of those instances represents an authorization rule for protected user resources.

Instances of "UserResourceAuthorization" comprise a property named "Urls" to which a collection of URLs or URL patterns, representing user owned protected resources of the application, may be assigned. Those resources are the ones whose access may be granted to other SCS registered applications on behalf of common users. The set of said other applications can be indicated by providing an implementation for function "GrantAccessTo" in the "UserResourceAuthorization" class instance. Function "GrantAccessTo" is a filter that the SCS applies to all registered applications to build the subset of the registered application that may access the resources specified in property "Urls" of the "UserResourceAuthorization" instance. For the previous example, all applications pass the filter. For another example, if application "Email Example" wanted to grant access to the specified resources only to Cloud Storage One 122, line "return true" in the previous example must be replaced with "return app.Id=='Cloud Storage One'".

As it was mentioned before, in one embodiment, the secure communication channel between a registered application and the SCS comprises an authorization mechanism comprising a functionality that can enable the SCS to authorize some other registered applications to access a given subset of the resources of that application; provided that the application authorized the SCS to authorize those other registered applications to access said resources. In one embodiment, the Resource Authorization Declaration of an application is a necessary element of the authorization that the application issues to enable the SCS to authorize some other applications to access a given subset of that application's resources; and the Content Access Negotiation resembles part of the mentioned functionality.

Figure 11:
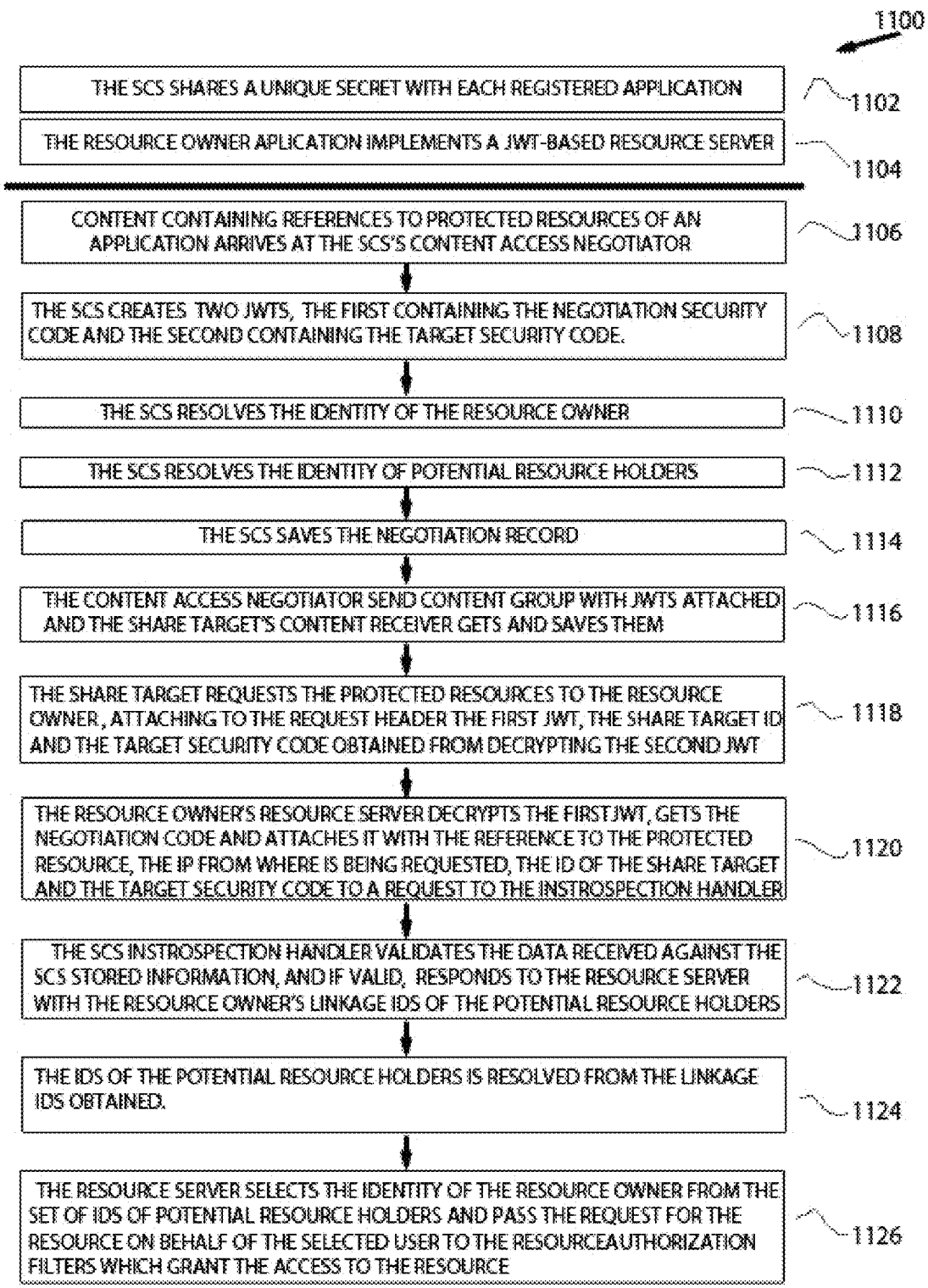
FIG. 11 is a simplified flowchart depicting a high level Content Access Negotiation process, according to an embodiment of the present invention.
Figure 12:
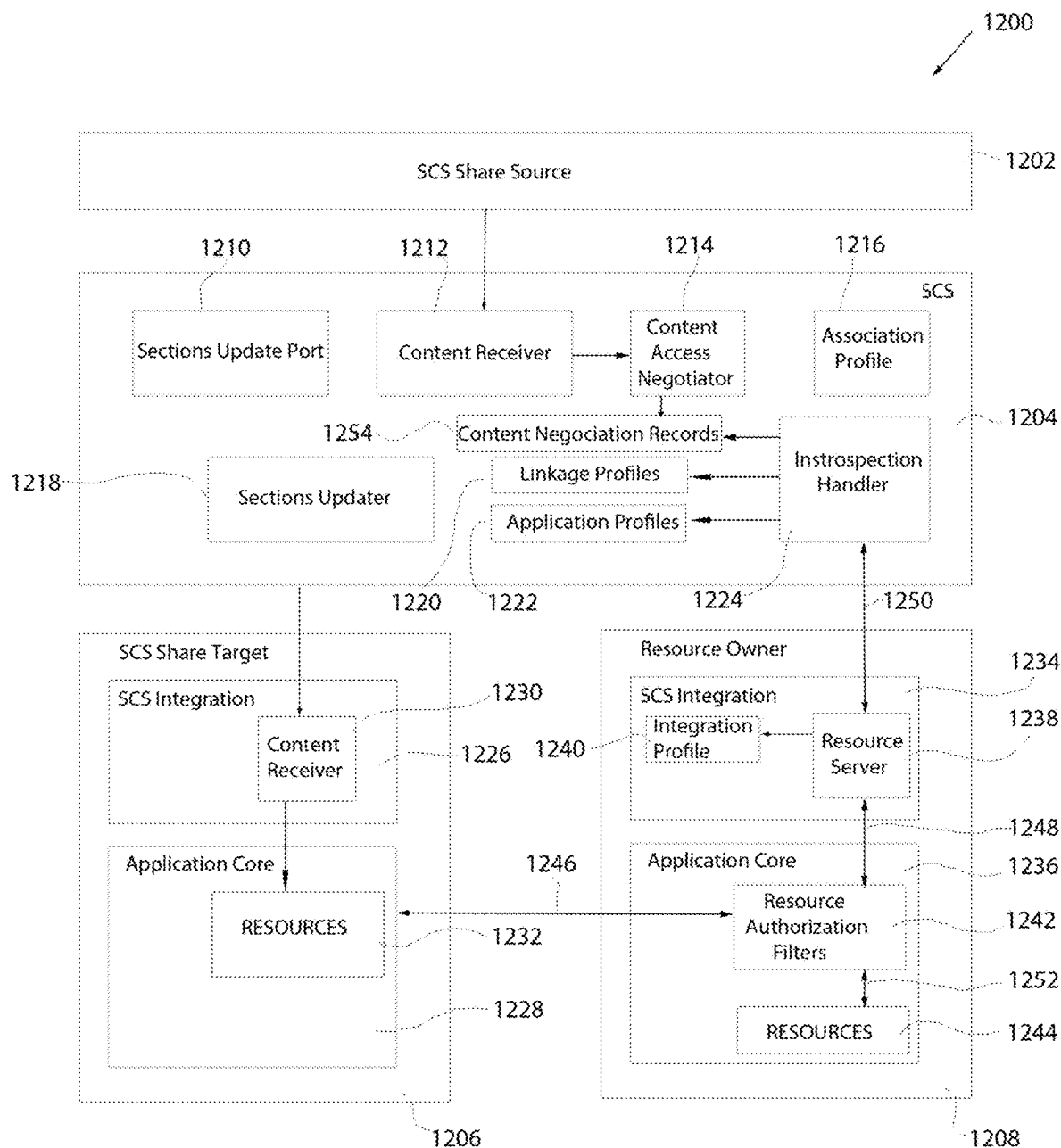
FIG. 12 is a simplified block diagram depicting the different components that interact in a Content Access Negotiation process, according to an embodiment of the present invention.

The Content Access Negotiation may be implemented in various ways, including but not limited to a JSON Web Token (JWT) based system like the one depicted on FIGS. 11 and 12, according to an embodiment of the present invention. FIG. 11 is a simplified flowchart 1100 depicting a high level Content Access Negotiation process, according to an embodiment of the present invention, implemented using JSON Web Tokens. FIG. 12 is a simplified block diagram 1200 depicting the different components that interact in a Content Access Negotiation process, according to an embodiment of the present invention.

At a high level, a Content Access Negotiation process can be divided into steps that are performed at configuration time and steps that are performed at post configuration time.

At configuration time, SCS registered applications and the SCS share a secret that both parties can use to sign and decrypt JWTs (step 1102). The SCS may store that secret on the Application Profile 1222. The secret agreement takes places when applications register to the SCS, according to an embodiment of the present invention. Also at configuration time, the resource owner application implements a JWT-based Resource Server 1238, which can serve protected resources for requests that contain a valid JWT (step 1104). The Resource Server is also integrated with the application's resource authorization mechanism, so that once the resource server resolves the identity of the user on behalf of whom the protected resource is being requested, the application's resource authorization mechanism may proceed to grant access to the requested resource. The application's resource authorization mechanism is represented in FIG. 12 by 1242 and referred as Resource Authorization Filters. All other steps take place at post configuration time.

When a group of content being shared from a SCS share source 1202 to a SCS share target 1206 is passed by the SCS's Content Receiver 1212 (also 918 in FIG. 9) to the Content Access Negotiator 1214 (step 1106) and some of that content contains references to protected resources of a SCS registered application (referred as the Resource Owner 1208) which have indicated, in its Resource Authorization Declaration, that said resources can be accessed by the SCS share target 1206, the Content Access Negotiator 1214 generates two JWTs (step 1108). The first JWT is signed with the secret, from step 1102, which the SCS 1204 shares with the Resource Owner 1208 and contains, in a private claim of its payload, a security code, referred as the negotiation security code, also generated by the SCS. The second JWT is signed with the secret, from step 1102, which the SCS 1204 shares with the Share Target 1206 and contains, in a private claim of its payload, a security code, referred as the target security code, also generated by the SCS.

Subsequently, the SCS resolves the identity of the Resource Owner 1208 based on the references to the protected resources received (step 1110). For example, suppose that the following URLs referencing protected resources of the email application of the previous example are contained in a group of content passed to the Content Access Negotiator 1214: "https://emailexample.com/attachments/attch1" and "https://emailexample.com/attachments/attch2". From these URLs the SCS can infer that the Resource Owner's identifier is "emailexample.com". Once the identity of the Resource Owner 1208 is resolved, the SCS proceeds to resolve the identity or identities of potential SCS users that might be the owners of said protected resources of the Resource Owner 1208 application (step 1112). Said users are referred as resource holder users. For example, if the user on behalf of whom the sharing operation is being performed is also a user of 128, said user would be a potential resource holder user. Another example of potential resource holder user may be a user that owns said protected resources and has granted access to those resources to the user on behalf of whom the sharing operation is being performed; where said access has been granted through the SCS (the SCS functionality for a first user to grant access to its protected resources on a SCS registered application to a second user will be covered later on this paper).

Having at least one potential resource holder user, the SCS saves a record, referred as the negotiation record, containing: the references to the protected resources (e.g., "https://emailexample.com/attachments/attch1" and "https://emailexample.com/attachments/attch2"), the set of potential resource holder users, the identifier of the Share Source 1202, the identifier of the Resource Owner 1208, the identifier of the Share Target 1206, the hash code of the target security code and the hash code of the negotiation security code, which can serve as a lookup key for the negotiation record. The negotiation record is stored in the Content Negotiation Records store 1254 (step 1114).

Once both JWT are generated and the negotiation record is stored in 1254, the Content Access Negotiator 1214 attaches those JWTs to the content group and the SCS 1204 sends it to the SCS Share Target 1206. Consequently, the SCS share target's Content Receiver 1230 gets the content and JWTs and saves them (step 1116).

When the SCS Share Target 1206 needs to access one of those protected resources, it decrypts the second JWT to extract the target security code and attaches it, along with the first JWT to the header of the web request 1246 for the needed resource. In addition to the target security code and the first JWT, the public identifier of the SCS Share Target 1206 on the SCS (e.g., the domain name) is attached to the request header (step 1118).

Upon receiving the request for a protected resource 1246, whose header contains the structure previously described, the Resource Authorization Filters 1242 of the Resource Owner route said request (onto request 1248) to the Resource Owner's Resource Server 1238 (implemented on step 1104). That server 1238 uses the secret, of step 1102, which it shares with the SCS, to decrypt the JWT to obtain the negotiation security code it contains. Next, the Resource Server attaches that security code, the reference to the protected resource being requested, the IP address from where the protected resource is being requested (IP address of the SCS Share Target), the target security code and the public identifier of the SCS Share Target 1206 on the SCS to a request 1250 that the Resource Server 1238 makes, to the SCS Introspection Handler 1224, for the set of Resource Owner's linkage user ids of the potential resource holder users of the protected resource being requested (step 1120).

When the SCS Introspection Handler 1224 receives said request, it hashes the negotiation security code and uses the obtained hash code to retrieve the corresponding negotiation record from the Content Negotiation Records 1254. Once the negotiation record is available, the Introspection Handler 1224 verifies that:

(a) The public identifier of the SCS Share Target 1206 on the SCS obtained from the request is the same as the one in the negotiation record.
(b) The hash of the target security code obtained from the request is the same as the one in the negotiation record.
(c) The IP address from where the protected resource is being requested, obtained from the request, is in the IP white list stored on the Application Profile 1222 of the SCS Share Target 1206.
(d) The reference to the protected resource being requested is included in the negotiation record.
(e) The Resource Owner, which initiated the current request, has the same identifier as the Resource Owner identifier listed on the negotiation record.

Upon that verification, the SCS Introspection Handler 1224 responds to the Resource Server 1238 with the Resource Owner's linkage user ids of the potential resource holders, according to the negotiation record (step 1122).

The Resource Server 1238 then uses the Integration Profile 1240 to translate those linkage user ids into the corresponding identifiers used by the Resource Owner application 1208 for those users (step 1124). Once the identity of the potential owners has been resolved, the Resource Server 1238 selects among them the identity of the actual owner of the resource being requested and then routes the request for the protected resource back to the Resource Authorization Filters 1242 which authorizes the access to the requested (step 1126).

It is important to highlight that in the process described above the SCS Share Target 1206 gets access only to the protected resources of the SCS Resource Owner 1208 that were referenced in the content sent to 1206 by the user; therefore the SCS Share Target 1206 cannot access any other protected resources of this user on the SCS Resource Owner 1208.

In one embodiment of the present invention, the SCS comprises a mechanism for authorizing a SCS share target to access only the resources that are included in a set of protected resources of a SCS registered application when said protected resources are being referenced by content being sent on a sharing operation to said SCS share target on behalf of a user that has access to said protected resources. An example is the process described above.

In one embodiment of the present invention, an application can indicate to its SCS the type of services it offers. In one embodiment, the definition by an application of the types of services it offers comprises selecting the desired types of services from a set of service types that are preset on the SCS (e.g., Payment Service or Cloud Storage); for example: if DropBox, Google Drive, Amazon Drive and Box were registered to a SCS, they might have indicated that SCS that they offer cloud storage services.

In one embodiment, a service is modeled by a class that extend the SCS preset class "Service< >" for which the generic type argument represents the types of content such service expects to receive. For example, a cloud storage service may be defined by the SCS, according to an embodiment of the present invention, as follows:

```
class CloudStorageService extends Service<FileContent> {
    constructor( ) {
        super("Cloud Storage"); //service's identifier
    }
}
```

The following example illustrates how Cloud Storage One 122 may indicate to its SCS the types of services it offers, according to an embodiment of the present invention:

```
class CloudStorageOneApplication extends Application
                implements IHaveA<DocumentsApplicationSection>
                implements IOffer<CloudStorageService> {
    constructor( ) {
        super("Cloud Storage One"); //application's identifier
    }
}
@route("Documents > (name)")
class DocumentsApplicationSection extends ApplicationSection
                implements IAccept<FileContent> {
    constructor( ) {
        super("Documents"); //section's identifier
    }
}
```

In the example above, the implementation of the SCS preset interface "IOffer< >" is used to indicate a list of services offered by an application, for instance, a service named "Cloud Storage" that is represented by the SCS preset class "CloudStorageService", according to an embodiment of the present invention. In one embodiment, an application may indicate that it offers multiple services by using TypeScript's intersection types as in "IOffer<AService&AnotherService>".

In addition to implementing "IOffer< >", the application has to have defined at least one section of it that can receive content of the same type as some service type listed in the generic argument of "IOffer< >", according to an embodiment of the present invention. In the example, an application section named "Documents" that accept content of type "FileContent" is defined.

In other embodiment, the services offered by an application can also return content. In one of those embodiments, for example, a service that receives a type of content "TInput" and returns a type of content "TOutput" may be modeled by a class that extend the SCS preset class "service<,>" for which the generic type arguments represent the types of content such service expects to receive and return as in "class MyService extends Service<TInput, TOutput>". Similarly, an application that offers this type of services has to have defined at least one section of it that can receive content and returns the same types as some service type listed in the generic argument of "IOffer< >". Application sections that are able to return content will be covered later in this document.

In one embodiment, a SCS can offer its registered users and applications functionality for creating, maintaining and sharing service types. In one embodiment, a service type can be authored by the SCS, a SCS registered user or a SCS registered application. In one embodiment, a service type can be shared with any SCS registered application, shared with a particular group of SCS registered applications or kept private to its author. In one embodiment, the SCS Licensing API manages service types.

In one embodiment, some service types defined by the SCS that can be declared by registered applications as services they offer need to pass a verification process conducted by the SCS in order for the SCS to acknowledge that those applications offer said services. For example, a banking application may indicate to the SCS that it offers banking services, but that declaration may not be acknowledged by the SCS until it verifies, using a variety of methods, that such assertion is valid.

In one embodiment, the SCS comprises a mechanism that enables views of SCS registered applications to define regions of them where dynamic information provided by the SCS may be rendered. That mechanism is referred as SCS View Embed System, and the information rendered is referred as SCS View Components. SCS View Components are objects that can be defined to the SCS and can be visually rendered.

In one embodiment, a SCS View Embed System can operate on different technologies relative to the rendering of application views. For example, a SCS View Embed System can operate on the HTML technology, enabling views of SCS registered applications that are rendered from HTML documents to embed a web component for users to interact with the SCS; for instance: next to an image, a web page may embed an HTML implementation of a SCS Share Targets View 714 (FIG. 7), for users to select an application where to send that image.

In one embodiment, a SCS View Embed System comprises an annotation system for registered application's views to indicate to the SCS where to embed SCS View Components and how to customize the way those components look. The annotation system can operate on various technologies. In that embodiment, a SCS View Embed System also comprises a mechanism for applications to define to the SCS said view components.

For example, according to an embodiment of the present invention, for the HTML technology, the SCS View Embed System's annotation system may define a custom HTML tag named "scs-embed", which can be used to indicate to the SCS where the SCS View Component should be rendered within a web page. That tag may have an associated attribute named "embed-id" to specify an identifier that references the functionality of the SCS View Component. In addition, a set of CSS classes may be associated to SCS View Components so that the style of that component can be customized. Those classes may be named following the convention "embed-<class_name>"; for instance: a SCS View Component that displays the SCS Share Targets View 714 may have associated a CSS class named "embed-targets-background" that can be used by the application view hosting said component to customize the style of the background of the list of possible share targets displayed by the component. When a web page containing the tag "scs-embed" is loaded into a SCS associated web browser, the SCS Content Rendering API 712 renders the SCS View Component corresponding to the "embed-id" attribute value and according to the styles indicated via the mentioned set of CSS classes.

In one embodiment, the SCS offers a set of predetermined SCS View Components that can be used by the SCS View Embed System's annotation system. For example, the SCS may offer a SCS View Component which identifier is "Share Targets" that renders a SCS Share Targets View 714. That view component can have an associated attribute named "share-content", where an object representing content to be shared can be assigned. For the HTML technology, according to the previous example, the annotation system may utilize the following tag to render the view component: <scs-embed embed-id="Share Targets" share-content='{"url": "https://emailexample.com/attachments/document1.txt"}'>.

Figure 13A:
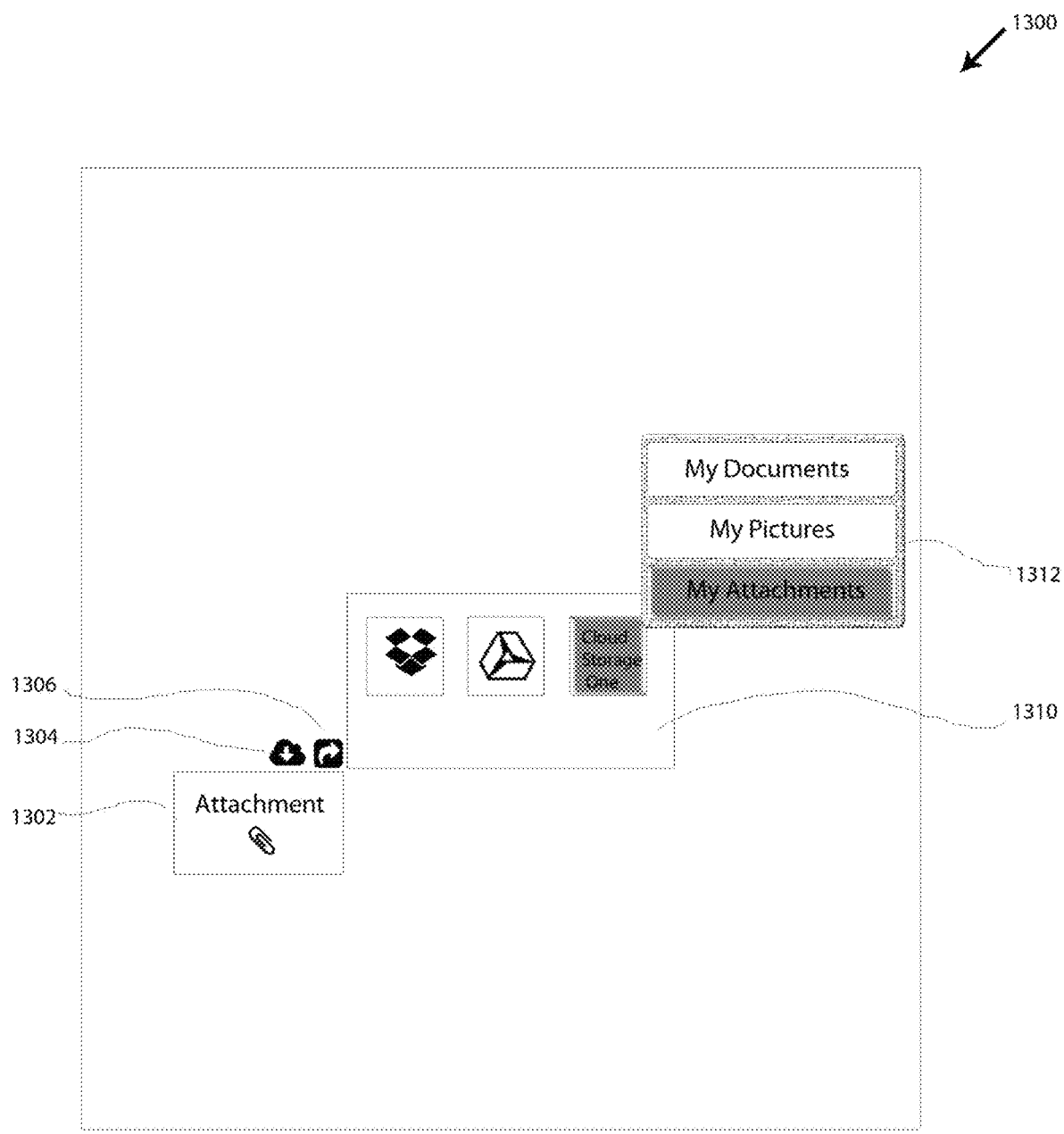
FIG. 13A depicts an example of a portion of a view of an email application, showing a representation of an email attachment which comprises a button that can be used to open a SCS Share Targets View, according to an embodiment of the present invention.

FIG. 13A depicts an example of a portion of a view of an email application showing the representation of an email attachment comprising a button that can be used to open a SCS Share Targets View, according to an embodiment of the present invention. Typically in such scenario, a download button 1304 is provided so that the user can download the attachment. According an embodiment, the use of the HTML tag "scs-embed" may enable the visualization of button 1306, which opens a SCS Share Targets View 1310 (also 714 in FIG. 7) so that users can select a target for the sharing operation.

In one embodiment, the SCS offers functionality to define SCS View Components by extending other SCS View Components already defined. The following example illustrates the definition of a SCS View Component by a SCS registered application, according to an embodiment of the present invention:

```
class CloudStorageShareTargetsViewComponent extends
ShareTargetsViewComponent {
   constructor( ) {
      super("Cloud Storage Share Targets"); //view component's identifier
         this.DisplayTargets = super.DisplayTargets
            .Where(target =>
               target.OfferedService instanceOf CloudStorageService);
   }
}
```

In this example, a view component is defined by extending the preset view component "Share Targets", previously mentioned. The new view component restricts the share targets to be shown to the ones that are cloud storage services. Component "Share Targets", represented by "ShareTargetsViewComponent" exposes a "DisplayTargets" property holding a collection of applications to be displayed when rendered. That collection is restricted by "CloudStorageShareTargetsViewComponent" to show only the applications, in that collection, which offer cloud storage services. For example, in FIG. 13, 1310 shows only the user linked applications that are cloud storage services, and also illustrate how the user may select a target application section from a pop up menu 1312.

In one embodiment of the present invention, the SCS comprises a Type Definition System (TDS) to which every View Component that is defined in the SCS belongs. Said TDS comprises a namespace, referred as the Global namespace, in which every View Component defined possesses a unique identifier. In one embodiment said TDS is a Universal Type Definition System (UTDF) that contains technology-dependent versions of View Component objects.

In one embodiment, a SCS can offer its registered users and applications functionality for creating, maintaining and sharing SCS View Components. In one embodiment, SCS View Components can be authored by the SCS, a SCS registered user or a SCS registered application. In one embodiment, a SCS View Component can be shared with any SCS registered application, shared with a particular group of SCS registered applications or kept private to its author. In one embodiment, the SCS Licensing API manages SCS View Components.

Embodiments of the present invention enable a SCS registered application that presents multiple third party services as choices to perform an action with, to filter these choices by showing only the ones to which the active user of the application is linked on the SCS; provided that the user and the applications that represent said services are registered to the same SCS.

For example, a SCS registered application may show a "Save to Cloud" labeled dropdown that lets its users save content through one of the following cloud storage providers: DropBox, Google Drive, Amazon Drive and Box. Provided the active user, DropBox, Google Drive, Amazon Drive and Box are registered to the same SCS as the application, the dropdown options may be populated by that SCS only with the cloud storage providers relevant to the user-only the ones which the user is linked to. In that example, if the user were neither a client of Amazon Drive nor of Box but a client of DropBox and Google Drive, only DropBox and Google Drive would be populated on the dropdown.

To achieve the above described functionality, the application that presents multiple third party services as choices to perform an action with can embed a SCS View Component that shows the share targets that offer the service corresponding to the action to be performed; for example, for the action of saving a file to the cloud, the "Cloud Storage Share Targets" described on a previous example may be used.

Embodiments of the present invention can enable a SCS registered application to use a third party service to perform certain action with, even though a direct integration between that application and that third party service has not been implemented.

For example, a SCS registered email application that is able to save attachments to the cloud through its integration with Drop Box and Amazon Drive—but is not integrated with Google Drive, would also be able to use Google Drive to safely save those files to the cloud. Even more, it would be able to use, for the same purpose, some other cloud storage applications (e.g., a newly released one), automatically, without implementing any integration to them.

To achieve such functionality, the registered application using the third party services to perform certain type of action (e.g., save a file to the cloud) needs to embed a SCS View Component that shows the share targets that offer the service corresponding to the action to be performed, as described in a previous example. In addition, that application needs to delineate a Resource Authorization Declaration indicating the URLs of the potential resources to be sent to the third party applications to execute the desired action, and the potential applications that may access said resources (e.g., the ones that offer cloud storage services).

In one embodiment, the SCS provides functionality that enables a first user to authorize a second user to send content to an application route indicated the first user; having the application preauthorized the first user to authorize other users to send content to said route. Upon being authorized, the second user can send content to the application route in the same way it would send content to one of its linked application routes. This type of authorization can be referred as the creation of an Application Tunnel.

For example, an SCS registered user called Jorge who is also a linked user of the SCS registered application Media Player One 120 have created the section "Jorge's Birthday Party" on that application. Said section represents a playlist that Jorge wants to play in his birthday party. It accepts video and audio content. Jorge can give access to "Media Player One>Jorge's Birthday Party" to Mary, who is registered to the SCS, but not necessarily a user of Media Player One, so that she can send audio and video content to that route. Therefore, when Mary is browsing the Internet with a browser that is associated to the SCS, and she finds a video that she want to be played on Jorge's party, she can send that video to George's "Media Player One>Jorge's Birthday Party" though the SCS Sharing Interface.

In the previous example, Media Player One 120 has indicated to the SCS that any of its users can authorize other SCS users to send content to their playlists on 120. An example of said authorization, in one embodiment, may be the the use of the following pattern in the definition of Media Player One application sections: "^Play Lists>(name)"; where the use of the "^" at the start of the pattern indicates that this application supports tunneling, or in other words, that any SCS linked user of Media Player One 120 can authorize other SCS users to send content to their playlists on 120.

To support the ability to create Application Tunnels, in one embodiment, the SCS implements an Invitation Component that enables a first SCS user to send an invitation to a second SCS user so that the second user can send content to a route of an application which the first user has access to; where the first user is a user of the application and said route corresponds to application resources owned by the first user in that application; where the second user gets authorized to send content to said application route upon accepting the invitation that was sent to it by the first user.

In one embodiment, the SCS Invitation Component enables a first SCS user that has been authorized to send content to a route of an application to send an invitation, to a second SCS user, so that the second user can send content to said application; provided that the application preauthorized users invited to send content to a route to invite other users to send content to that route. In the previous example, Mary would be able to invite a third user Carl, who is a SCS registered user that is not a user of Media Player One 120, to send audio and video content to "Media Player One>Jorge's Birthday Party". For this scenario, the application may have defined the pattern "^^Play Lists>(name)"; where the use of the "^^" at the start of the pattern indicates that any SCS linked user of Media Player One 120 can authorize other SCS users to send content to their playlists on 120, and that any SCS user that gets authorized to send content to a playlist of 120 can authorize other SCS users to send content to that playlist of 120.

In one embodiment, the SCS Invitation Component is queried by the SCS Sharing Interface to include in the list of potential targets it shows to the active user, applications tunnels through which said user can share content; that is, applications routes to which the active user has been invited to send content. Said Invitation Component is also queried in the server side validation process 808 by the SCS Content Receiver 918 (in FIG. 9, also 1212 in FIG. 12) to verify if the content being shared is directed to an application route to which the user sending the content has been invited to send content, and is therefore authorized to send the content.

Users do not have to be linked to the applications they send content through tunnels or even be users of said applications.

In one embodiment, tunnels provide a mechanism for a first application to access a protected resource of a user on a second application; where said user is not a user of the first application and there is no direct integration implemented between the first and second applications.

For example, consider, in an embodiment that implements The Content Access Negotiation procedure depicted on FIG. 11 and FIG. 12, an SCS registered user called Jorge who is also a linked user of the SCS registered application Media Player One 120, who created the section "Jorge's Birthday Party" accepting audio and video on that application, and a SCS registered user called Mary who Jorge invites to send media content to "Jorge's Birthday Party". Suppose that Mary is not a user of Media Player One, but a user of an SCS registered application called Music Store One, where users can buy, store and play songs; and that Music Store One has indicated in its Resource Authorization Declaration that the SCS can grant access to any of its user's other applications to the songs purchased by common SCS registered users. When Mary buys a song titled "The Yellow Submarine" and sends it to "Jorge's Birthday Party" on Media Player One 120, the process depicted on FIG. 11 and FIG. 12 guarantees that 120 can play said song.

In one embodiment, the Invitations Component comprises a functionality that enables a first SCS registered user that owns a protected resource of a SCS registered application to grant access to said resource to a second SCS registered user; where said access comprises the second user to be able to send content that references said protected resource to a SCS share target and said share target to be able to access the protected resource; having the application preauthorized the first user to authorize other users to be able to send content that resides in said route. Said functionality of the Invitations Component can be referred as resource delegation.

For example, consider, a SCS registered user called Mary who is a user of an SCS registered application called Music Store One, where users can buy, store and play songs. Mary buys a song titled "The Yellow Submarine" and uses the SCS resource delegation capability to grant access to said song to a SCS registered user named Susan, who is not a user of Music Store One. After being granted said access, any SCS share target that receive content referencing "The Yellow Submarine" song, purchased by Mary, being sent by Susan can access the song.

In the previous example, application Music Store One has indicated to the SCS that any of its users can authorize other SCS users to access the songs they purchased. An example of a way to indicate that authorization, in one embodiment, may be the use of the following pattern in the definition of Music Store One application sections: "My Songs>Shared~"; where the use of the "~" at the end of the pattern indicates that this application supports content delegation, or in other words, that any SCS linked user of Music Store One can authorize other SCS users to send, to a share target, content they purchased and placed in the "Shared" folder.

In one embodiment, the Invitations Component comprises a functionality that enables a first SCS registered user that was granted access to a protected resource of a SCS registered application to grant access to said resource to a second SCS registered user; where said access comprises the second user to be able to send content that references said protected resource to a SCS share target and said share target to be able to access the protected resource; having the application preauthorized the first user to authorize other users to be able to send content that resides in said route. In the previous example, Susan can grant access to the song "The Yellow Submarine" to a third SCS user named Willa; provided that Music Store One had preauthorized the users to which access to songs have been granted to grant access to the songs they have access to. For this scenario, the application may have defined the pattern "My Songs>Shared~~"; where the use of the "~~" at the end of the pattern indicates that any SCS user to which access to a song on Music Store One, located in the "Shared" Folder of a user, has been granted can authorize other SCS users to send that song to a share target.

In an embodiment that implements The Content Access Negotiation procedure depicted on FIG. 11 and FIG. 12, the Content Access Negotiation procedure queries the set of all content delegation rules that have been created by the SCS when resolving the identity of potential resource holders (step 1112). If a user A has granted access to a resource R to a user B, and B is sharing content that references R, A would be included in the set of potential resource holders for resource R in step 1112.

For an example illustrating resource delegation and content tunneling consider all conditions said in the last two examples, in an embodiment that implements The Content Access Negotiation procedure depicted on FIG. 11 and FIG. 12; where George also invites Susan to send content to "Jorge's Birthday Party", and Susan is to send "The Yellow Submarine", to which Mary granted her access. In step 1112, the SCS does not include Susan in the set of potential resource holders, because she is not a user of Music Store One; but it includes in said set Mary, because she delegated access to "the Yellow Submarine" to Susan (who is the sharing user) and also because Mary is a user of Music Store One. Therefore, the set of potential resource holders will have only one element, which is Mary; and the subsequent steps would grant the access to "The Yellow Submarine" to Media Player One 120; since Mary is the actual owner of said song.

In one embodiment, the Invitation Component supports functionality that:
  (a) enables a first user that is authorized to perform a remote action on an application to invite a second user to perform said remote action; provided that the application has authorized the first user to authorize other SCS users to perform said action
  (b) enables an application to authorize a first user that is authorized to invoke a remote action in said application to authorize other SCS users to invoke said remote action.

For example, the SCS registered application named Media Player One 120, may define a set of potential sections with the pattern "Play Lists>((name))"; where the use of the double parenthesis indicates to the SCS that a first SCS linked user of Media Player One 120 can invite a second SCS user to create play lists in Media Player One's first user's account. Upon receiving an accepting that invitation, the second user can create a playlist called "Outsiders" in Media Player One's first user's account, for instance.

For another example, the SCS registered application named Media Player One 120, may define a set of potential sections with the pattern "Play Lists>(((name)))"; where the use of the triple parenthesis indicates to the SCS that a first SCS user who has been authorized to create playlists for certain user of Media Player One 120 can invite a second SCS user to create play lists for said user.

In one embodiment of the present invention, in addition to indicating to the SCS the type of content potential application sections may receive, an application can indicate the type of content it returns. For example, potential sections of Media Player One 120 that satisfy the pattern "Play Lists> [name]" may indicate to the SCS that they return content of type "LinkContent" by implementing the SCS preset interface "IReturn< >", according to an embodiment of the present invention, as in the following example:

```
@route("Play Lists > (name)")
class PlayListsApplicationSection extends ApplicationSection
                implements IAccept<AudioContent|VideoContent>
                implements IReturn<LinkContent> {
  constructor( ) {
    super("Play Lists"); //section's identifier
  }
}
```

In one embodiment, when a SCS Sharing Interface 606 contains valid data ready to be sent to a target application section that returns content, a button that can be used to route the returned content to another application is shown in 610. Upon clicking that button the Applets Editor 720 in a Piping State is loaded (Applets Editor states are detailed below), featuring a back button to return to the SCS Sharing Interface. In that editor, a user can indicate where the returned content may be sent, depending on filtering criteria applied to that content. For example, based on the value of a property of the content type instance being returned, a user may decide whether to send the returned content to a given section of an application or to other section of another application. Once the content forwarding rule is set, the user may return to the SCS Sharing Interface 606 and click the share button 620 for the whole piped sharing operation to unfold. Such content forwarding rule is also referred as an anonymous Applet.

Figure 14:
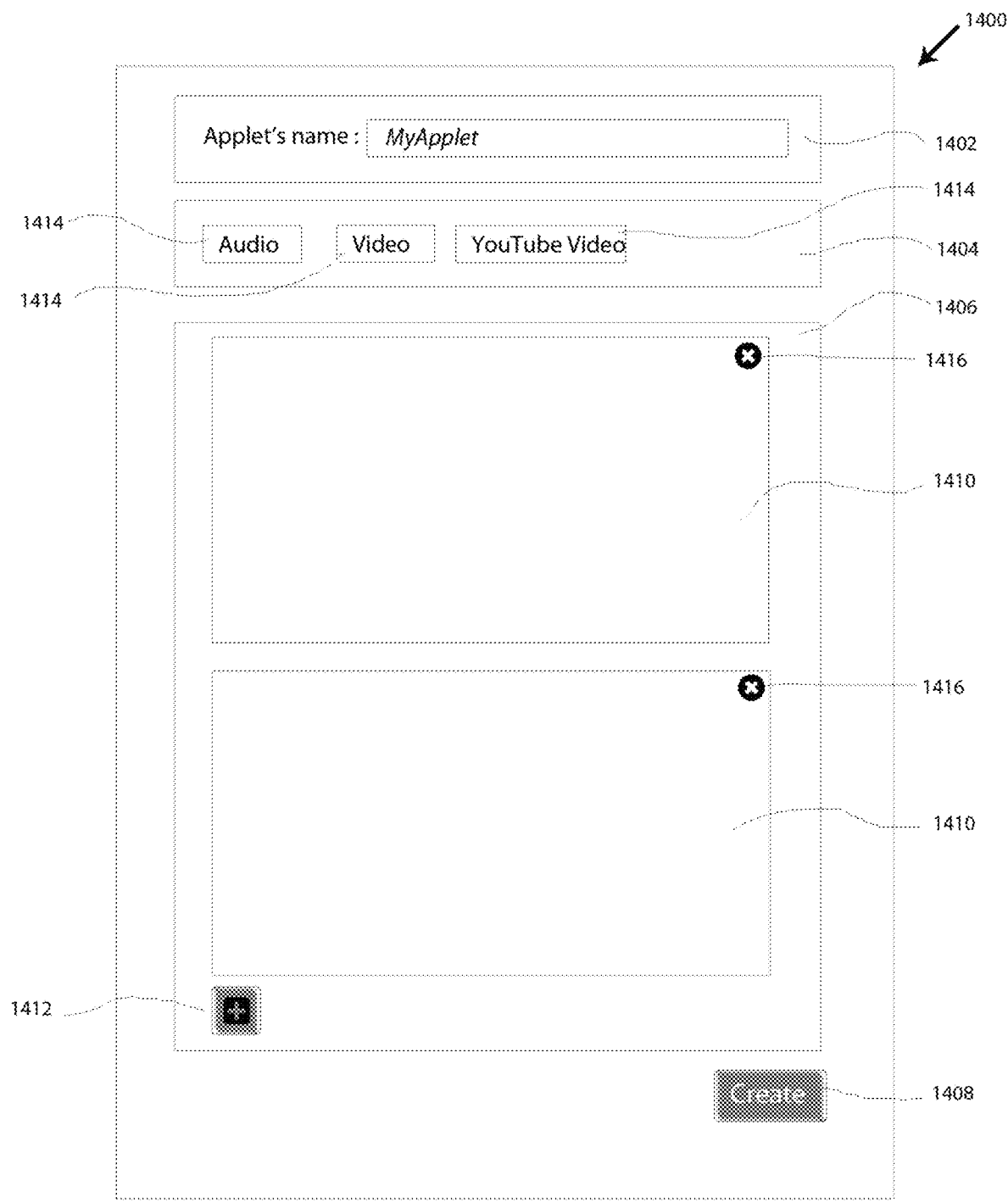
FIG. 14 depicts an example of high level representation of an Applets Editor, in its Initial State, according to an embodiment of the present invention.

FIG. 14 depicts an example of an Applets Editor 1400 (also 720 in FIG. 7) in its Initial State, according to an embodiment of the present invention. An Applets Editor is a tool that enables users to visually define a flow of content across multiple applications by filtering content to create forks, sending the filtered content into target application sections and piping the returned content into the next filter to repeat the process. It comprises a section to specify the name of the Applet being created 1402 (referred as the name's section), a section that shows the types of content that it can receive 1404 (referred as the type's section) and a collection of Target Section Settings Components 1406 (referred as the target's section). The components 1406 are very similar to the Target Sections Settings View 718 (also 1000 in FIG. 10). The Applets Editor can operate in two states: the Initial State and the Piping State, according to an embodiment of the present invention.

Unlike 1400, an Applets Editor in its Piping States does not have the name's section 1402, and features a button that can be used to return to the component that opened it, also referred as the content forwarder, which may be a SCS Sharing Interface 606 or a Target Section Settings Components 1406. When the Applets Editor in a Piping State is opened to edit an anonymous Applet, the content forwarder is the SCS Sharing Interface; and when it is opened to edit a regular Applet, the content forwarder is the Target Section Settings Components 1406 in the previous Applet Editor component of the pipe.

Figure 15:
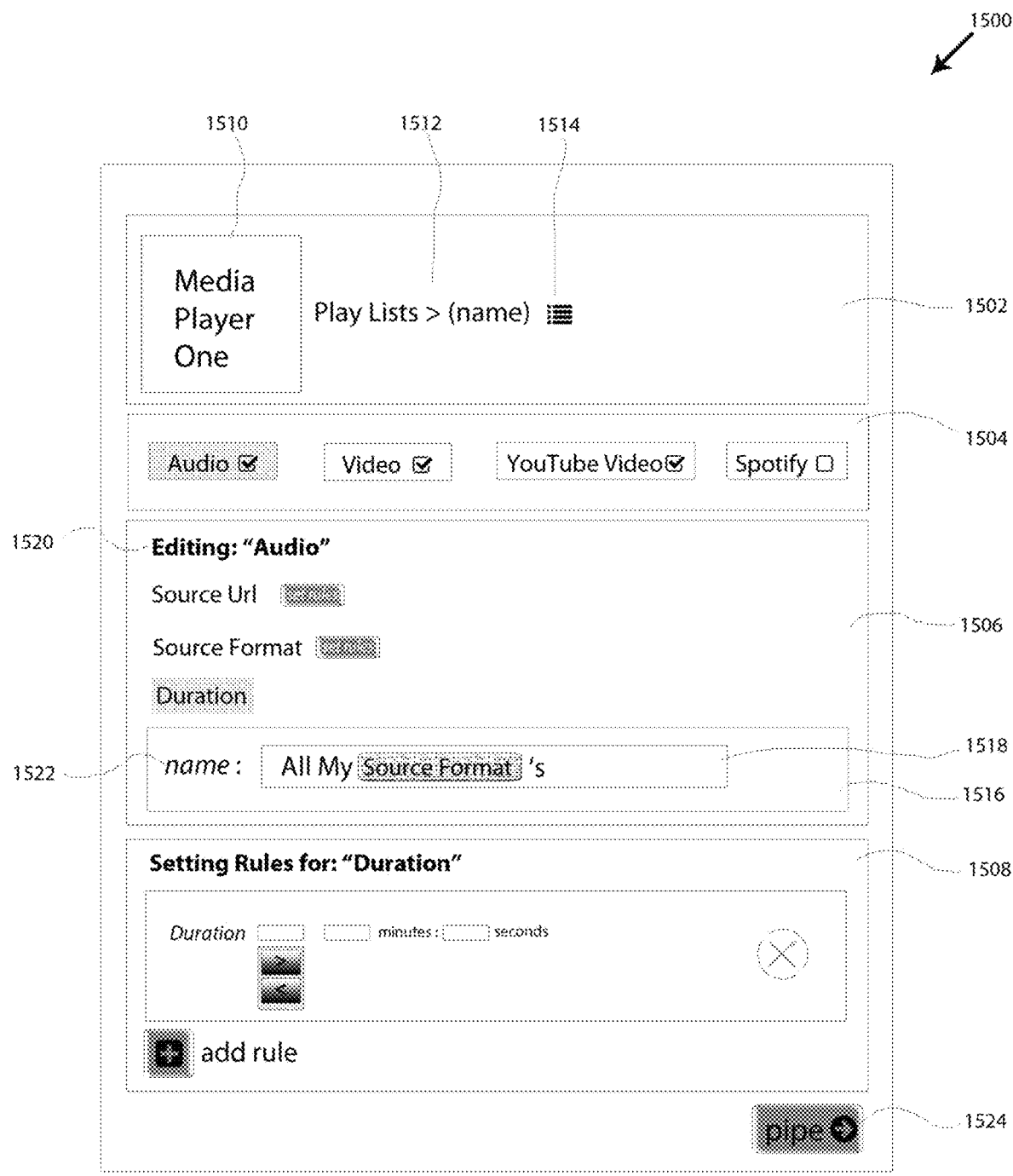
FIG. 15 depicts an example of a Target Section Settings Component, according to an embodiment of the present invention.

FIG. 15 depicts an example of a Target Section Settings Component 1500, according to an embodiment of the present invention. Like a Target Sections Settings View 1000, a Target Section Settings Component 1500 (also 1406) comprises a target section 1502, a content types section 1504, a content properties section 1506 and a rules section 1508. Those sections also work similarly to the corresponding ones in a Target Sections Settings View; they enable users to filter incoming content types by type exclusion or by rules.

In the target section 1502 button 1514 enables the user to select or change the current application 1510 or application sections 1512. Unlike 1014 in 1000, 1514 enables the user to select application section patterns (e.g., "Play Lists> (name)") that once selected get displayed on 1512 and make 1516 show editing tools 1518 to specify binding rules for the parameters 1522 (e.g., "name") that make up the application section pattern in 1512. Those binding rules can be set, but not limited, to a constant string value, the value of a property of the content being edited (indicated in 1520), or a combination of them, according to an embodiment of the present invention.

In FIG. 15, 1518 contains a combination of constant strings and the value of a property of the content being edited. The elements contained in 1518 are equivalent to the following template literal: "All My ${Source Format}'s". Template literals are string literals enabling embedded expressions. That binding rule gets resolved into values such as: "All My MP3's" and "All My WAV's"; according to the value of property "Source Format" being respectively "MP3" and "WAV", for instance. Therefore, each time an audio content is received, it will be sent to an application section corresponding to its format; for example, if an MP3 file is received, it will be sent to "Play Lists>All My MP3's". In case "Play Lists>All My MP3's" is not a valid section of the application for the current user, it will be automatically created as indicated by the parenthesis in "Play Lists> (name)".

Button 1524 is used to open an Applets Editor in a Piping State, which can be used to set forwarding rules to the type returned by the active section 1512. When in a Piping State, the types' section 1404 is populated with the type returned by the content forwarder; therefore, the applications and sections that can be selected by the buttons 1514 of the Target Section Settings Component 1410 are restricted to the ones accepting said type of content.

In one embodiment, when an Applets Editor is opened to create a new Applet it shows the name's section 1402, the type's section 1404, initially empty, and the target's section 1406, containing a Target Section Settings Component 1410 and a button 1412 to add more of those components into 1406. A component can be removed from the editor by means of their corresponding buttons 1406. When a target section 1512 is selected in the first component, it will display in 1404 the active types of content of that component, according to that component's content types section 1504. As other components are added to the editor by using button 1412, the type's section 1404 gets updated to show the union of the active content types in each content types' section 1504 of the Target Section Settings Component 1410. By clicking button 1408, the user creates a new Applet, with name indicated in 1402, which accepts incoming content of the types displayed on 1404.

In one embodiment, when content is sent to an Applet, it travels down the target's section 1406 until it finds the first Target Section Settings Components 1410 that accepts it and routes it to a target. Then, the returned content is forwarded to the target's section 1406 of the next Applet Editor component in the pipe, and so on.

In other embodiments, more sophisticated features are offered by the Applets Editor 1400 and the Target Section Settings Component 1500. Some of those features may include, but are not restricted to:

(a) A Section Settings Component inside an Applets Editor in a Piping State can reference content type instances sent to or returned by previous applications or applets in the pipe.

(b) The applets Editor can enable the creation of content type instances to which property values can be assigned from other content type instance properties and editing tools.

(c) The Applets Editor can enable a user to create Applets comprising sections or routes. For example, the editor can enable users to create sub-Applets inside an Applet and the names of those would become the names of the main Applet's sections.

(d) The Applets Editor supports parallel routing. For example, when content is sent to an Applet, it gets processed by every Target Section Settings Components 1410 of the target's section 1406 that can accept it.

Like applications, users may be linked to Applets, and those linked Applets may be listed in the SCS Share Targets View 604 (in FIG. 6A) and used as targets of sharing operations. To link to an Applet, the user has to be linked to each application that is a dependency of that Applet, according to an embodiment of the present invention.

In one embodiment, a SCS can offer its registered users and applications functionality for creating, maintaining and sharing Applets. In one embodiment, Applets can be authored by the SCS, a SCS registered user or a SCS registered application. In one embodiment, an Applet can be shared with any SCS registered application, shared with a particular group of SCS registered applications or kept private to its author. In one embodiment, the SCS Licensing API manages Applets.

An Applet is said to be run against an application view when the SCS Association API 704 parses said view for the content types that can be received by the Applet, and invokes the Applet for the valid instances of those content types. Different embodiments may implement various procedures to select which of the valid content type instances should be passed to the Applet, the order on which they should be passed, and possible combination thereof. Similarly, an application section can be run against an application view.

In one embodiment, the SCS enable users to define entities named View Tasks that represent a mechanism for automating the sharing of content from a first application to a route of a second application or Applet. View Tasks can define to the SCS pairs comprising a condition to be met by an application view, and a target that can be an Applet, an Applet section, an application or an application section. Each of said pairs indicates to the SCS to run the given target against any views that satisfy the given condition. View Tasks may run targets against the views satisfying the given condition each time those views are loaded into SCS associated applications, provided that the SCS active user owns said View Tasks, according to an embodiment of the present invention. When a target is run against a given application view, the SCS scans that view, selects all content that can be received by the target and sends the selected content to that target.

In one embodiment, the conditions to be met by an application view that are used to define a task may be restricted to having the identifier of a view belong to a given set of potential application view identifiers. For example, a potential set of view identifiers in the form of a pattern like "http://www.example.com/*" can be provided to refer to any web page having a URL starting with "http://www.example.com/", according to an embodiment of the present invention.

Figure 16:
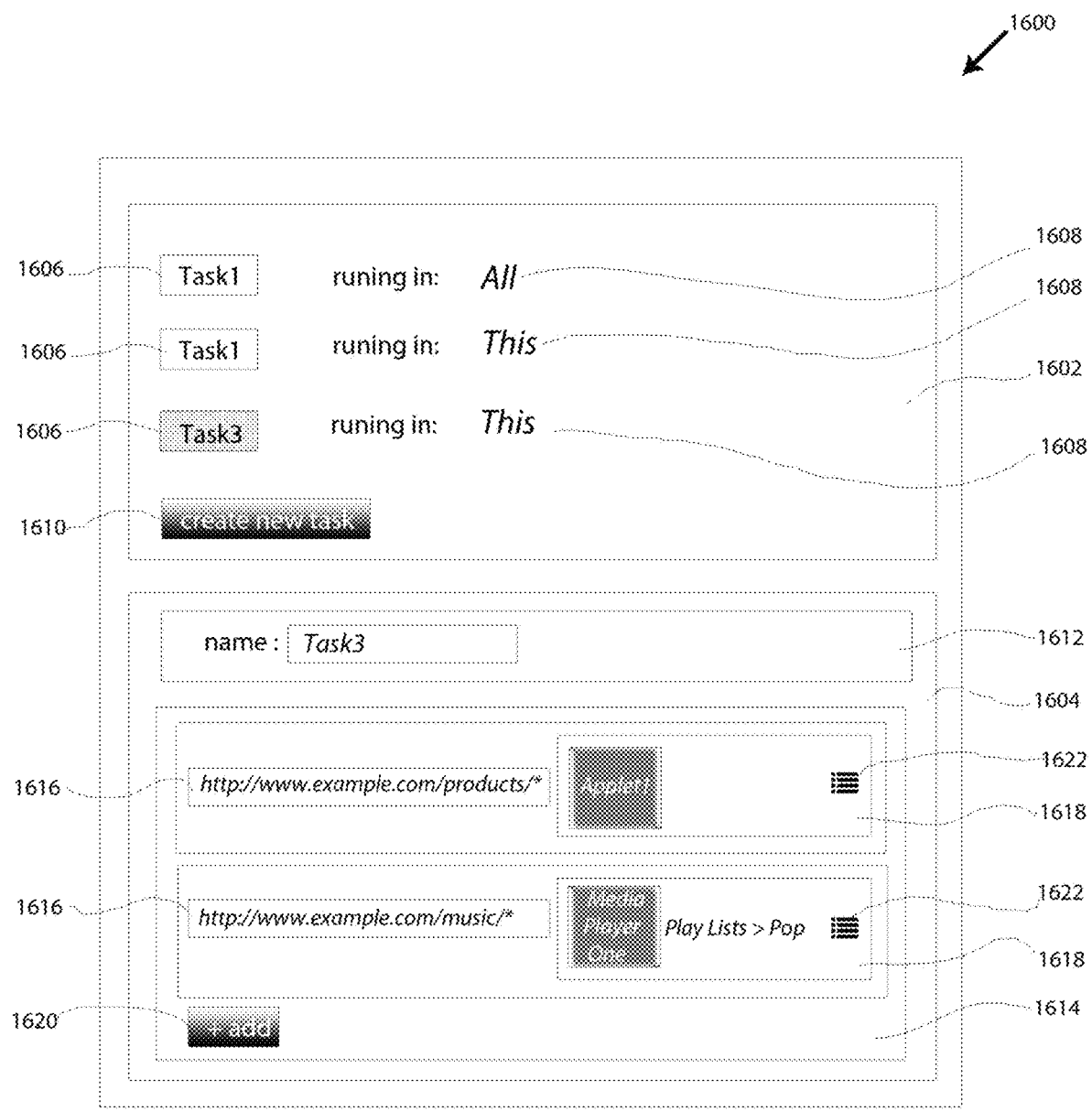
FIG. 16 depicts an example of a Tasks View component, according to an embodiment of the present invention.

FIG. 16 depicts an example of a Tasks View component 1600 (also 722), according to an embodiment of the present invention. It comprises a tasks list 1602 and a tasks editor 1604. The tasks list indicates the user tasks 1606 and the scope where they operate 1608. The operating scope specifies where to run a given task. For example, it may be set to customizable application event is an application event for which the application provides a visual representation that enables SCS registered users to indicate an action to perform in response to the emergence of said application event.

In one embodiment, customizable application events produce content that is sent to a share target selected by the user on the SCS Sharing Interface. The SCS Shared Interface is shown in response to user manipulation of the visual representation of said events provided by the applications.

For example, an email application may enable users to handle two events pertaining email attachments: "On New Email" and "On Delete Email". In order to do so, it should define those Events to the SCS and associate them to the application, according to an embodiment of the present invention, as follows:

```
class SampleEmailApplication extends Application
                implements ITrigger<NewEmailAttachmentEvent&DeleteEmailAttachmentEvent>{
    //some content removed for simplicity.
}
@display("On New Email", "Configure what to do with email attachments of new emails")
class NewEmailAttachmentsEvent extends Event
                implements IReturn<Array<FileContent>> {
    constructor( ) {
        super("New Email"); //event's identifier
    }
}
@display("On Delete Email", "Configure what to do with email attachments of deleted emails")
class DeleteEmailAttachmentsEvent extends Event
                implements IReturn<Array<FileContent>> {
    constructor( ) {
        super("Delete Email");   //event's identifier
    }
}
```

"All" to indicate that the task should run on all SCS associated application running instances for which the SCS active user is the task owner. For another example, it may be set to "This" to indicate that the task should run only in the current application instance.

In one embodiment, when a user clicks a task 1606 or the new task button 1610, the Task Editor 1604 (also 724) is shown. The Task Editor comprises a name section 1612, used to name the task, and a definition section 1614. The definition section contains a collection of text boxes 1616, where sets of potential view identifiers may be specified by using patterns, and their matching execution sections 1618, where targets can be selected from a SCS Share Targets View 604 opened by clicking button 1622.

In other embodiments where a View Task may be defined using other sorts of conditions to be met by application views, the Task Editor 1604 would offer the appropriate tools for users to define those conditions. Such other sorts of conditions may be correlated to the potentiality offered by the SCS Sharing Context in those embodiments. For example, suppose the SCS Sharing Context comprised a property named "contentViewOwnerServices" that holds a collection of the types of services offered by the application to which a web page belongs (not the web browser, but the web site as a SCS registered application). A possible condition that can be formulated using said property is that the listed of services represented by the value of that property contained a specific type of service such as "Banking", for instance. In that example, the Task Editor may show a drop down control for users to select a type of service (e.g., "Banking") to formulate the condition.

In embodiment, Applications and Applets can also be executed in response to customizable application events. A The example above shows how application Events can be defined by extending the SCS preset class "Event", and implementing the SCS preset interface "IReturn< >", according to an embodiment of the present invention. The generic type argument specified in "IReturn< >" represents the type of content that an Event can make available to the application handling the Event.

In one embodiment, an application can indicate the types of Events it may trigger by implementing the interface "ITrigger< >", having as generic type argument the interception of all Event types (e.g., "NewEmailAttachmentEvent&DeleteEmailAttachmentEvent") that represent those events.

Once the email application Events are defined, the next step, for the example above, is to place a visual aid in the views of the email application that displays a menu showing both events, so that users may select the one they wish to handle. A suitable place to show that visual aid is around email attachments in the email application views, since the defined events pertain to email attachments.

In one embodiment, SCS View Components and the SCS View Embed System's annotation system may be used to display event options to users from inside application views. For example, according to a modification to a previous example, the annotation system may utilize the following tag to render a view component surrounding the attachments section of the views of an email web application: <scs-embed embed-id="Share Targets" share-content='{"url": "https://emailexample.com/attachments/document1.txt"}' event-options='["New Email", "Delete Email"]'>. In this example, attribute "event-options" is utilized to indicate to the SCS which Events to include in the menu, according to an embodiment of the present invention.

Figure 13B:
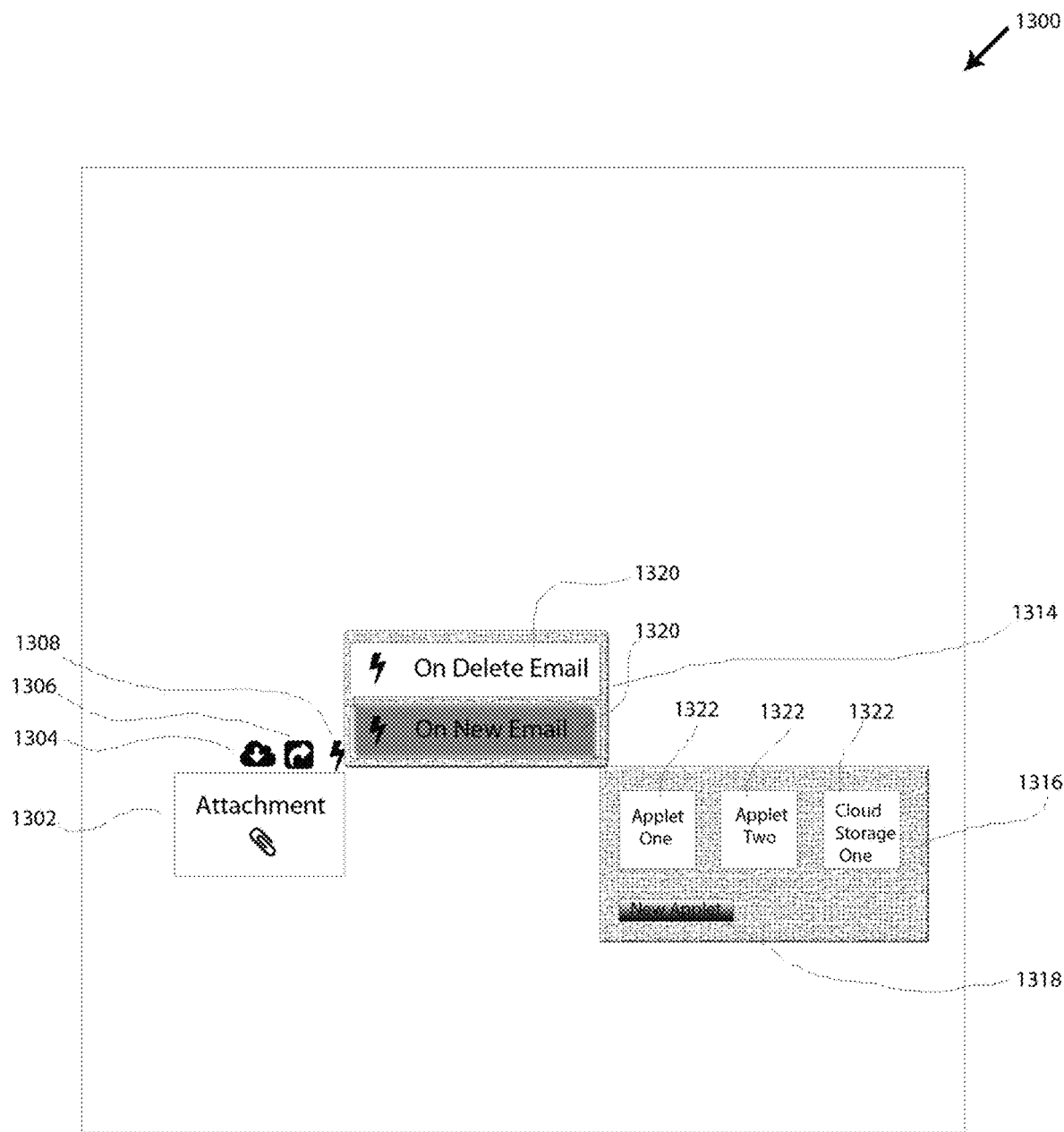
FIG. 13B depicts a modification of FIG. 13A incorporating a button that can be used to handle application Events, according to an embodiment of the present invention.

FIG. 13B depicts a modification of FIG. 13A incorporating a button that can be used to handle application Events, according to an embodiment of the present invention. In FIG. 13B button 1308 is displayed as in response to using the attribute "event-options" in the "scs-embed" tag, according to an embodiment of the present invention. When the user clicks 1308, a pop up menu 1314 containing the available events 1320 that can be handled by the user for attachment 1302 is shown. Upon selecting an event, the SCS Association API 704 displays a modified SCS Share Targets View 1316 containing only the applications and Applets 1322 that can receive the type of content returned by the corresponding Event. Said modified SCS Share Targets View may also comprise a button 1318 that can be used open the Editor 720 (also 1400) to create a new Applet that can receive the content returned by the corresponding trigger.

In one embodiment, when a user handles an event by the process depicted in FIG. 13B, the SCS notifies the SCS Integration component 932 of the trigger application about that action so that it configures its Resource Observer 938 to watch for changes in the corresponding resources. When a qualifying change is detected, the trigger application sends the content associated to the event along with other necessary information, such as the linkage user id, to the SCS's Content Receiver 918, which processes the forwarding of the mentioned content.

In one embodiment, a SCS registered application may indicate to the SCS a Resource Authorization for protected resources that are not resources corresponding or belonging to any of its users. Those resources are referred as application owned resources. For example, an application named "Example App" may indicate to the SCS a Resource Authorization granting access for Cloud Storage One 122 to any of its files whose URL start with "https://example.com/files/", according to an embodiment of the present invention, as follows:

```
class EmailExampleApplication extends Application
                     implements IAuthorize{
    constructor( ) {
        super("Example App"); //application's identifier
    }
    ResourceAuthorizations: Array<ResourceAuthorization> = [ new
    ApplicationResourceAuthorization( ){
        Urls: ["https:// example.com/files/*"],
        GrantAccessTo: (app: Application) => {
            Return app.Id === 'Cloud Storage One';
        },
        DescriptionUrl: "http://www.example.com/application-
        authorization-description"
    }];
}
```

In the previous example, SCS preset class "ApplicationResourceAuthorization", which is derived from "ResourceAuthorization", is used to indicate that that resource authorization applies to application owned resources, according to an embodiment of the present invention. In addition to "Urls" and "GrantAccessTo", that class also comprises property "DescriptionUrl", to which the URL of a document describing the accessible resources and how to use them is assigned.

Embodiments of the present invention enable a SCS to verify the uniqueness of its user accounts in the scope of a country.

A user of a client service is said to be unique in the scope of a country if it has a Uniqueness Assertion relative to said country associated with its user account on the client service, and no other user of the client service has the same Uniqueness Assertion associated with their user accounts. A Uniqueness Assertion is a token issued by a Uniqueness Authority service comprising a country identifier and a person identifier.

A the Uniqueness Authority service is a service that has access to the individual legal identifiers of its users on the countries it supports, uses the individual legal identifier of a user in a country to generate the Uniqueness Assertion of said user in the scope of said country, and is able to issue said Uniqueness Assertions to a client service it is associated with, of which said user is also a user, upon the request for said Uniqueness Assertion by said client service.

An example could be a banking institution that implements a plurality of procedures including one for generating Uniqueness Assertions and one for communicating with other services to which it issues the Uniqueness Assertions. Another example is a SCS that implements a procedure for generating Uniqueness Assertions, gets the access to individual legal identifiers of its users in a country from bank institutions that are registered to the SCS and is able to issues Uniqueness Assertions to SCS registered applications for their linked users.

A Uniqueness Assertion may be defined as a unique code identifying an individual in a country. For example, a Uniqueness Assertion may have, but is not limited to, the following format: "<ISO_ALPHA-2_contry_code>:<sha-256_of_individual_unique_identifier_in_country>", where <ISO_ALPHA-2_contry_code>represent the ISO ALPHA-2 Code of a country and <sha256_of_individual_unique_identifier_in_country> represents the hash code of the individual's unique identifier in said country, calculated by using the hashing algorithm sha256. For instance, for an individual whose social security number in the United States is 000-00-0000 a Uniqueness Assertion may be "US: 5fb0d784eb4b5277d787d9fef634cde3f1915fe4ae306d4a4-c41db866565e7bd". The code "5fb0d784eb4b5277d787d9 fef634cde3f1915fe4ae306d4a4c41db866565e7bd" is the hash code of "000-00-0000" computed by algorithm sha256. Using a Hash Code in the Uniqueness Assertion guarantees that the individual's identification number does not get disclosed by the Uniqueness Authority, since hash codes are irreversible.

Further protections can be added to the process of generating the Uniqueness Assertion. For example, a predetermined secret token can be attached to each individual unique identifier for the country before it is hashed.

A Uniqueness Assertion is not a unique code identifying an individual in the world, since individuals who are citizens of multiple countries may have different identification numbers corresponding to those countries; therefore multiple Uniqueness Assertions may be associated with one individual. In accordance to this fact, a user of a client service who is unique in the scope of a country is also referred as having its account in that service verified relative unique, and the process of verifying the uniqueness of a user account in the scope of a country is referred as The Relative Uniqueness Verification Process.

Figure 17:
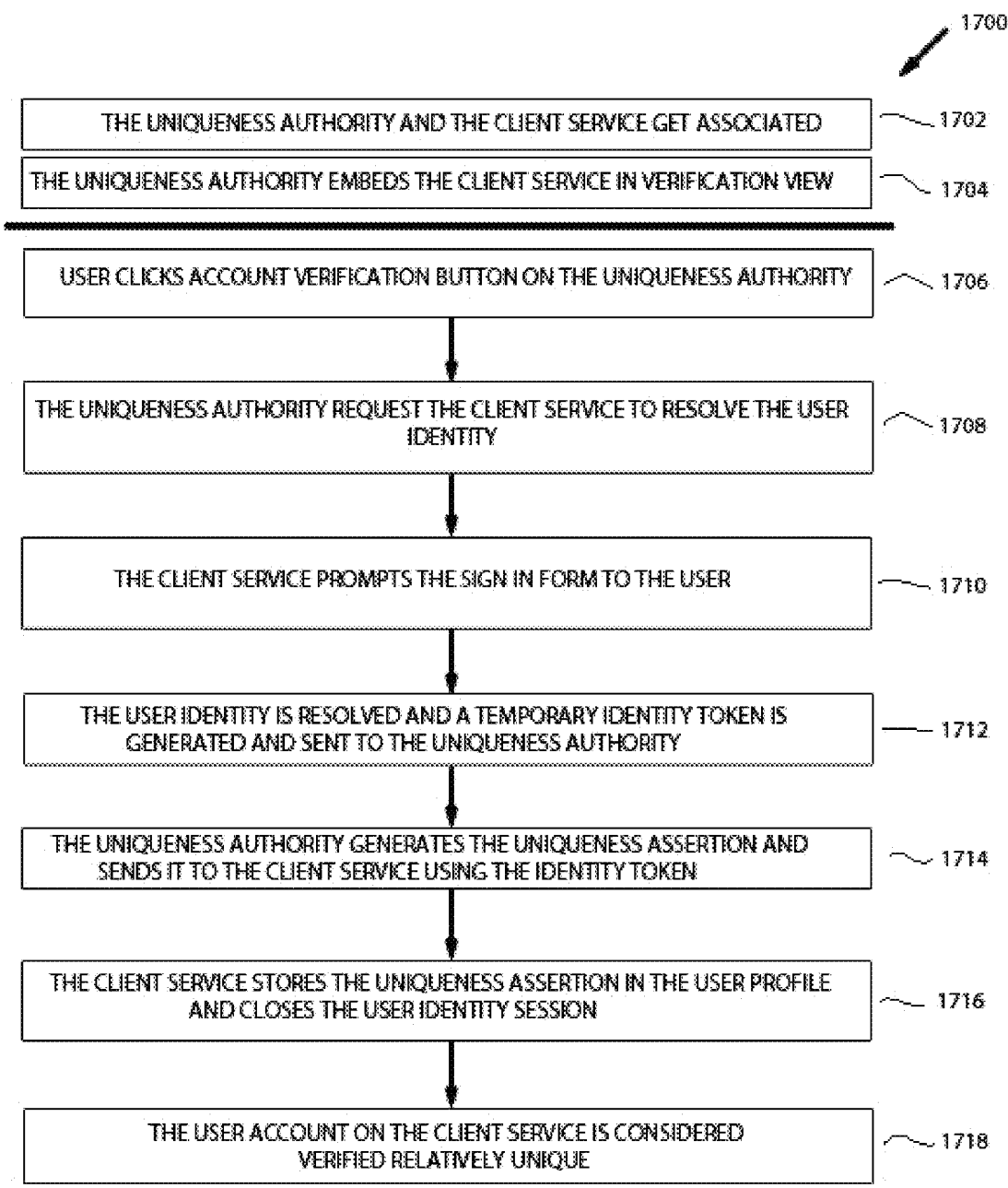
FIG. 17 is a simplified flowchart depicting a high level Relative Uniqueness verification process, according to an embodiment of the present invention.
Figure 18:
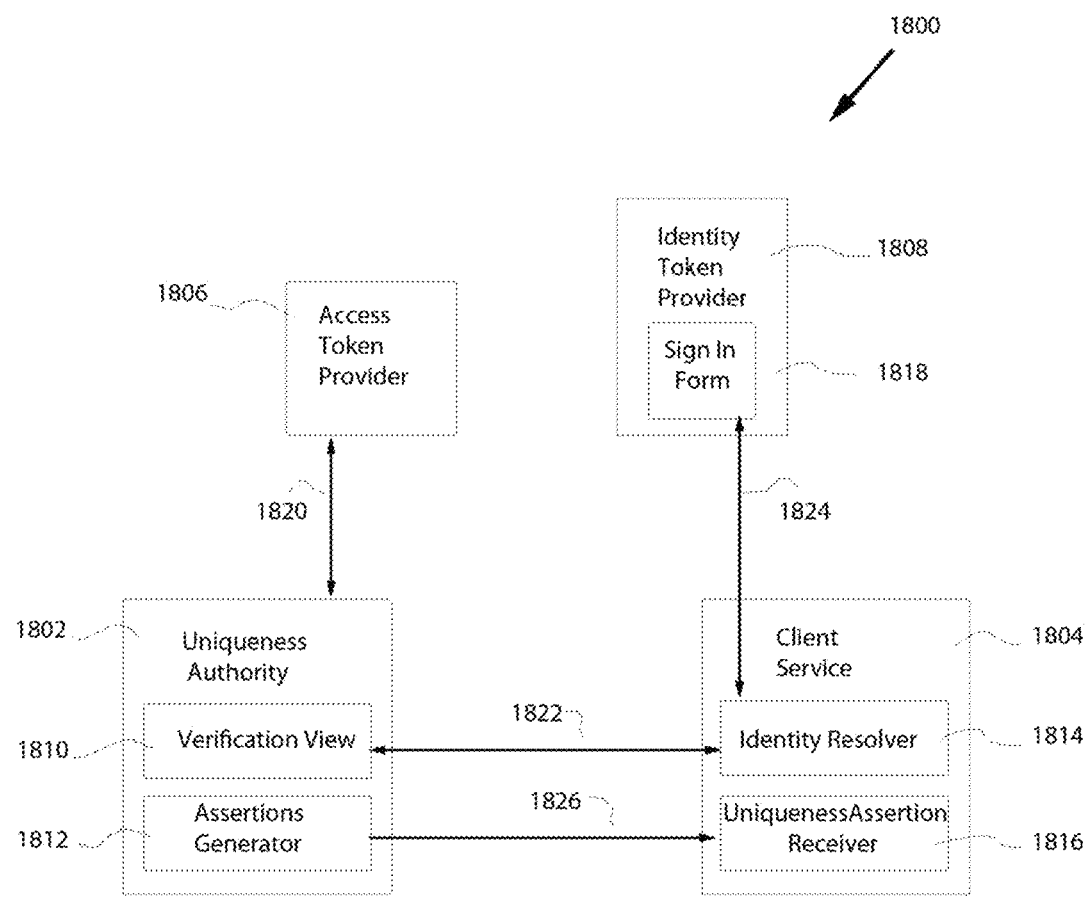
FIG. 18 is a simplified block diagram depicting the different components that interact in a Relative Uniqueness verification process, according to an embodiment of the present invention.

The Relative Uniqueness Verification Process may be implemented in various ways, including but not limited to a system like the one depicted on FIGS. 17 and 18, according to an embodiment of the present invention. FIG. 17 is a simplified flowchart depicting a high level Relative Uniqueness verification process, according to an embodiment of the present invention. The method depicted in FIG. 17 may be performed by software (e.g., program, code, instructions executed by a processor), in hardware, or combinations thereof. The software may be stored on a computer-readable storage medium. FIG. 18 is a simplified block diagram depicting the different components that interact in a Relative Uniqueness verification process, according to an embodiment of the present invention.

In one embodiment, the Relative Uniqueness verification process comprises four components: A Uniqueness Authority 1802, a Client Service 1804, an Access Token Provider 1806 and an Identity Token Provider 1808.

In one embodiment, the Uniqueness Authority 1802 comprises a Verification View 1810 and an Assertion Generator 1812. A Verification View is a user interface component that comprises a button that the user may click to initiate the verification process, as well as a description of what the process is an what information is to be disclosed to the Client Service 1804. The Assertions Generator 1812 is a functionality that the Uniqueness Authority implements in order to generate Uniqueness Assertions.

The Client Service 1804 is the service that is consuming the Uniqueness Assertions in order to have its user accounts verified as relatively unique. It comprises, according to an embodiment of the present invention, an Identity Resolver 1814 and a Uniqueness Assertion Receiver 1816. An Identity Resolver is a component that manages the resolution of the identity of a user of the service 1804. It may use an external Identity Token Provider 1808 to perform said task. The Uniqueness Assertion Receiver 1816 is the component that receives the Uniqueness Assertion and saves it to the User Profile if no other user of 1804 has the same Uniqueness Assertion, having the user account become verified.

The Access Token Provider 1806 is an external service that may be used in the process of association between the Uniqueness Authority and the Client Service to configure a secure communication channel between the two services. Once those two services are registered to it, the Client Service authorizes the Access Token Provider to issue access tokens to the Uniqueness Authority that it can use to access some specified resources of the Client Service 1804; for example, the Identity Resolver 1814 and the Uniqueness Assertion Receiver 1816.

The Identity Token Provider 1808 is an external service that the Client Service may use to resolve the identity of its users. It comprises a Sign In form 1818 that is prompted to the user so that it enters its credentials to have its identity authenticated. When a user needs to be authenticated, the Client Service redirects the user to the Identity Token Provider, which prompts the sign it form and, upon user authentication, generates a security token and redirects the user to the return URL specified by the Client Service.

At a high level, a Relative Uniqueness verification process can be divided into steps that are performed at configuration time and steps that are performed at post configuration time.

At configuration time, the Uniqueness Authority 1802 and the Client Service 1804 get associated. That association comprises the configuration of a secure communication channel between both services. To configure said channel, both services register to the Access Token Provider 1806 and the Client Service creates a rule authorizing the Uniqueness Authority to access the necessary resources (step 1702). Also at configuration time, the Uniqueness authority embeds, in the Verification View 1810, an option corresponding to Client Service 1804 so that a user can select 1804 as the service to which the verification is to be issued (step 1704). All other steps take place at post configuration time.

The Client Service may indicate its users that they can initiate their account verification process by login into their accounts at the Uniqueness Authority 1802 and clicking the designated button on the Verification View 1810. When a user initiates the verification process by clicking that button (step 1706), the Uniqueness Authority sends a request 1822 to the Client Service 1804 to authenticate the user (step 1708). That request is handled by the Identity Resolver 1814, which creates a new request 1824 to the Identity Token Provider 1802, redirecting the user to the Sign In Form 1818 (step 1710). Upon authentication, the Identity Token Provider sends the identity token back to the Identity Resolver, which generates a temporary identity token and send it back to the Uniqueness Authority in response to its request 1822 (step 1712).

Upon receiving the response, the Uniqueness Authority generates the Uniqueness Assertion and posts it 1826 to the Client Service along with the temporary identity token (step 1714). Consequently, the Client Service compares that Uniqueness Assertion with the ones it has for other users, and if no other user has that assertion, it stores the Uniqueness Assertion on the user's profile and signs the user off (step 1716) to conclude the process of relative uniqueness verification for the user (step 1718) by granting it the status of verified relative unique. If another user of the Client Service 1804 had the same assertion, the status of verified relative unique would not be granted to the user being verified.

In other embodiments the verification method described above may be modified. For example, in one embodiment, the Access Token Provider 1806 and the Identity Token Provider 1808 may be combined into one token provider service. In another embodiment, the Access Token Provider and the Identity Token Provider are combined and merged into the Client Service 1804. For yet another example, The Uniqueness Authority does not have the individual's country scoped unique identifier of its users; but instead, it is associated with other services, that have said identifiers, from which it can securely obtain them, upon user authorization, to generate the Uniqueness Assertion.

In one embodiment, the SCS is a Uniqueness Authority that gets access to individual legal identifiers of a plurality of its users from a first group of SCS registered applications that offer said access to the SCS, and is able to issue Uniqueness Assertions to a second group of SCS registered applications for their linked users that are also linked users of at least one of the applications in said first group of SCS registered applications.

For example, SCS registered banking applications may be configured to offer the SCS the service of providing the individual legal identifiers of their linked users in the countries they support upon user approval; and the SCS can generate the Uniqueness Assertions of those users and save them in the SCS user profiles. Said Uniqueness Assertions can be issued by the SCS to SCS registered applications that request the relative uniqueness verification of their linked users.

Figure 19:
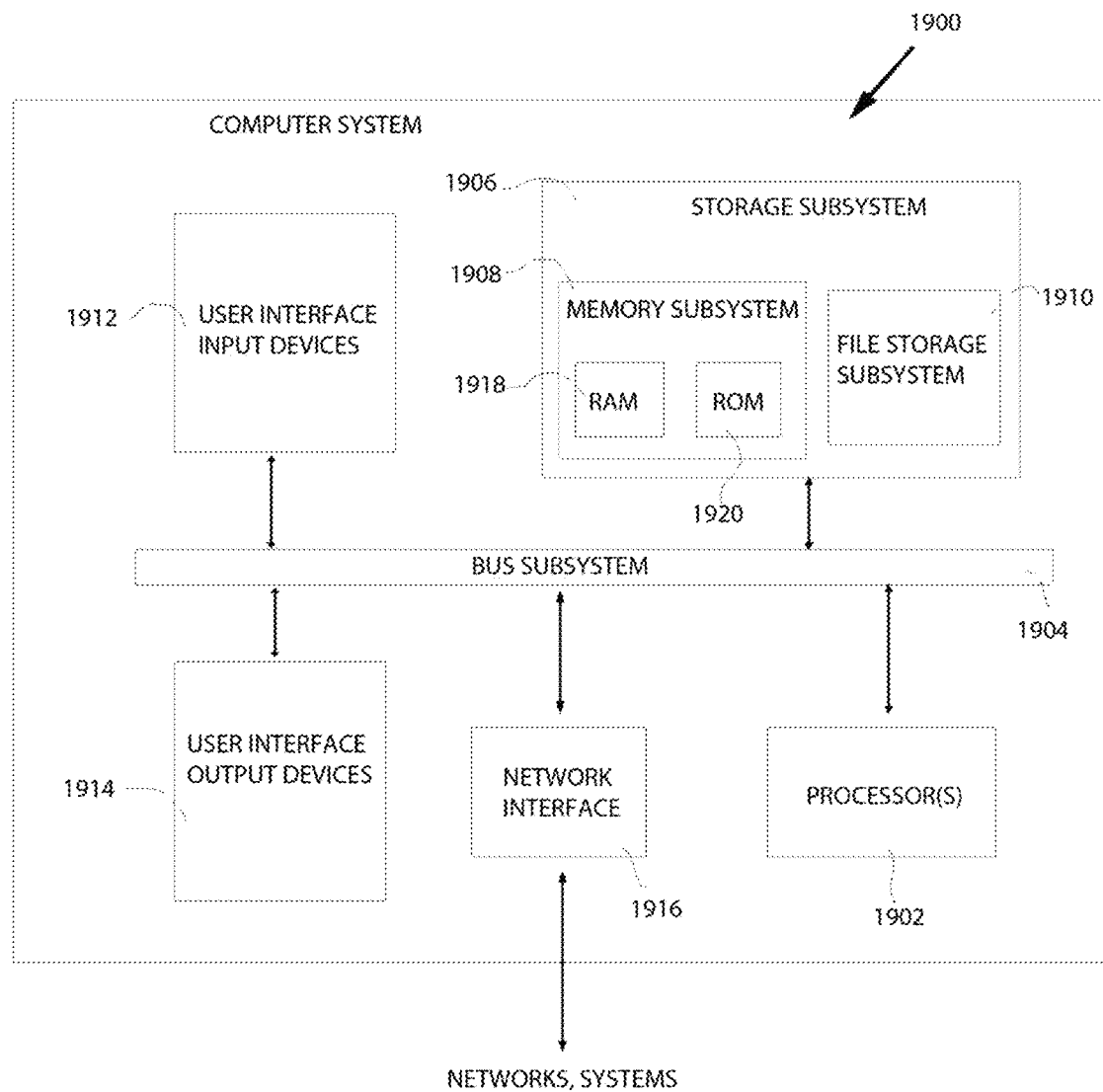
FIG. 19 is a simplified block diagram of a computer system that may be used to practice an embodiment of the present invention.

FIG. 19 is a simplified block diagram of a computer system 1900 that may be used to practice an embodiment of the present invention. In various embodiments, computer system 1900 may be used to implement any of the computers or systems illustrated in FIG. 1 described above. For example, computer system 1900 may be used to implement user system 106. As depicted in FIG. 19, computer system 1900 includes a processor 1902 that communicates with a number of peripheral subsystems via a bus subsystem 1904. These peripheral subsystems may include a storage subsystem 1906, comprising a memory subsystem 1908 and a file storage subsystem 1910, user interface input devices 1912, user interface output devices 1914, and a network interface subsystem 1916.

Bus subsystem 1904 provides a mechanism for letting the various components and subsystems of computer system 1900 communicate with each other as intended. Although bus subsystem 1904 is shown schematically as a single bus, alternative embodiments of the bus subsystem may utilize multiple busses.

Network interface subsystem 1916 provides an interface to other computer systems and networks. Network interface subsystem 1916 serves as an interface for receiving data from and transmitting data to other systems from computer system 1900. For example, network interface subsystem 1916 may enable a user computer to connect to the Internet and facilitate communications using the Internet.

User interface input devices 1912 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1900.

User interface output devices 1914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1900.

Storage subsystem 1906 provides a computer-readable storage medium for storing the basic programming and data constructs that provide the functionality of the present invention. Software (programs, code modules, instructions, procedures) that when executed by a processor provide the functionality of the present invention may be stored in storage subsystem 1906. These software modules, procedures or instructions may be executed by processor(s) 1902. Storage subsystem 1906 may also provide a repository for storing data used in accordance with the present invention. Storage subsystem 1906 may comprise memory subsystem 1908 and file/disk storage subsystem 1910.

Memory subsystem 1908 may include a number of memories including a main random access memory (RAM) 1918 for storage of instructions and data during program execution and a read only memory (ROM) 1920 in which fixed instructions are stored. File storage subsystem 1910 provides persistent (non-volatile) storage for program and data files, and may include a hard disk drive, a flash drive, a floppy disk drive along with associated removable media, a Compact Disk Read Only Memory (CD-ROM) drive, an optical drive, removable media cartridges, and other like storage media.

Computer system 1900 can be of various types including a personal computer, a portable computer, a tablet, a smart phone, a workstation, a network computer, a mainframe, a kiosk, a server or any other data processing system. Due to the ever-changing nature of computers and networks, the description of computer system 1900 depicted in FIG. 19 is intended only as a specific example for purposes of illustrating the preferred embodiment of the computer system. Many other configurations having more or fewer components than the system depicted in FIG. 19 are possible.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system for distributing contents, comprising:
    A plurality of content providers, each comprising a first application;
    A central server, comprising a database for maintaining user specific information for a plurality of users, application specific information for a plurality of applications and content type specific information;
    A plurality of receiving devices, each comprising a receiving application;
    A network interconnecting the plurality of content providers, the central server and the plurality of receiving devices;
    The system configured to:
        Creating, by one of the plurality of content providers, a content type query for distributing content, wherein the new content type query indicates at least one or more types of content;
        Transmitting, by the one of the plurality of content providers, the created content type query to the central server;
        In response to receiving the query, determining, by the central server, a list of routes connected with one or more receiving applications and the content type specific information associated with the routes based on the query;
        Transmitting, by the central server, the list of routes and the content type specific information associated with the routes to the one of the plurality of content providers;
        Generating, by the one of the plurality of content providers, a data content via a user interface of the first application; wherein the data content is of a specific content type;
        Selecting, by the one of the plurality of content providers, at least one route for distributing the data content from the list of routes connected with the plurality receiving devices and the content type specific information associated with the routes;
        Transmitting, by the one of the plurality of content providers, the at least one route selected for distributing the data content and the data content to the central server;
        Verifying, by the central server, the data content contains the at least one or more types of content supported as indicated in the created content type query;
        Validating, by the central server, the receiving application of the at least one route selected for distributing the data content is capable of consuming the content data based on the content type specific information associated with the at least one route; and
        In response to validating that the receiving application is capable of consuming the content data: sending, by the central server, the data content via the at least one route selected to the receiving application.

2. The system of claim 1, wherein the central server further comprising one or more object oriented type definition systems, supporting one or more of abstraction, encapsulation, inheritance and/or polymorphism patterns each comprising a global namespace to which every object type defined in the one or more object oriented type definition systems is associated with a unique object type identifier and a data definition language used for defining the object types in said global namespace.

3. The system of claim 2, wherein creating new content types further comprises defining each content type in one object oriented type definition system, dedicated to content types, and said each content type comprises:
- a procedure executable by a computer processor to identify content of a corresponding content type within a given group of content instances,
- a procedure executable by the computer processor to extract a group of properties that the corresponding content type comprises from a given content instance; or
- a procedure executable by the computer processor to render an instance of the corresponding content type in the user interface of the first application.

4. The system of claim 2, wherein some of said object oriented type definition systems further comprising technology-dependent namespaces, comprising data definition languages for defining technology-dependent variations of object types in the global namespace.

5. The system of claim 1, further comprising a licensing system configured to:
- assigning, by the central server, ownership rights over an entity of a plurality of entities to the author or authors of the entity;
- transferring the ownership rights over from the entity of said plurality of entities to a new owner or new set of owners of another entity: and
- issuing the rights to use a specific entity of said plurality of entities to a group of applications, users, or combinations thereof by the owner or owners of said specific entity.

6. The system of claim 1, wherein the first application further configured to: invoke actions on the receiving application.

7. The system of claim 6, wherein the central server further configured to:
- linking users of the each first application of the plurality of content providers; and
- allowing a first user to authorize a second user to invoke remote actions of a particular receiving application; wherein said particular receiving application has authorized the first user to authorize a group of users to invoke said actions and the second user is one of the users in said group of users.

8. The system of claim 1, wherein the step of determining a list of routes further comprising indicating, by a set of constrains that the data content to be sent to the at least one route selected must satisfy in order to be accepted by the receiving application when said data content is sent to said at least one route selected; wherein the step of validating further comprising validating the set of constrains which said data content must satisfy in order to be accepted by the receiving application of the at least one route selected.

9. The system of claim 8, wherein the central server further configured to:
- linking users of the each first application of the plurality of content providers; and
- constraining, by a user of the first application, the content for receiving by said receiving application that correspond to application resources own by said user.

10. The system of claim 1, wherein the first application further configured to restrict certain data content that can be sent.

11. The system of claim 1, further configured to:
- Creating new content type specific information by each first application or each receiving application;
- Wherein the creating new content type specific information including creating dynamic content types dynamically resolvable into other content types according to a resolution procedure and sharing context; wherein the resolution procedure is a set of instructions executable by a computer processor for interpreting the sharing context resulting in a particular content type; wherein the sharing context is a collection of properties describing relevant information about the operation of sending the data content to the receiving application of the at least one of route selected.

12. The system of claim 1, wherein the central server further configured to link users of the each first application of the plurality of content providers and users of the each receiving application of the plurality of receiving devices.

13. The system of claim 12, wherein the plurality of content providers further configured to: authorizing the first application to access only the resources that are included in a set of protected resources of a second application when said protected resources are being referenced by data contents being sent on a sharing operation, on behalf of a user, wherein the first application is the target of said sharing operation and the user have access to said protected resources.

14. The system of claim 13, further configured to:
- allowing a first user to authorize a second user to send content to application routes of an application; wherein said application has authorized the first user to authorize a group of users to send said content to those routes and the second user is one of the users in said group of users; and
- allowing the first user to authorize the second user to access protected resources of a particular application; Wherein said particular application has authorized the first user to authorize a particular group of users to access said protected resources and the second user is one of the users in said particular group of users.

15. The system of claim 1, wherein the system further configured to:
- indicating, by the receiving application, content types that can be returned by the list of routes determined;
- receiving, by the central server, the data content that the receiving application returns in response to receiving the data content sent by the central server to the at least one routes selected of said receiving application.

16. The system of claim 15, wherein the computer system further comprises a procedure for creating and the capability of running new applications which are preconfigured for receiving content that is sent to any of its routes, and preconfigured for sending content to a route of a second application and potentially receiving content returned by said route of the second application; said procedure comprising a computer programming language or a visual interface that compiles to a computer programming language or both thereof used for implementing the application logic that integrates to said application capabilities for sending and receiving content.

17. The system of claim 1, further configured to:
- Providing, by said first application, a visual representation of a customizable event via said user interface;

Defining, by the first application, customizable events and indicating content types that correspond to a data content produced by said customizable events; and Scheduling, by the first application, the transmission of the data content produced by said customizable events.

18. The system of claim 1 further configured to:

Automating the sharing of the data content from the first application to the receiving application, provided that the first application contains content that can be shared to the route of the receiving application by the user of the first application; wherein the system further comprises:

Defining a group of requirements that must be validated to determine if an automated sharing operation can be performed having the first application as the share source of said operation, and for associating said group of requirements with a route of the receiving application to where qualifying content must be sent if said requirements are met; and Automatically sending the data content from the first application to said route of the receiving application when the state of said first application satisfies the group of requirements that is associated with said route of the receiving application.

19. The system of claim 1, wherein each of the receiving application registering with the central server by:

Defining one or more route for communication with the receiving application to the central server;

Optionally providing corresponding content type specific information to the central server;

Storing the corresponding content type specific information in the database of the central server; and Establishing a secure channel with the central server.

* * * * *